US009644042B2

(12) United States Patent
Matyjaszewski et al.

(10) Patent No.: US 9,644,042 B2
(45) Date of Patent: May 9, 2017

(54) ELECTROCHEMICALLY MEDIATED ATOM TRANSFER RADICAL POLYMERIZATION

(75) Inventors: Krzysztof Matyjaszewski, Pittsburgh, PA (US); Nicola Bortolamei, Quinto Vincentino (IT); Andrew Magenau, Pittsburgh, PA (US); Armando Gennaro, Selvazzano Dentro (IT); Abdirisak Ahmed Isse, Padova (IT)

(73) Assignee: Carnegie Mellon University, Pittsburgh, PA (US)

( * ) Notice: Subject to any disclaimer, the term of this patent is extended or adjusted under 35 U.S.C. 154(b) by 63 days.

(21) Appl. No.: 13/993,521

(22) PCT Filed: Dec. 16, 2011

(86) PCT No.: PCT/US2011/065578
§ 371 (c)(1),
(2), (4) Date: Nov. 4, 2013

(87) PCT Pub. No.: WO2012/091965
PCT Pub. Date: Jul. 5, 2012

(65) Prior Publication Data
US 2014/0183055 A1    Jul. 3, 2014

Related U.S. Application Data

(60) Provisional application No. 61/574,890, filed on Aug. 11, 2011, provisional application No. 61/459,724, filed on Dec. 17, 2010.

(51) Int. Cl.
*C25B 3/00* (2006.01)
*C08F 2/58* (2006.01)
(Continued)

(52) U.S. Cl.
CPC .............. *C08F 2/58* (2013.01); *C08F 2/38* (2013.01); *C08F 4/40* (2013.01); *C08F 2438/01* (2013.01)

(58) Field of Classification Search
CPC ..... C25B 3/00; C25B 3/02; C08F 4/42; C08F 4212/08; C08F 2/58; C08L 33/08
(Continued)

(56) References Cited

U.S. PATENT DOCUMENTS 3,037,004 A    5/1962   Simone et al.
3,096,312 A    7/1963   Henry
(Continued)

FOREIGN PATENT DOCUMENTS

CA    2209061       2/1998
CN    1084199 A     3/1994
(Continued)

OTHER PUBLICATIONS

Zhongxi Huang, Yongming Zhang, Hong Li, Yangang Liu, "A novel immobilized cobalt(II)/copper(II) bimetallic catalyst for atom transfer radical polymerization (ATRP) of methyl methacrylate", Applied Catalysis A: General, vol. 332, Issue 2, Nov. 20, 2007, pp. 192-199.*

(Continued)

*Primary Examiner* — Edna Wong
(74) *Attorney, Agent, or Firm* — K&L Gates LLP

(57) ABSTRACT

Electrochemical reduction of an exemplary ATRP catalyst, $Cu^{II}Br_2/Me_6TREN$, is shown to be an efficient process to mediate and execute an ATRP. The onset of polymerization occurs only through passage of a cathodic current achieved under a reductive potential to form $Cu^{I}Br_2/Me_6TREN$, within the reaction medium. Unprecedented control over the polymerization kinetics can be attained through electrochemical methods by modulating the magnitude of the (Continued)

Figure 1:
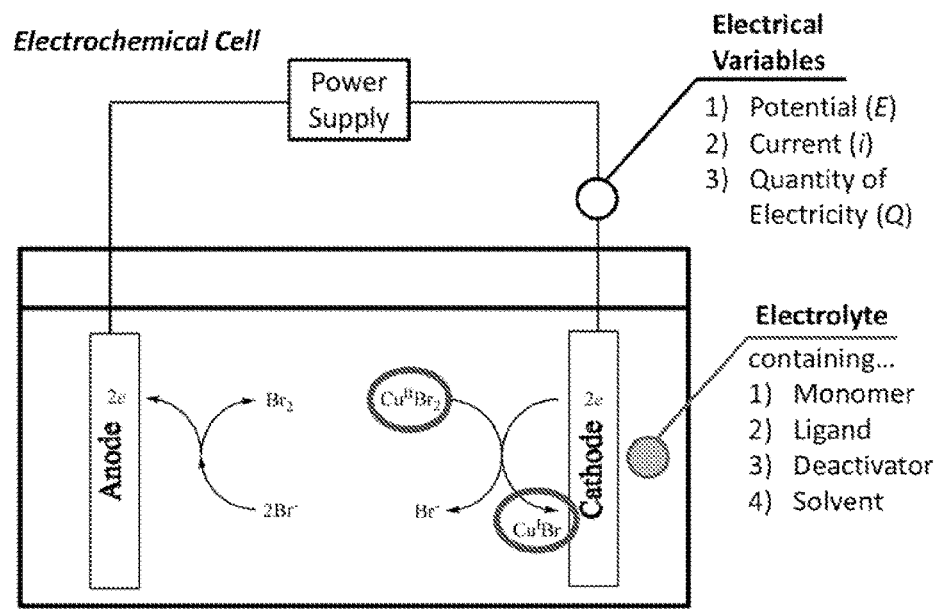

applied potential allowing polymerization rate enhancement or retardation. Additional polymerization control is gained through electrochemical "dials" allowing polymerization rate enhancements achieved by larger applied potentials and the ability to successfully switch a polymerization "on" and "off" between dormant and active states by application of multistep intermittent potentials.

23 Claims, 21 Drawing Sheets

(51) Int. Cl.
C08F 2/38 (2006.01)
C08F 4/40 (2006.01)

(58) Field of Classification Search
USPC .................................................. 205/413, 414
See application file for complete search history.

(56) References Cited

U.S. PATENT DOCUMENTS

| | | |
|---|---|---|
| 3,183,217 A | 5/1965 | Serniuk et al. |
| 3,350,374 A | 10/1967 | Fetscher et al. |
| 3,397,186 A | 8/1968 | Edward et al. |
| 3,472,826 A | 10/1969 | Potts et al. |
| 3,546,083 A | 12/1970 | Ort et al. |
| 3,573,180 A | 3/1971 | Hodes et al. |
| 3,716,550 A | 2/1973 | Gilligan et al. |
| 3,753,956 A | 8/1973 | Tuites et al. |
| 3,862,978 A | 1/1975 | Decker et al. |
| 3,953,305 A | 4/1976 | Connolly |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,486 A | 3/1979 | Haag et al. |
| 4,302,553 A | 11/1981 | Frisch et al. |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,925,765 A | 5/1990 | Madeleine |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,346,954 A | 9/1994 | Wu et al. |
| 5,362,813 A | 11/1994 | Antonelli et al. |
| 5,401,804 A | 3/1995 | Georges et al. |
| 5,405,913 A | 4/1995 | Harwood et al. |
| 5,451,647 A | 9/1995 | Faust et al. |
| 5,459,222 A | 10/1995 | Rodgers et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,543,158 A | 8/1996 | Gref et al. |
| 5,558,954 A | 9/1996 | Morrison |
| 5,610,250 A | 3/1997 | Veregin et al. |
| 5,630,906 A | 5/1997 | Boe et al. |
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,546 A | 6/1998 | Jung et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,031,017 A | 2/2000 | Waki et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senninger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,183,866 B1 | 2/2001 | Yamazaki et al. |
| 6,191,197 B1 | 2/2001 | Wang et al. |
| 6,235,822 B1 | 5/2001 | Whetten et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,319,988 B1 | 11/2001 | Barkac et al. |
| 6,326,455 B2 | 12/2001 | Vassiliou et al. |
| 6,342,563 B1 | 1/2002 | McGinniss et al. |
| 6,407,187 B1 | 6/2002 | Matyjaszewski et al. |
| 6,451,580 B1 | 9/2002 | Takagi et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,598,721 B2 | 7/2003 | Schmidl |
| 6,620,927 B2 | 9/2003 | Bulpitt et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,664,312 B2 | 12/2003 | Devonport |
| 6,670,299 B1 | 12/2003 | Marks et al. |
| 6,672,717 B2 | 1/2004 | Smith |
| 6,683,120 B2 | 1/2004 | Munro |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,784,260 B2 | 8/2004 | Yeager et al. |
| 6,790,919 B2 | 9/2004 | Matyjaszewski et al. |
| 6,828,025 B2 | 12/2004 | Ali et al. |
| 6,872,266 B1 | 3/2005 | Ciaramitaro |
| 6,887,962 B2 | 5/2005 | Matyjaszewski et al. |
| 6,991,652 B2 | 1/2006 | Burg |
| 6,992,156 B2 | 1/2006 | Parker et al. |
| 7,018,655 B2 | 3/2006 | Lele et al. |
| 7,019,082 B2 | 3/2006 | Matyjaszewski et al. |
| 7,034,079 B2 | 4/2006 | Visger et al. |
| 7,037,992 B2 | 5/2006 | Wilson et al. |

(56) References Cited

U.S. PATENT DOCUMENTS

| | | |
|---|---|---|
| 7,049,373 B2 | 5/2006 | Matyjaszewski et al. |
| 7,049,378 B2 | 5/2006 | Ittel et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,167,354 B2 | 1/2007 | Dietz et al. |
| 7,186,419 B2 | 3/2007 | Petersen |
| 7,241,502 B2 | 7/2007 | Anselmann et al. |
| 7,332,550 B2 | 2/2008 | Matyjaszewski et al. |
| 7,407,995 B2 | 8/2008 | Ok |
| 7,498,456 B2 | 3/2009 | Lai |
| 7,566,410 B2 | 7/2009 | Song et al. |
| 7,572,874 B2 | 8/2009 | Matyjaszewski et al. |
| 7,678,869 B2 | 3/2010 | Matyjaszewski et al. |
| 7,691,997 B2 | 4/2010 | Khvorova et al. |
| 7,786,213 B2 | 8/2010 | Maynard et al. |
| 7,795,355 B2 | 9/2010 | Matyjaszewski et al. |
| RE41,897 E | 10/2010 | Loveday et al. |
| 7,825,199 B1 | 11/2010 | Matyjaszewski et al. |
| 7,893,173 B2 | 2/2011 | Matyjaszewski et al. |
| 7,893,173 B2 | 2/2011 | Matyjaszewski et al. |
| 7,968,085 B2 | 6/2011 | Hersel et al. |
| 8,048,982 B2 | 11/2011 | Higashimura et al. |
| 8,114,803 B2 | 2/2012 | Yuasa et al. |
| 8,252,880 B2 | 8/2012 | Matyjaszewski et al. |
| 8,273,823 B2 | 9/2012 | Matyjaszewski et al. |
| 8,318,856 B2 | 11/2012 | Oh et al. |
| 8,349,410 B2 | 1/2013 | Huang et al. |
| 8,361,302 B2 | 1/2013 | Grassl et al. |
| 8,367,051 B2 | 2/2013 | Matyjaszewski et al. |
| 8,404,788 B2 | 3/2013 | Matyjaszewski et al. |
| 8,445,610 B2 | 5/2013 | Kwak et al. |
| 8,497,225 B2 | 7/2013 | Zhamu et al. |
| 8,652,849 B2 | 2/2014 | Childs et al. |
| 8,729,173 B2 | 5/2014 | Wang et al. |
| 8,871,831 B2 | 10/2014 | Huang et al. |
| 9,093,693 B2 | 7/2015 | Zhamu et al. |
| 9,410,020 B2 | 8/2016 | Matyjaszewski et al. |
| 2002/0169290 A1 | 11/2002 | Bornaes et al. |
| 2003/0004293 A1 | 1/2003 | Dvornic et al. |
| 2003/0216528 A1 | 11/2003 | Matyjaszewski et al. |
| 2004/0044152 A1 | 3/2004 | Matyjaszewski et al. |
| 2004/0152821 A1 | 8/2004 | Saegusa et al. |
| 2004/0171779 A1 | 9/2004 | Matyjaszewski et al. |
| 2005/0090632 A1 | 4/2005 | Matyjaszewski et al. |
| 2006/0008490 A1 | 1/2006 | Russell et al. |
| 2006/0258867 A1 | 11/2006 | Gibson et al. |
| 2007/0106012 A1 | 5/2007 | Matyjaszewski et al. |
| 2007/0155926 A1 | 7/2007 | Matyjaszewski et al. |
| 2007/0287681 A1 | 12/2007 | Jeong et al. |
| 2008/0002146 A1 | 1/2008 | Stachowski et al. |
| 2008/0004398 A1 | 1/2008 | Durrieu et al. |
| 2008/0114128 A1 | 5/2008 | Destarac et al. |
| 2008/0176040 A1 | 7/2008 | Ilfrey |
| 2009/0169725 A1 | 7/2009 | Zhamu et al. |
| 2009/0171024 A1 | 7/2009 | Jakubowski et al. |
| 2010/0196277 A1 | 8/2010 | DeSimone et al. |
| 2010/0249271 A1 | 9/2010 | Matyjaszewski et al. |
| 2011/0034625 A1 * | 2/2011 | Grassl et al. ............ C08F 2/58 524/561 |
| 2011/0060107 A1 | 3/2011 | Matyjaszewski et al. |
| 2011/0065875 A1 | 3/2011 | Matyjaszewski et al. |
| 2011/0091957 A1 | 4/2011 | Lele et al. |
| 2012/0077899 A1 | 3/2012 | Matyjaszewski et al. |
| 2012/0213986 A1 | 8/2012 | Matyjaszewski et al. |
| 2013/0011441 A1 | 1/2013 | Hollinger et al. |
| 2013/0131278 A1 | 5/2013 | Huang et al. |
| 2014/0275420 A1 | 9/2014 | Matyjaszewski et al. |
| 2015/0087795 A1 | 3/2015 | Matyjaszewski et al. |

FOREIGN PATENT DOCUMENTS

| | | | |
|---|---|---|---|
| CN | 1110681 A | 10/1995 | |
| CN | 1165828 A | 11/1997 | |
| DE | EP 2113519 A1 * | 11/2009 | ............ C08F 2/58 |
| EP | 0265091 A1 | 4/1988 | |
| EP | 0329873 B1 | 11/1989 | |
| EP | 0341012 A2 | 11/1989 | |
| EP | 0434438 A | 6/1991 | |
| EP | 0457916 A | 11/1991 | |
| EP | 0789036 A1 | 8/1997 | |
| EP | 0816385 A1 | 1/1998 | |
| EP | 0824110 A1 | 2/1998 | |
| EP | 0824111 A1 | 2/1998 | |
| EP | 0826698 A1 | 3/1998 | |
| EP | 0832902 A2 | 4/1998 | |
| EP | 0870809 A2 | 10/1998 | |
| EP | 0872493 A | 10/1998 | |
| EP | 0879832 A1 | 11/1998 | |
| EP | 0947527 A1 | 6/1999 | |
| EP | 0518225 B2 | 10/1999 | |
| EP | 1386935 A | 2/2004 | |
| EP | 1469020 A | 10/2004 | |
| EP | 1555273 A1 | 7/2005 | |
| EP | 2147067 | 11/2008 | |
| FR | 2777091 A1 | 10/1999 | |
| JP | 64-11114 A | 1/1989 | |
| JP | 6322171 A | 11/1994 | |
| JP | 2003-238609 A | 8/2003 | |
| JP | 2011-246620 A | 12/2011 | |
| WO | WO 88/00603 A3 | 1/1988 | |
| WO | WO 94/13706 A | 6/1994 | |
| WO | WO 96/30421 A1 | 10/1996 | |
| WO | WO 97/18247 | 5/1997 | |
| WO | WO 97/47661 A1 | 12/1997 | |
| WO | WO 98/01480 | 1/1998 | |
| WO | WO 98/06758 A1 | 2/1998 | |
| WO | WO 98/20050 A2 | 5/1998 | |
| WO | WO 98/40415 A | 9/1998 | |
| WO | WO 99/28352 A | 6/1999 | |
| WO | WO 00/22051 A1 | 4/2000 | |
| WO | WO 00/47634 A1 | 8/2000 | |
| WO | WO 00/56795 A1 | 9/2000 | |
| WO | WO 00/75198 | 12/2000 | |
| WO | WO 01/77197 A3 | 10/2001 | |
| WO | WO 01/92359 A1 | 12/2001 | |
| WO | WO 02/081372 A2 | 10/2002 | |
| WO | WO 03/097107 A | 11/2003 | |
| WO | WO 2004/041972 A | 5/2004 | |
| WO | WO 2004/060928 A | 7/2004 | |
| WO | WO 2004/087777 A2 | 10/2004 | |
| WO | WO 2005/056621 A1 | 6/2005 | |
| WO | WO 2005/087819 A1 | 9/2005 | |
| WO | WO 2005/116097 A1 | 12/2005 | |
| WO | WO 2007/021142 A1 | 2/2007 | |
| WO | WO 2007/025086 A2 | 3/2007 | |
| WO | WO 2007/025310 A1 | 3/2007 | |
| WO | WO 2007025310 A1 * | 3/2007 | |
| WO | WO 2007/059350 A2 | 5/2007 | |
| WO | WO 2007/075817 A1 | 7/2007 | |
| WO | WO 2008/009997 A1 | 1/2008 | |
| WO | WO 2008/057163 A2 | 5/2008 | |
| WO | WO 2008/148000 A1 | 12/2008 | |
| WO | WO 2009/023353 A9 | 2/2009 | |
| WO | WO 2009/065077 A1 | 5/2009 | |
| WO | WO 2009/108822 A1 | 9/2009 | |
| WO | WO 2009/111725 A1 | 9/2009 | |
| WO | WO 2009/132206 A1 | 10/2009 | |
| WO | WO 2009132884 A1 * | 11/2009 | |
| WO | WO 2010/096422 A1 | 8/2010 | |
| WO | WO 2010/111708 A1 | 9/2010 | |
| WO | WO 2010/131907 A2 | 11/2010 | |
| WO | WO 2012/034043 A1 | 3/2012 | |

(56) References Cited

FOREIGN PATENT DOCUMENTS

WO  WO 2012/091965 A1  7/2012
WO  WO 2013/063772 A1  5/2013

OTHER PUBLICATIONS

Nasser-Eddine, M., Delaite, C., Dumas, P., Vataj, R. and Louati, A., "Copper Removal in Atom Transfer Radical Polymerization through Electrodeposition." Macromol. Mater. Eng., (2004) 289: 204-207.*
Géraldine Coullerez, Anna Carlmark, Eva Malmström, and Mats Jonsson, "Understanding Copper-Based Atom-Transfer Radical Polymerization in Aqueous Media", The Journal of Physical Chemistry A 2004 108 (35), 7129-7131.*
Sung Chul Hong, Hyun-jong Paik, and, and Krzysztof Matyjaszewski, "An Immobilized/Soluble Hybrid Catalyst System for Atom Transfer Radical Polymerization" Macromolecules 2001 34 (15), 5099-5102.*
Bonometti et al. "Exploring the first steps of an electrochemically-triggered controlled polymerization sequence: Activation of alkyl- and benzyl halide initiators by an electrogenerated FeIISalen complex" Journal of Electroanalytical Chemistry 633 (2009) 99-105.*
Bonometti et al., "Exploring the First Steps of an Electrochemically-Triggered Controlled Polymerization Sequence: Activation of Alkyl- and Benzyl Halide Initiators by an Electrogenerated FeIISalen Complex," Journal of Electroanalytical Chemistry (no month, 2009), vol. 633, pp. 99-105.*
Hong et al., "An Immobilized/Soluble Hybrid Catalyst System for Atom Transfer Radical Polymerization," Macromolecules (no month, 2001), vol. 34, pp. 5099-5102.*
Huang et al., "A Novel Immobilized Cobalt(II)/Copper(II) Bimetallic Catalyst for Atom Transfer Radical Polymerization (ATRP) of Methyl Methacrylate," Applied Catalysis A: General (no month, 2007), vol. 332, pp. 192-199.*
Qiu et al., "Cyclic Voltammetric Studies of Copper Complexes Catalyzing Atom Transfer Radical Polymerization," Macromol. Chem. Phys. (no month, 2000), vol. 201, pp. 1625-1631.*
Nasser-Eddine et al., "Copper Removal in Atom Transfer Radical Polymerization Through Electrodeposition," Macromol. Mater. Eng. (no month, 2004), vol. 289, pp. 204-207.*
Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.
Jakubowski et al., "Activators Regenerated by Electron Transfer for Atom Transfer Radical Polymerization of Styrene," Macromolecules, 2006, 39, 39-45.
Qiu et al., Cyclic Voltammetric Studies of Copper Complexes Catalyzing Atom Transfer Radical Polymerization, Macromolecular Chemistry and Physics, 2000, pp. 1625-1631, vol. 201(14).
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Acar et al., Macromolecules 2000, 33, 7700-7706.
Anderegg et al., "Pyridine Derivatives as Complexing Agents XI. Thermodynamics of Metal Complex Formation with Bis-, Tris- and Tetrakisl(2-pyridyl)methyl]-amines", Helvetica Chimica Acta, 1977, 60(1), pp. 123-140.
Annenkov et al., Poly-C-vinyltetrazoles: A New Type of Polyacid, Journal of Polymer Science Part A: Polymer Chemistry, 1993, pp. 1903-1906, vol. 31(7).
Ashford et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.

Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123-139 (1991).
Baumann et al., Macromolecular Materials and Engineering (2000), 280/281, 1-6.
Bellus, Pure & Appl. Chem. 57, 1827 (1985).
Bledzki et al., Makromol. Chem. 184, 745 (1983).
Braunecker et al., Macromolecules 2005, 38, 4081.
Braunecker et al., Organometal Chem. 2005, 690, 916.
Brittain et al., Makromol. Chem., Macromol. Symp. 67, pp. 373-386 (1993), "Termination Processes in Group Transfer Polymerization".
Buback et al. (1995) Macromol. Chem. Phys. 196, 3267-80.
Buback et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol-succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley-VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.
Cohen et al., Inorg. Chem. 13, 2434 (1974).
Collman et al., "Clicking" Functionality onto Electrode Surfaces, Langmuir, 2004, pp. 1051-1053, vol. 20.
Curran, et al., "Radical Addition Reactions", Comprehensive Organic Synthesis, Pergamon: Oxford vol. 4, p. 715-777 (1991).
Curran et al., J. Am. Chem. Soc. 116, 4279 (1994).
Curran et al., J. Org. Chem., 54, 3140 (1989).
Curran, "The Design and Application of Free Radical Chain Reactions in Organic Synthesis Part 2," Synthesis, pp. 489-513 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2002, pp. 2113-2116, vol. 41(12).
Desmarquest et al., Electrochim. Acta (1968), 13, 1109-1118.
Dreezen et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079-6082 (1991).
Endo et al., Macromolecules, 25, 5554-5556 (1992).
Feng, "Synthesis and Free Radical Polymerization of 2-oxo-3-methylene-5-phenyl-1,4-dioxan", Chinese Journal of Polymer Science, 1993, 11, 2, pp. 153-157.
Fischer et al., Acc. Chem. Res. 20, 200-206 (1987).
Fischer, H., Chem. Rev. 2001, 101, 3581-3610.
Frackowiak et al., "Supercapacitor electrodes from multiwalled carbon nanotubes", Applied Physics Letters, 77, pp. 2421-2423 (2000).
Fukuda et al, Chem. Letters, 1996, 4, 293.
Fukuda et al., Macromolecules, 1996, 29, 3050.

(56) References Cited

OTHER PUBLICATIONS

Gabaston et al., "Synthesis of water soluble homopolymers and block copolymers by living free-radical polymerization", Polymr Preprints (American Chemical Society, Division of Polymer Chemistry), 38(1), pp. 719-720 (1997).
Gaynor et al., Polym. Prep. (Am. Chem. Soc. Polym. Chem. Div.), 36(1), 467 (1995).
Georges et al., Macromolecules 1993, 26, 2987.
Georges et al., Macromolecules 1994, 27, 7228.
Georges et al., Macromolecules, 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta et al., Macromolecules, 27, 638-644 (1994).
Gromada et al., Simultaneous Reverse and Normal Initiation in Atom Transfer Radical Polymerization, Macromolecules, 2001, pp. 7664-7671, 34(22).
Haddleton et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker et al., Macromolecules, 1996, 29, 2686.
Hayes et al., J. Am. Chem. Soc. 110, 5533 (1988).
Hedrick et al., (Dendrimer-like Star Block and Amphiphlic Copolymers by Combination of Ring Opening and Atom Transfer Radical Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao et al., J. Synth. Org. Chem. (Japan), 52(3), 197 (1994).
Hirao et al., Syn. Lett. 217 (1990).
Hong et al., "Synthesis of water-soluble fluorine-containing block copolymers by atom transfer radical polymerization", 25(4), 302 (2001).
Hovestad et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal et al., Chem. Rev. 94, 519 (1994).
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.
Jian et al., Mesoporous carbons with self-assembled high-activity surfaces, Air Force Research Laboratory [Report], Jul. 7, 2006. [Retrieved from http://www.dtic.mil, Search ADA461480].
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato et al., Macromolecules, 28, 1721 (1995).
Kawaguchi et al., "Dispersion Polymerization", in Polymer Particles, Masayoshi Okubo, ed., Adv. Polym. Sci., 2005, 175, 299-328.
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kosower, E.M., Acc Chem. Res. (1971), 4, 193-198.
Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari et al., Macromolecular Chemistry and Physics (2005), 206, 1382-1388.
Leduc et al., Dendritic initiators for "Living" Radical Polymerizations: A Versatile Approach to the Synthesis of Dendritic-Linear Block Copolymers, J. Am. Chem. Soc. Jun. 26, 1996, 118, 11111.
Lee et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).
Lewis et al., Copolymerization VII, Copolymerization of Some Further Monomer Pairs, Apr. 1948, pp. 1527-1529.
Li et al., "Highly ordered carbon nanotube arrays for electronics applications", Applied Physics Letters, 75 pp. 367-369 (1999).
Li et al., ASC Polym. Preprints, 1995, 36(1), 469.
Lingane, "Interpretation of the Polarographic Waves of Complex Metal Ions," Chem. Rev. 1941, 29, 1.
Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.
Majoral et al., Dendrimers Containing Heteroatoms (Si, P, B, Ge, or Bi), Chemical Reviews, 1999, pp. 845-880, vol. 99(3).
Makino et al., Controlled Atom Transfer Radical Polymerizations of Methyl Methacrylate Under Micellar Conditions, Polymer Preprints, 1988, pp. 288-289, vol. 39(1).
Mao et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).
Maraval et al., "Lego" Chemistry for the Straightforward Synthesis of Dendrimer, Journal of Organic Chemistry, 2003, pp. 6043-6046, vol. 68(15).
Mardare et al., ACS Polymer Preprints 35(1), 778 (1994).
Mardare et al., Macromolecules, 27, 645 (1994).
Mardare et al., Polym. Prep. (ACS), 36(1), 700-701 (1995).
Marestin et al., Nitroxide Mediated Living Radical Polymerization of Styrene in Emulsion, Macromolecules, 1998, pp. 4041-4044, vol. 31(12).
Matsumoto et al., Synth. Commun. (1985) 15, 515.
Matthews et al., Dendrimers-Branching out from Curiosites into New Technologies, Progress in Polymer Science, 1998, pp. 1-56, vol. 23.
Wang et al., Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.

(56) References Cited

OTHER PUBLICATIONS

Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.
Matyjaszewski et al., "Controlled/Living Radical Polymerization. Kinetics of the Homogeneous Atom Transfer Radical Polymerization of Styrene," J. Am. Chem. Soc., 1997, 119, 674-680.
Matyjaszewski et al., "Atom transfer radical polymerization", Chemical Reviews, 2001, 101, (9), 2921-2990.
Matyjaszewski et al., Controlled/"Living" Radical Polymerization of Styrene and Methly Methacrylate Catalyzed by Iron Complexes1, Macromolecules, 1997, pp. 8161-8164, vol. 30(26).
Matyjaszewski et al., Controlled/Living Radical Polymerization: State of the Art in 2005, in Controlled Radical Polymerization: From Synthesis to Materials, American Chemical Society Division of Polymer Chemistry, 2006, Chapter 1, pp. 2-12, vol. 944.
Matyjaszewski et al., Zerovalent Metals in Controlled/"Living" Radical Polymerization, Macromolecules, 1997, pp. 7348-7350, vol. 30(23).
Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.
Matyjaszewski, "Radical Nature of Cu-Catalyzed Controlled Radical Polymerizations (Atom Transfer Radical Polymerization)," Macromolecules, 1998, 31, 4710-4717.
Matyjaszewski, K., "Overview: Fundamentals of Controlled/Living Radical Polymerization," American Chemical Society, publication date: Jan. 8, 1998, pp. 2-30, downloaded on Sep. 2, 2009, http://pubs.acs.org.
Matyjaszewski et al., Macromolecules 34, 5125 (2001).
Matyjaszewski et al., Tetrahedron (1997), 53, 15321-15329.
McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.
Min et al, "Atom Transfer Radical Dispersion Polymerization of Styrene in Ethanol", Macromolecules, ACS, Washington, DC, US, vol. 40, No. 20, (Oct. 2, 2007), pp. 7217-7221.
Mitani et al., J. Am Chem. Soc. 105, 6719 (1983).
Nagashima, J. Org. Chem. 57, 1682 (1992).
Nagashima, J. Org. Chem. 58, 464 (1993).
Navon et al., Inorg. Chem. 1999, 38, 3484.
Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).
Odell et al., Macromolecules, 1995, 28, 8453.
Odian, Principles of Polymerization, Third Edition, John Wiley & Sons, p. 205-233 (1991).
Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.
Orochov et al., J. Chem. Soc., Perkin II, 1000 (1973).
Orr, Thermochemical Aspects of Butadiene-Styrene Copolymerization, 1960, pp. 74-82.
Otsu et al., Chem. Express 5(10), 801 (1990).
Otsu et al., Synthesis, Reactivity, and Role of—Vinylbenzyl N,N-Diethyldithiocarbamate as a Monomer-Iniferter in Radical Polumerization, Macromolecules, 1986, pp. 287-290. vol. 19(2).
Pakula et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.
Paoletti et al., Inorg. Chem. 1967, 6, 64.
Paoletti et al., Inorg. Chim. Acta Rev. 1973, 7, 43.

Patten et al., Atom Transfer Radical Polymerization and the Synthesis of Polymeric Materials, Advanced Materials, 1998, pp. 901-915, vol. 10(12).
Patten et al., "Polymers with very low polydispersities from atom transfer radical polymerization", Science (Washington, D. C.), 1996, 272, (5263), 866-868.
Percec et al., "Living" Radical Polymerization of Styrene Initiated by Arenesulfonyl Chlorides and Cu1(bpy)nCI, Macromolecules, 1995, pp. 7970-7972, vol. 28(23).
Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).
Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.
Punna et al., Click Chemistry in Polymer Synthesis, Polymer Preprints, 2004, pp. 778-779, vol. 45(1).
Puts et al., Macromolecules, 1996, 29, 3323.
Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.
Quirk et al., Makromol. Chem., Macromol. Symp. 67, pp. 351-363 (1993), "Mechanistic Aspects of Group Transfer Polymerization".
Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.
S.A.F. Bon et al., Controlled Radical Polymerization in Emulsion, Macromolecules, 1997, pp. 324-326, vol. 30(2).
Samuni et al., "On the cytotoxicity of vitamin C and metal ions," European Journal of Biochemistry, 1983, 137. 119-124.
Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.
Schulz & Milkovich, Relative Reactivities and Graft Distributions of Polystyrene Macromers in Vinyl Chloride Copolymerization, Polymer International, 1994, pp. 141-149, Great Britain.
Seijas et al., Tetrahedron, 48(9), 1637 (1992).
Shen et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.
Srivastava et al., J. Inorg. Nucl. Chem. (1980), 42, 47.
Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).
Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.
Takeichi et al., Preparation of Porous Carbon Films by the Pyrolysis of Poly(Urethane-imide) Films and Their Pore Characteristics, Carbon, 2001, pp. 257-265, vol. 39(2).
Tang, et al., J. Am. Chem. Soc., 128, 1598-1604.
Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.
Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).

(56) References Cited

OTHER PUBLICATIONS

Udding et al., J. Org. Chem. 59, 1993 (1994).
Van Gaal et al., "Trends in Redox Potentials of Transition Metal Complexes," Coord. Chem. Rev. 1982, 47, 41.
Veregin et al., Macromolecules, 1996, 29, 4161.
Vidts et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).
Vlcek, "Ligand Based Redox Series," Coord. Chem. Rev. 1982, 43, 39.
Von Werne et al., Preparation of Structurally Well-Defined Polymer-Nanoparticle Hybrids with Controlled/living Radical Polymerizations—J. Am. Chem. Soc. 1999, 121, 7409-7410.
Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.
Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).
Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).
Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.
Wang et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.
Wang et al., J. Am. Chem. Soc. (1992), 114, 248-255.
Wang et al., Polym. Prep. (Am. Chem. Soc. Polym. Chem. Div.), 36(1), 465 (1995).
Wayland et al., Am. Chem. Soc., 116, 7943 (1994).
Webster, Living Polymerization Methods, Science, 1991, pp. 887-893, vol. 25.
Webster, Makromol. Chem., Macromol. Symp. 67, pp. 365-371 (1993), "Mechanism of GTP: Can all of the Available Data be Accommodated?".
Wei et al., Atom Transfer Radical Polymerization of Styrene in the Presence of Iron Complexes, Polymer Preprints, 1997, pp. 231, vol. 38(2).
Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).
Xia et al., Controlled/"Living" Radical Polymerization. Homogenous Reverse Atom Transfer Radical Polymerization Using AIBN as the Initiator, Macromolecules, 1997, pp. 7692-7696, vol. 30.
Xia et al., "Atom Transfer Radical Polymerization of 4-Vinylpyridine", Macromolecules, pp. 3531-3533 (1999).
Zeng et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).
Gaynor et al., Macromolecules 1998, 31, 5951-5954.
Chambard et al., Macromol. Symp. 2000, 150, 45-51.
Li et al., Macromolecules 2004, 37, 2106-2112.
Min et al., J. Am. Chem. Soc. 2005, 127, 3825-3830.
Min et al., J. Polym. Sci., Part a: Polym. Chem. 2005, 43, 3616-3622.
Antonietti et al., Macromolecules, 1991, 24: 6636-6643.
Feng et al., "The Preparation of Micropolystyrene Particles by Controlled Microemulsion Polymerization", Polymer Materials Science and Engineering, Jul. 2005, vol. 21, No. 4, 117-120.
Feng, et al., J. Appl. Polym. Sci., 2006, 99 1093-1099.
Min et al., Macromolecules 2005, 38, 8131-8134.
Nicolas et al., Macromolecules 2005, 38, 9963-9973.
Ferguson et al., Macromolecules 2005, 38, 2191-2204.
Gilbert et al., Macromolecular Symposia 2006, 231, 84-93.
Chow et al., Adv. Polym. Sci. 2005, 175, 257-298.
Chow et al., Langmuir 1999, 15, 3202-3205.
El-Safty et al., Chem. Mater. 2005, 17, 3137-3145.
Stoffer et al., J. Polym. Sci. Polym. Chem. Ed. 1980, 18, 2641-2648.
Ferrick et al., Macromolecules 1989, 22, 1515-1517.
Kuo et al., Photoinitiated Polymerization of Styrene in Microemulsions, Macromolecules, 1987, 20, pp. 1216-1221.
Jakubowski et al., Macromolecules 2005, 38, 4139-4146.
Antonietti et al., Macromol. Chem. Phys. 1995, 196, 441-466.
Guo et al., J. Polym. Sci., Part A: Polym. Chem. 1989, 27, 691-710.
Cramer, W. Proc. Chem. Soc. 1914, 30, 293.
Reiner et al., Baskerville Chemical Journal 1953, 4, 15-17.
Singh et al., Zeitschrift fuer Physikalische Chemie (Leipzig) 1957, 207, 198-204.
Parris et al., Discussions of the Faraday Society 1960, 240-247.
Weiss et al., Inorg. Chem. 1964, 3, 1344-1348.
Maeda et al., J. Adv. Polym. Sci. 2006, 193, 103-121.
Brown et al., Nature Rev. Cancer 2004, 4, 437-447.
Khelfallah et al., "Synthesis of New PHEMA/PEO Enzymatically Biodegradable Hydrogel", Macromolecular Rapid Communications, 2006, 27, 1004-1008.
Huang, X and T. L. Lowe, "Biodegradable Thermoresponsive Hydrogels for Aqueous Encapsulation and Controlled Release of Hydrophilic Model Drugs", Biomacromolecules, 2005, 6, 2131-2139.
Houk, J. and G. M. Whitesides, "Structure-Reactivity Relations for Thiol-Disulfide Interchance", J. Am. Chem. Soc., 1987, 109, 6825-6836.
Tsarevsky et al., Chapter VI: Synthesis of Well-Defined Polymeric Materials with Diuslfide and Thiol Groups, Their Further Functionalization, and Reversible Cleavage/Coupling Via Redox Processes: Towards functional (Bio)Degradable Materials, Thesis, Carnegie Mellon University, pp. 249-311 (2005).
Li et al., Angew Chem. Int. Ed. 2006, 45, 3510-3513.
Li et al., "Synthesis of Reversible Shell Cross-Linked Micelles for Controlled Release of Bioactive Agents", Macromolecules, 2006, 39, 2726-2728.
Gao et al., "Synthesis of Degradable Miktoarm Star Sopolymers via Atom Transfer Radical Polymerization", Macromolecules, vol. 38, pp. 5995-6004 (2005).
Schafer et al., Free Radical Biol. Med. 2001, 30, 1191-1212.
Medicinal Research Reviews, 2002, 22, 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129 (18): 5939-5945.
Barrett, K.E. et al., J. Polym. Sci., Polym. Chem. Ed. 1969, 7, 2621.
Tseng, C.M. et al., J. Polym. Sci., Part A: Polym. Chem. 1986, 24, 2995.
El-Aasser, M.S. et al., J. Polym. Sci., Part A: Polym. Chem. 1996, 34, 2633.
Kawaguchi et al., Adv. Polym. Sci., 2005, 175, 299.
LaMer, V.K. et al., J. Am. Chem. Soc. 1950, 72, 4847.
Yang, W. et al., J. Polym. Sci., Part A: Polym. Chem. 2001, 39, 555.
Song, J. et al., J. Am. Chem. Soc. 2004, 126, 6562.
Song, J. and M. A. Winnik, "Cross-Linked, Monodisperse, Micro-Sized Polystyrene Particles by Two-Stage Dispersion Polymerization," Macromolecules, vol. 38, pp. 8300-8307 (2005).
Song, J. et al., 2006, 39, 8318-8325.

(56) References Cited

OTHER PUBLICATIONS

Holderle, M. et al., Macromolecules 1997, 30, 3420.
Gabaston et al., Macromolecules 1998, 31, 2883.
Shim, S.E. et al., S. Polymer 2003, 44, 5563.
Min, K. et al., "Development of an ab Initio Emulsion Atom Transfer Radical Polymerization: From Microemulsion to Emulson." J. Am. Chem. Soc. 2006, 128(32), 10521-10526.
Min, K. et al., "Atom Transfer Radical Dispersion Polymerization of Styrene in Ethanol" Polymer Preprints, 2007, 48 (2), 260-261.
Patil et al., Surface-modified and Internally cationic polyamidoamine dendrimers for efficient siRNA delivery, 2008, Bioconjugate Chemistry, vol. 19, pp. 1396-1403.
Zhang, Chi, Transcriptional regulation of bone formation by the osteoblast-specific transcription factor Osz, 2010, Journal of Orthopaedic Surgery and Research, vol. 5:37, pp. 1-8.
Yan et al., Axin2 controls bone remodeling through the beta-catenin-BMP signaling pathway in adult mice, 2009, Journal of Cell Science, vol. 122, pp. 3566-3578.
Akhtar et al., "Toxicogenomics of non-viral drug delivery systems for RNAi: Potential impact on siRNA-mediated gene silencing activity and specificity", Adv. Drug Delivery Rev., 2007, 59, (2-3), 164-182.
Bencherif et al., "End-group effects on the properties of PEG-co-PGA hydrogels", Acta Biomater, 2009, 5(6): 1872-1883.
Bencherif et al., "Influence of cross-linker chemistry on release kinetics of PEG-co-PGA hydrogels", J. Biomed. Mater. Res., Part A, 2009, 90A(1): 142-153.
Bencherif et al., "Cell-Adhesive Star Polymers Prepared by ATRP", Biomacromolecules, 2009, (10), 1795-1803.
Bencherif et al., "Influence of the degree of methacrylation on hyaluronic acid hydrogels properties", Biomaterials, 2008, 29, (12), 1739-1749.
Bencherif et al., "Nanostructured hybrid hydrogels prepared by a combination of atom transfer radical polymerization and free radical polymerization", Biomaterials, 2009, 30, (29), 5270-5278.
Bencherif et al., "Synthesis by AGET ATRP of Degradable Nanogel Precursors for In Situ Formation of Nanostructured Hyaluronic Acid Hydrogel", Biomacromolecules, 2009, 10, (9), 2499-2507.
Birukova et al., "ALK5 and Smad4 are involved in TGF-beta1-induced pulmonary endothelial permeability", FEBS Letters, 2005, 579(18): 4031-4037.
Bober et al., "Delivery of siRNA using cationic star polymers to suppress runt related transcription factor 2 and osterix in vitro", 34th Annual Meeting of the Society for Biomaterials 2010, Giving Life to a World of Materials, Seattle, Washington, USA, Apr. 21-24, 2010, vol. 2 of 2, 579.
Braunecker, W. A. and K. Matyjaszewski, "Controlled/living radical polymerization: Features, developments, and perspectives". [Erratum to document cited in CA147:486671], Progress in Polymer Science, 2008, 33, (1), 165.
Braunecker, W. and K. Matyjaszewski, "Controlled/living radical polymerization: Features, developments, and perspectives", Progress in Polymer Science, 2007, 32, (1), 93-146.
Brekke, J. H., and Kipling Thacker, "Hyaluronan as a Biomaterial", An Introduction to Biomaterials, The Biomedical Engineering Series, 2006, 219-240.
Chaturvedi, et al., "Noggin maintains pluripotency of human embryonic stem cells grown on Matrigel", Cell Prolif, Aug. 2009, 42, (4), 425-433.
Cho et al., "Synthesis of Biocompatible PEG-Based Star Polymers with Cationic and Degradable Core for siRNA Delivery", Biomacromolecules: 12(10): 3478-3486.
Cho et al., "Preparation of Poly(ethylene glycol) Star Copolymers with a Cationic Core for siRNA Delivery by ATRP", Polym. Prepr., (Am. Chem. Soc., Div. Polym. Chem.), 2011, 52(2): 608-609.
Cho et al., "Rapid Cellular Internalization of Multifunctional Star Polymers Prepared by Atom Transfer Radical Polymerization", Biomacromolecules, 2010, 11 (9): 2199-2203.
Coessens et al., "Functional polymers by atom transfer radical polymerization", Progress in Polymer Science, 2001, 26, (3), 337-377.
Colla et al., "Human myeloma cells express the bone regulating gene Runx2/Cbfa1 and produce osteopontin that is involved in angiogenesis in multiple myeloma patients", Leukemia, 2005, 19, (12), 2166-2176.
Demetriou, et al., "Fetuin/alpha2-HS glycoprotein is a transforming growth factor-beta type II receptor mimic and cytokine antagonist", J Biol Chem, 1996, 271, (22), 12755-12761.
Dong, Hongchen and Krzysztof Matyjaszewski, "ARGET ATRP of 2-(Dimethylamino)ethyl Methacrylate as an Intrinsic Reducing Agent", Macromolecules, 2008, 41, 6868-6870.
Duncan et al., "Dendrimer biocompatibility and toxicity", Adv. Drug Delivery Rev., 2005, 57, (15), 2215-2237.
Duncan et al., "Polymer therapeutics: polymers as drugs, drug and protein conjugates and gene delivery systems: past, present and future opportunities", Adv. Polym. Sci., 2006, 192, (Polymer Therapeutics I), 1-8.
El-Aneed, A., "An overview of current delivery systems in cancer gene therapy", J. Controlled Release, 2004, 94, (1), 1-14.
Fukuda et al., Generation of a mouse with conditionally activated signaling through the BMP receptor, ALK2, Genesis, 2006, 44, (4), 159-167.
Gao, H. and K. Matyjaszewski, "Synthesis of functional polymers with controlled architecture by CRP of monomers in the presence of cross-linkers: From stars to gels", Prog. Polym. Sci., 2009, 34, (4), 317-350.
Gilmore et al., "The design and exogenous delivery of siRNA for post-transcriptional gene silencing", Journal of Drug Targeting, 2004, 12, (6), 315-340.
Goldring, M. B. and S. R. Goldring, "Skeletal tissue response to cytokines", Olin Orthop Relat Res, 1990, (258), 245-278.
Guimaraes, M. and P. Mourao, "Urinary excretion of sulfated polysaccharides administered to Wistar rats suggests a renal permselectivity to these polymers based on molecular size", Biochim. Biophys. Acta, Gen. Subj., 1997, 1335, (1-2), 161-172.
Gupta et al., "Hydrogels: from controlled release to pH-responsive drug delivery", Drug Discov Today, 2002, 7, (10), 569-579.
Hammond, et al., "An RNA-directed nuclease mediates post-transcriptional gene silencing in Drosophila cells", Nature, 2000, 404, (6775), 293-296.
Hartwell, R. et al., "A Novel Nydrogel-Collagen Composite Improves Functionality of an Injectable Extracellular Matrix", Acta Biomaterialia, 7, 2011, 3060-3069.
Hawker et al., "New polymer synthesis by nitroxide mediated living radical polymerizations", Chem Rev, 2001, 101, (12), 3661-3688.
Heath et al., "Charged polymers via controlled radical polymerization and their implications for gene delivery", Macromol. Chem. Phys., 2007, 208, (12), 1243-1249.
Heggli et al., "Michael-type addition as a tool for surface functionalization", Bioconjugate Chem., 2003, 14, (5), 967-973.
Heldin et al, "TGF-beta signalling from cell membrane to nucleus through SMAD proteins", Nature, 1997, 390, (6659), 465-471.
Hiemstra et al., "Rapidly in situ-forming degradable hydrogels from dextran thiols through michael addition", Biomacromolecules, 2007, 8, (5), 1548-1556.
Hong et al., "TAZ, a transcriptional modulator of mesenchymal stem cell differentiation", Science, 2005, 309, (5737), 1074-1078.
Hong, et al., "Post-transcriptional gene silencing using siRNA delivered from star nanostructured polymer", Abstracts/Bone, 46, S9-S83, accepted for society for Biomaterials, Seattle, WA, Apr. 21-24, 2010, S49-S50.
Ikeda et al., "The promyelotic leukemia zinc finger promotes osteoblastic differentiation of human mesenchymal stem cells as an upstream regulator of CBFA1", J. Biol. Chem., 2005, 280(9): 8523-8530.
Ikeda et al., "Identification of FAZF as a novel BMP2-induced transcription factor during osteoblastic differentiation", J Cell Biochem, 2007, 101, (1), 147-154.
Iorio, R. et al., "Heterotopic ossification after hip and knee arthroplasty: risk factors, prevention, and treatment", J Am Acad Orthop Surg, 2002, 10, (6), 409-416.

(56) References Cited

OTHER PUBLICATIONS

Jazag et al., "Single small-interfering RNA expression vector for silencing multiple transforming growth factor-beta pathway components", Nucleic Acids Research, 2005, 33(15): e131, 1-9.
Kim et al., "Inhibition of ocular angiogenesis by siRNA targeting vascular endothelial growth factor pathway genes: therapeutic strategy for herpetic stromal keratitis", Am J Pathol, 2004, 165, (6), 2177-2185.
Li et al., "A New Class of Biochemically Degradable, Stilumus-Responsive Triblock Copolymer Gelators", Agnew. Chem. Int. Ed., 2006, 45, 3510-3513.
Lowe, A. and C. McCormick, "Reversible addition-fragmentation chain transfer (RAFT) radical polymerization and the synthesis of water-soluble (co)polymers under homogeneous conditions in organic and aqueous media", Prog. Polym. Sci., 2007, 32, (3), 283-351.
Ma et al., "Structural basis for overhang-specific small interfering RNA recognition by the PAZ domain", Nature (London, U. K.), 2004, 429, (6989), 318-322.
Matyjaszewski et al., "Simple and Efficient Synthesis of Various Alkoxyamines for Stable Free Radical Polymerization", Macromolecules, 1998, 31, (17), 5955-5957.
McCarthy, E.F. and M. Sundaram, "Heterotopic ossification: a review", Skeletal Radiol, 2005, 34: 609-619.
Merkel et al., "Stability of siRNA polyplexes from poly(ethylenimine) and poly(ethylenimine)-g-poly(ethylene glycol) under in vivo conditions: Effects on pharmacokinetics and biodistribution measured by Fluorescence Fluctuation Spectroscopy and Single Photon Emission Computed Tomography (SPECT) imaging", J. Controlled Release, 2009, 138, (2), 148-159.
Murakami et al., "A WW domain protein TAZ is a critical coactivator for TBX5, a transcription factor implicated in Holt-Oram syndrome", PNAS, USA, 2005, 102(50): 18034-18039.
Naik et al., "Gene delivery to the retina: focus on non-viral approaches", Drug Discovery Today, 2009, 14, (5/6), 306-315.
Nakao et al. "Identification of Smad7, a TGFβ-inducible antagonist of TGF-β signalling", Nature, vol. 389, Oct. 9, 1997, 631-635.
Oh et al., "Synthesis and Biodegradation of Nanogels as Delivery Carriers for Carbohydrate Drugs", Biomacromolecules, 2007, 8, (11), 3326-3331.
Oh et al., "The development of microgels/nanogels for drug delivery applications", Progress in Polymer Science, 2008, 33, (4), 448-477.
Ohyama et al., "Spaciotemporal association and bone morphogenetic protein regulation of sclerostin and osterix expression during embryonic osteogenesis", Endocrinology, 2004, 145, (10), 4685-4692.
Park et al., "Photo-Cross-Linkable Thermoresponsive Star Polymers Designed for Control of Cell-Surface Interactions", Biomacromolecules, 2010, 11(10): 2647-2652.
Parkinson et al., "Radiation therapy in the prevention of heterotopic ossification after total hip arthroplasty", Hip, 1982, 211-227.
Reddi, et al., "Biochemical sequences in the transformation of normal fibroblasts in adolescent rats", Proc Natl Acad Sci USA, 1972, 69, (6), 1601-5.
Saina et al., "BMPs and chordin regulate patterning of the directive axis in a sea anemone", Proc Natl Acad Sci USA, 2009, 106, (44), 18592-18597.
Shen, Y., "Advances in the development of siRNA-based therapeutics for cancer", IDrugs, 2008, 11(8): 572-578.
Shore et al., "A recurrent mutation in the BMP type I receptor ACVR1 causes inherited and sporadic fibrodysplasia ossificans progressiva", Nature Genetics, 2006, 38, (5), 525-527.
Shore et al., "Insights from a rare genetic disorder of extra-skeletal bone formation, fibrodysplasia ossificans progressiva (FOP)", Bone, 2008, 43, (3), 427-433.
Sieber et al., "Recent advances in BMP receptor signaling", Cytokine Growth Factor Rev, 2009, 20, (5-6), 343-355.
Siegwart et al., "Solvent induced morphologies of poly(methyl methacrylate-b-ethylene oxide-b-methyl methacrylate) triblock copolymers synthesized by atom transfer radical polymerization," Polymer, 2007, 48(25): 7279-7290.
Siegwart et al., "Biotin-, Pyrene-, and GRGDS-functionalized polymers and nanogels via ATRP and end group modification", Macromol. Chem. Phys., 2008, 209, (21), 2179-2193.
Siegwart et al., "Cellular uptake of functional nanogels prepared by inverse miniemulsion ATRP with encapsulated proteins, carbohydratesmand gold nanoparticles, Biomacromolecules", 2009, 10, (8), 2300-2309.
Siegwart et al., "Synthesis, characterization, and in vitro cell culture viability of degradable poly(N-isopropylacrylamide-co-5,6-benzo-2-methylene-1,3-dioxepane)-based polymers and crosslinked gels", Journal of Biomedical Materials Research, Part A, 2008, 87 A, (2), 345-358.
Srinivasan et al., "Delivery of siRNA Using Cationic Nanostructured Star Polymers to Prevent Myoblast Cell Differentiation to Bone", Carnegie Mellon University, Pittsburgh, Pennsylvania, Dec. 2010, 1 page.
Thomas et al., "Progress and problems with the use of viral vectors for gene therapy", Nat. Rev. Genet., 2003, 4, (5), 346-358.
Turner et al., "RNA targeting with peptide conjugates of oligonucleotides, siRNA and PNA", Blood Cells Mol Dis, 2007, 38, (1), 1-7.
Urist, M. R., "The search for and discovery of bone morphogenetic protein (BMP)," Bone Grafts, Derivatives and Substitutes, Butterworth: London, 1994, 315-362.
Van Ooij et al., "Surgical removal of debilitating neurogenic heterotopic ossifications of the hip". Ned Tijdschr Geneeskd, 2005, 149, (1), 37-41. English abstract.
Vanden Bossche, L. and G. Vanderstraeten, "Heterotopic ossification: a review", J Rehabil Med, 2005, 37, (3), 129-136.
Wang et al., "Delivery of siRNA Therapeutics: Barriers and Carriers", The AAPS Journal, 2010, 12(4): 492-503.
Wang et al., "p53 functions as a negative regulator of osteoblastogenesis, osteoblast-dependent osteoclastogenesis, and bone remodeling", J Cell Biol, 2006, 172(1): 115-125.
Wordinger et al., "Focus on molecules: gremlin", Exp Eye Res, 2008, 87, (2), 78-79.
Xia et al., "Repulsive guidance molecule RGMa alters utilization of bone morphogenetic protein (BMP) type II receptors by BMP2 and BMP4", J Biol Chem, 2007, 282(25): 18129-18140.
Yagi et al., "Bcl-2 positively regulates Sox9-dependent chondrocyte gene expression by suppressing the MEK-ERK1/2 signaling pathway", J Biol Chem, 2005, 280, (34), 30517-30525.
Yan et al., "Regulation of TGF-beta signaling by Smad7", Acta Biochim Biophys Sin (Shanghai), 2009, 41, (4), 263-272.
Yu et al., "BMP type I receptor inhibition reduces heterotopic [corrected] ossification", Nat Med, 2008, 14, (12), 1363-1369.
Zelikin et al., "Disulfide Cross-Linked Polymer Capsules: En Route to Biodeconstructible Systems", Biomacromolecules, 2006, 7, 27-30.
Zhang, et al., "The bone morphogenetic protein signaling pathway is upregulated in a mouse model of total parenteral nutrition", J Nutr, 2009, 139, (7), 1315-1321.
Pyun et al., "Synthesis of Well-Defined Block Copolymers Tethered to Polysilsequioxane Nanoparticles and their Nanoscale Morphology on Surfaces", J. Am. Chem. Soc. 123, 9445-9446 (2001).
Pyun et al., Supporting Information, J. Am. Chem. Soc., 51-58 (2001).
Pyun et al., "Synthesis of Nancomposite Organic/Inorganic Hybrid Materials Using Controlled/'Living' Radical Polymerization," Chem. Mater. 13, 3436-3448 (2001).
Pyun et al., "Synthesis of Polymer Brushes Using Atom Transfer Radical Polymerization", Macromol. Rapid Commun. 24, 1043-1059 (2003).
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films", Macromolecules 36, 5094-5104 (2003).
Matyjasewski et al., Chapter 17 Organic-Inorganic Hybrid Polymers from Atom Transfer Radical Polymerization and Poly(dimethylsiloxane), Am. Chemical Soc. Symposia. 270-283 (2000).

(56) References Cited

OTHER PUBLICATIONS

Pyun et al. "Organic/Inorganic Hybrid Materials from Polysiloxanes and Polysilsesquioxanes Using Controlled/Living Radical Polymerization", Manuscript submitted for Publication Jan. 12, 2007.
Bombalski et al., "Quasi-transparent Hybrid Particles Using Atom Transfer Radical Polymerization", Polymeric Materials: Science & Engineering 97, 327 (2007).
Bockstaller et al., "Block Copolymer Nanocomposites: Perspectives for Tailored Functional Materials", Adv. Mater. 17, 1331-1349 (2005).
Bombalski et al., "Null-Scattering Hybrid Particles Using Controlled Radical Polymerization", Adv. Mater. 19, 4486-4490 (2007).
Bouvier-Fontes et al., "Seeded Semicontinuous Emulsion Copolymerization of Butyl Acrylate with Cross-Linkers", Macromolecules 38, 1164-1171 (2005).
Kirsch et al., "Control of Particle Morphology and Film Structures of Carboxylated Poly(Methyl Methacrylate)/Poly(n-Butylacrylate) Composite Latex Particles", Journal of Appliled Polymer Science, vol. 91, 2610-2623 (2004).
Kirsch et al., "Control of Particle Morphology and Film Structures of Carboxylated Poly(N-Butylacrylate)/Poly(methyl) Composite Latex Particles", Colloids and Surfaces, A Physicochemical and Engineering Aspects, 183-185, 725-737 (2001).
Garnett, "Colours in Metal Glasses and in Metallic Films", Phil. Trans. R. Soc. Lond. A. 203, 385-420 (1904).
Garnett, "Colours in Metal Glasses, in Metallic Films, and in Metal Solutions II", Phil. Trans. R. Soc. Lond. A. 205, 237-288 (1906).
Baysal, et al., Styrene Polymerization with a Macroinitiator Having Siloxane Units, Journal of Applied Polymer Science, May 31, 1996, vol. 60, 1369-1378.
Gaynor et al., "Synthesis of Branched and Hyperbranched Polystyrenes", Macromolecules, 1996, 29, 1079-1081.
Ando et al., "Living Radical Polymerization of Methyl Methacrylate with Ruthenium Complex: Formation of Polymers with Controlled Molecular Weights and Very Narrow Distributions", Macromolecules, 1996, 29, 1070-1072.
Ishizu et al., "Synthesis of star polymers by organized polymerization of macromonomers", *Polymer*, vol. 36, pp. 4155-4157 (1995).
Mirica et al., "Structure and Spectroscopy of Copper-Dioxygen Complexes", Chem. Rev. 2004, 104, 1013-1045.
Bouix et al., "Synthesis of amphiphilic polyelectrolyte block copolymers using "living" radical polymerization, Application as stabilizers in emulsion polymerization", Macromol. Rapid Commun., 1998, 19, 209-213.
Burguiere et al., "Amphiphilic Block Copolymers Prepared via Controlled Radical Polymerization as Surfactants for Emulsion Polymerization", Macromol. Symp. 2000, 150, 39-44.
Nicolay et al., "Dibromotrithiocarbonate Iniferter for Concurrent ATRP and RAFT Polymerization. Effect of Monomer, Catalyst, and Chain Transfer Agent Structure on the Polymerization Mechanism," Macromolecules, 2008, 41, 4585-4596.
Nicolay et al., "Synthesis of poly(vinyl acetate) block copolymers by successive RAFT and ATRP with a bromoxanthate iniferter," Chem. Commun., 2008, 5336-5338.
Kwak, et al., "Effect of Initiator and Ligand Structures on ATRP of Styrene and Methyl Metacrylate Initiated by Alkyl Dithiocarbamate," Macromolecules, 2008, 41, 6627-6635.
Kwak, et al., "Concurrent ATRP/RAFT of Strene and Methyl Methacrylate with Dithioesters Catalyzed by Copper(I) Complexes," Macromolecules, 2008, 41, 6602-6604.
Wager et al., "A simple method to convert atom transfer radical polymerization (ATRP) Initiators into reversible addition fragmentation chain-transfer (RAFT) mediators." Eur. Polym. J., 2004, 40, 641-645.
Kabachii, et al., "Dithioesters in Atom-Transfer Radical Polymerization," Polym. Sci., Ser. B, 2006, 48, 32-36.
Zhang, et al., "Atom Transfer Radical Polymerizations of Methyl Methacrylate and Styrene with an Iniferter Reagent as the Initiator," J. Appl. Polym. Sci., 2007, 106, 230-237.
Zhang, et al., "Synthesis of Well-Defined Naphthalene and Photolabile Group-Labeled Polystyrene via ATRP," J. Polym. Sci.: Part A: Polym. Chem., 2006, 44, 510-518.
Kwak, et al., "Photoirradiated Atom Transfer Radical Polymerization with an Alkyl Dithiocarbamate at Ambient Tempterature", Macromolecules, 2010, 43, 5180-5183.
Matsuzaki et al., "Stereoregularity of Polystyrene and Mechanism of Polymerization", Die Makromolekulare Chemie, 1975, 176, 3051-3064.
Haddleton et al., "Identifying the Nature of the Active Species in the Polymerization of Methacrylates: Inhibition of Methyl Methacrylate Homopolymerizations and Reactivity Ratios for Copolymerization of Methyl Methacrylate/n-Butyl Methacrylate in Classical Anionic, Alkyllithium/Trialkylaluminum-Initiated, Group Transfer Polymerization, Atom Transfer Radical Polymerization, Catalytic Chain Transfer, and Classical Free Radical Polymerization", Macromolecules, 1997, 30, 3992-3998.
Webster, Owen W., "Group Transfer Polymerization: Mechanism and Comparison with Other Methods for Controlled Polymerization of Acrylic Monomers", Adv Polym Sci, 2004, 167, 1-34.
Azari et al., "Bone morphogenetic proteins: A review for cranial and maxillofacial surgery," Oral and Maxillo. Surg. Clin. of N.A., 14:1-14, 2002.
Jadlowiec et al., "Bone tissue engineering: recent advances and promising therapeutic agents," Expert Opin. Biol. Ther, 3(3):409-423, 2003.
Kübler et al., "Effect of different factors on the bone forming properties of recombinant BMPs," Mund Kiefer GesichtsChir, 2000; 4(8):465-469 (Abstract).
Zilliox et al., "Preparation of star-shaped macromolecules by anionic copolymerization," Journal of Polymer Science, Polymer Symposia, No. 22 (Pt. 1): 145-56, (1968).
Kanaoka et a., "Synthesis of star-shaped poly-vinyl ethers by living cationic polymerization: pathway for formation of star-shaped polymers via polymer linking reactions," Polymer Bulletin (Berlin) 44(5-6): 485-492, (2000).
Shibata, et al., "Quantitative Synthesis of Star-Shaped Poly(vinyl ether)s with a Narrow Molecular Weight Disribution by Living Cationic Polymerization," Journal of the American Chemical Society, 128(23): 7497-7504, (2006).
Qiu et al., "Controlled/Living Radical Polymerization in Aqueous Media: Homogeneous and Heterogeneous Systems," *Prog. Polym. Sci.*, vol. 26, pp. 2083-2134 (2001).
Ohno, S. and K. Matyjaszewski, "Controlling Grafting Density and Side Chain Length in Poly(n-butyl acrylate) by ATRP (Co)polymerization of Macromonomers," Journal of Polymer Chem. Ed., 2006, 44, 5454-5467 (2006).
Matyjaszewski, K. and J. Xia, "Fundamentals of Atom Transfer Radical Polymerization," Handbook of Radical Polymerization, Chapter 11; John Wiley & Sons, Inc., pp. 523-628 (2002).
Kamigaito et al., Chem. Rev., 101, 3689 (2001).
Gao, H. and K. Matyjaszewski, "Low Polydispersity Star Polymers with Core Functionality by Cross-linking Macromonomers Using Functional ATRP Intiators," Macromolecules, 40, 399-401 (2007).
Gao et al., J. Am. Chem. Soc., Low Polydispersity Star Polymers via Cross-linking Macromonomers by ATRP, 128, 15111-15113 (2006).
Davis, K. A. and K. Matyjaszewski, "Statistical, Gradient, Block, and Graft Copolymers by Controlled/Living Radical Polymerizations," *Adv. Polym. Sci.*, vol. 159 pp. 1-168 (2002).
Furukawa, T. and K. Ishizu, Journal of Colloid and Interface Science, 253(2), 465-469, (2002).
Matyjaszewski, K.,"Comparison and Classification of Controlled/Living Radical Polymerizations," American Chemical Society, publication date: Aug. 15, 2000, pp. 2-26, downloaded on Sep. 2, 2009, http://pubs.acs.org.
Le Droumaguet, B. and K. Velonia, "In Situ ATRP-Mediated Hierarchical Formation of Giant Amphiphile Bionanoreactors", Angew. Chem. Int. Ed., 2008, 47(33), pp. 6263-6266.
Tsarevsky et al., "Factors Determining the Performance of Copper-Based Atom Transfer Radical Polymerization Catalysts and Criteria for Rational Catalyst Selection", ACS Symposium Series, 2006, 944, pp. 56-70.

(56) References Cited

OTHER PUBLICATIONS

Duncan, R. and M. Vicent, "Do HPMA copolymer conjugates have a future as clinically useful nanomedicines? A critical overview of current status and fututre opportunities", Advanced Drug Delivery Reviews, 62, 2010, pp. 272-282.
Enoki et al., "Acid Denaturation and Refolding of Green Fluorescent Protein", Biochemistry, 2004, 43, pp. 14238-14248.
Arakawa et al., "Protein precipitation and denaturation by dimethyl sulfoxide", Biophysical Chemistry, 131, 2007, pp. 62-70.
Li et al., "Thermoresponsive Block Copolymer-Protein Conjugates Prepared by Grafting—from via RAFT Polymerization", Macromol. Rapid Commun., 2011, 32, pp. 354-359.
Li et al., "Thermoresponsive Block Copolymer-Protein Conjugates Prepared by Grafting—from via RAFT Polymerization" Supporting Information for Macromol. Rapid Commun., 2011, 32, pp. 354-359.
Lele et al., "Synthesis of Uniform Protein-Polymer Conjugates", Biomacromolecules, 2005, 6, pp. 3380-3389.
Peschke et al., "C-Terminally PEGylated hGH-derivatives", Bioorganic & Medicinal Chemistry, 15, 2007, pp. 4382-4395.
De Paoli et al., "New insights into the mechanism of activation of atom transfer radical polymerization by Cu(I) complexes", Chem. Commun., 2011, 47, pp. 3580-3582.
Pintauer et al., "Atom Transfer radical addition and polymerization reactions catalyzed by ppm amounts of copper complexes", Chem. Soc. Rev., 2008, 37, pp. 1087-1097.
Grover, G. and H. Maynard, "Protein-polymer conjugates: synthetic approaches by controlled radical polymerizations and interesting applications", Current Opinion in Chemical Biology, 2010, 14(6), pp. 818-827.
Peeler et al., "Genetically Encoded Initiator for Polymer Growth from Proteins", JACS Communications, 2010, 132, pp. 13575-13577.
Tang et al., "Understanding atom Transfer Radical Polymerization: Effect of Ligan and Initiator Structures on the Equillibrium Constants", J. Am. Chem. Soc., 2008, 130, pp. 10702-10713.
Bontempo, D. and H. Maynard, "Streptavidin as a Macroinitiator for Polymerization: In Situ Protein-Polymer Conjugate Formation", J. Am. Chem. Soc., 2005, 127, pp. 6508-6509.
Bontempo et al., "Cysteine-Reactive Polymers Synthesized by Atom Transfer Radical Polymerization for Conjugation to Proteins", J. Am. Chem. Soc., 2004, 126, pp. 15372-15373.
Abuchowski et al., "Alteration of Immunological Properties of Bovine Serum Albumin by Covalent Attachment of Polyethylene Glycol", The Jounal of Biological Chemistry, 1977, 252, pp. 3578-3581.
Abuchowski et al., "Effect of Covalent Attachment of Polyethylene Glycol on Immunogenicity and Circulating Life of Bovine Liver Catalase", The Jounal of Biological Chemistry, 1977, 252, pp. 3582-3586.
Duncan, Ruth, "The Dawning Era of Polymer Therapeutics", Nature Reviews, Drug Discovery, 2003, 2, pp. 347-360.
Tsarevsky et al., "Deactivation Efficiency and Degree of Control over Polymerization in ATRP in Protic Solvents", Macromolecules, 2004, 37, pp. 9768-9778.
Lutz et al., "Biocompatible, Thermoresponsive, and Biodegradable: Simple Preparation of "All-in-One" Biorelevant Polymers," Macromolecules, 2007, 40, pp. 8540-8543.
Braunecker et al., "Thermodynamic Components of the Atom Transfer Radical Polymerization Equilibrium: Quantifying Solvent Effects", Macromolecules, 2009, 42, pp. 6348-6360.
Bortolamei et al., "Thermodynamic Properties of Copper Complexes Used as Catalysts in Atom Transfer Radical Polymerization", Macromolecules, 2010, 43, pp. 9257-9267.
Al-Abboodi et al., "Three-Dimensional Nanocharacterization of Porous Hydrogel With Ion and Electron Beams", Biotechnology and Bioengineering, vol. 110, No. 1, Jan. 2013, pp. 318-326.
Mathur et al., "Methods for Synthesis of Hydrogel Networks: A Review", 1996, Journal of Macromolecular Science, Part C, 36:2, pp. 405-430.

Dimitrov et al., "Continuous Convective Assembling of Fine Particles into Two-Dimensional Arrays on Solid Surfaces", Langmuir, 1996, 12, pp. 1303-1311.
Salerno et al. "Pore Structure and Swelling Behavior of Porous Hydrogels Prepared via a Thermal Reverse-Casting Technique", Journal of Applied Polymer Science, 2011, vol. 122, pp. 3651-3660.
Simakova et al., "Aqueous ARGET ATRP", Macromolecules, 2012, 45, pp. 6371-6379.
Stein et al., "Morphological Control in Colloidal Crystal Templating of Inverse Opals, Hierarchical Structures, and Shaped Particles", Chem. Mater. 2008, 20, pp. 649-666.
Stein et al., "Colloidal crystal templating of three-dimensionally ordered macroporous solids: materials for photonics and beyond", Current Opinion in Solid State and Materials Science, 5 (2001) pp. 553-564.
Gates et al., "Fabrication and Characterization of Porous Membranes with Highly Ordered Three-Dimensional Periodic Structures", Chem. Mater., 1999, 11, pp. 2827-2836.
Lange et al., "Functional 3D photonic films from polymer beads", phys. stat sol. (a) 204, No. 11, 2007, pp. 3618-3635.
Shu et al., "Rational Design of Affinity Ligand for the Oriented Immobilization of Trypsin", Acta Phys. Chim. Sin., 2013, 29 (2), pp. 439-448.
Hwang et al., "Fabrication of three-dimensional porous cell-laden hydrogel for tissue engineering", Biofabrication 2 (2010) 12 pages.
Chen et al., "Macroporous Hydrogel Scaffolds and Their Characterization by Optical Coherence Tomography", Tissue Engineering: Part C vol. 17, No. 1, 2011, pp. 101-112.
Seliktar, Dror, "Designing Cell-Compatible Hydrogels for Biomedical Applications", Science, 336, (2012), pp. 1124-1128.
Behravesh et al., "Evaluation of the in Vitro Degradation of Macroporous Hydrogels Using Gravimetry, Confined Compression Testing, and Microcomputed Tomography", Biomacromolecules, 2002, 3, 1263-1270.
Li et al., "Colloidal Assembly: The Road from Particles to Colloidal Molecules and Crystals", Angew. Chem. Int. Ed. 2011, 50, pp. 360-388.
Marlow et al., "Opals: Status and Prospects", Angew. Chem. Int. Ed. 2009, 48, pp. 6212-6233.
Meseguer et al., "Synthesis of inverse opals", Colloids and Surfaces A: Physicochemical and Engineering Aspects, 202 (2002) pp. 281-290.
Xu et al., "Facile Trypsin Immobilization in Polymeric Membranes for Rapid, Efficient Protein Digestion", Anal. Chem., 2010, 82, pp. 10045-10051.
Xu et al., "Facile Trypsin Immobilization in Polymeric Membranes for Rapid, Efficient Protein Digestion", Anal. Chem., 2010, 82, 10045-10051, Supporting Information, 17 pages.
Schröder et al., "Substituted Tris(2-pyridylmethyl)amine Ligands for Highly Active ATRP Catalysts", ACS Macro Lett., 2012, 1, 1037-1040.
Abreu et al., "Inorganic Sulfites: Efficient Reducing Agents and Supplemental Activators for Atom Transfer Radical Polymerization", ACS Macro Lett., 2012, 1, pp. 1308-1311.
Eckenhoff et al., "Structural characterization and investigation of iron(III) complexes with nitrogen and phosphorus based ligands in atom transfer radical addition (ATRA)", Inorganica Chimica Acta, 382, 2012, pp. 84-95.
Matyjaszewski et al., "Diminishing catalyst concentration in atom transfer radical polymerization with reducing agents", PNAS, Oct. 17, 2006, vol. 103, No. 42, pp. 15309-15314.
Jakubowski et al. "Activators Regenerated by Electron Transfer for Atom-Transfer Radical Polymerization of (Meth)acrylates and Related Block Copolymers", Angew. Chem., 2006, 118, pp. 4594-4598.
Fudouzi et al., "Photonic Papers and Inks: Color Writing with Colorless Materials", Adv. Mater., 2003, 15, No. 11, pp. 892-896.
Hustoft et al., "A Critical Review of Trypsin Digestion for LC-MS Based Proteomics", Integrative Proteomics, http://www.intechopen.com/books/integrative-proteomics/a-critical-review-of-trypsin-digestion-for-lc-ms-basedproteomics, 2012, pp. 73-92.

(56) References Cited

OTHER PUBLICATIONS

Oxley et al., "Macroporous hydrogels for biomedical applications: methodology and morphology", Biomaterials, 1993, vol. 14, No. 14, pp. 1064-1072.
Savina, Irina, "Macroporous hydrogels by cryogelation: biomedical and environmental applications", abstract, School of Pharmacy and Biomolecular Sciences, University of Brighton, 2012, 1 page.
Savina et al., "Biomimetic Macroporous Hydrogels: Protein Ligand Distribution and Cell Response to the Ligand Architecture in the Scaffold", Journal of Biomaterials Science, 20 (2009), pp. 1781-1795.
Shepard et al., "Hydrogel macroporosity and the prolongation of transgene expression and the enhancement of angiogenesis", Biomaterials, 33 (2012) pp. 7412-7421.
Duan et al., "Versatile fabrication of arbitrarily shaped multi-membrane hydrogels suitable for biomedical applications", J. Mater. Chem. B, 2013, 1, pp. 485-492.
Kopeček, Jindřich, "Hydrogel biomaterials: A smart future?", Biomaterials, 28, 2007, pp. 5185-5192.
Lee et al., "Recent Progress in the Synthesis of Porous Carbon Materials", Adv. Mater. 2006, 18, pp. 2073-2094.
Ma et al., "Organic-Inorganic Hybrid Silica Monolith Based Immobilized Trypsin Reactor with High Enzymatic Activity", Anal. Chem., 2008, 80, pp. 2949-2956.
Ma et al., "Monolith-based immobilized enzyme reactors: Recent developments and applications for proteome analysis", J. Sep. Sci., 2007, 30, pp. 3050-3059.
Zhu et al., "Crystallization of hard-sphere colloids in microgravity", Nature, vol. 387, 26, Jun. 1997, pp. 883-885.
Pal et al., "Polymeric Hydrogels: Characterization and Biomedical Applications—A mini review", Designed Monomers and Polymers, 12, 2009, pp. 197-220.
Liu et al., "Hydrogels from Biopolymer Hybrid for Biomedical, Food, and Functional Food Applications", Polymers, 2012, 4, pp. 997-1011.
Woodcock, L.V., "Entropy difference between the face-centered cubic and hexagonal close-packed crystal structures", Nature, vol., 385, 9, Jan. 1997, pp. 141-143.
Dainiak et al., "Biomimetic Macroporous Hydrogel Scaffolds in a High-Throughput Screening Format for Cell-Based Assays", Biotechnol. Prog., 2008, 24, pp. 1373-1383.
Ford et al., "A macroporous hydrogel for the coculture of neural progenitor and endothelial cells to form functional vascular networks in vivo", PNAS, Feb. 21, 2006, vol. 103, No. 8, pp. 2512-2517.
Holgado et al., "Electrophoretic Deposition to Control Artificial Opal Growth", Langmuir, 1999, 15, pp. 4701-4704.
Kato et al., "Monolithic Bioreactor Immobilizing Trypsin for High-Throughput Analysis", Anal. Chem., 2005, 77, pp. 1813-1818.
Peppas et al., "Hydrogels in pharmaceutical formulations", European Journal of Pharmaceutics and Biopharmaceutics, 50, 2000, pp. 27-46.
Annabi et al., "Controlling the Porosity and Microarchitecture of Hydrogels for Tissue Engineering", Tissue Engineering: Part B, vol. 16, No. 4, 2010, pp. 371-383.
Davis et al., "Modular enzymatically crosslinked protein polymer hydrogels for in situ gelation", Biomaterials, 31, 2010, pp. 7288-7297.
Dziomkina et al., "Colloidal crystal assembly on topologically patterned templates", Soft Matter, 2005, 1, pp. 265-279.
Velev et al., "Structured Porous Materials via Colloidal Crystal Templating: From Inorganic Oxides to Metals", Adv. Mater., 2000, 12, No. 7, pp. 531-534.
Velev et al., "Colloidal crystals as templates for porous materials", Current Opinion in Colloid & Interface Science 5, 2000, pp. 56-63.
Jiang et al., "Single-Crystal Colloidal Multilayers of Controlled Thickness", Chem. Mater. 1999, 11, pp. 2132-2140.
Jiang et al., "Template-Directed Preparation of Macroporous Polymers with Oriented and Crystalline Arrays of Voids", J. Am. Chem. Soc., 1999, 121, pp. 11630-11637.

Schroden et al., "Hybrid macroporous materials for heavy metal ion adsorption", J. Mater. Chem., 2002, 12, pp. 3261-3267.
Pusey et al., "Structure of Crystals of Hard Colloidal Spheres", Physical Review Letters, Dec. 18, 1989, vol. 63, No. 25, pp. 2753-2756.
Zhao et al., "Horseradish Peroxidase Immobilized in Macroporous Hydrogel for Acrylamide Polymerization", Journal of Polymer Science: Part A: Polymer Chemistry, 2008, vol. 46, pp. 2222-2232.
Pernites et al., "Patterned Surfaces Combining Polymer Brushes and Conducting Polymer via Colloidal Template Electropolymerization", Adv. Mater., 2011, 23, pp. 1287-1292.
Schroden et al., "Optical Properties of Inverse Opal Photonic Crystals", Chem. Mater., 2002, 14, pp. 3305-3315.
Johnson et al., "Ordered Mesoporous Polymers of Tunable Pore Size from Colloidal Silica Templates", Science, vol. 283, Feb. 12, 1999, pp. 963-965.
Owen et al., "Design of three-dimensional biomimetic scaffolds",Journal of Biomedical Materials Research A, Sep. 15, 2010, vol. 94A, Issue 4, pp. 1321-1331.
Park et al., "Crystallization of Mesoscale Particles over Large Areas", Adv. Mater., 1998, 10, No. 13., pp. 1028-1032.
Park et al., "Macroporous Membranes with Highly Ordered and Three-Dimensionally Interconnected Spherical Pores", Adv. Mater. 1998, 10, No. 13, pp. 1045-1048.
Park et al., "Fabrication of Three-Dimensional Macroporous Membranes with Assemblies of Microspheres as Templates", Chem. Mater., 1998, 10, pp. 1745-1747.
Park et al., "Assembly of Mesoscale Particles over Large Areas and Its Application in Fabricating Tunable Optical Filters", Langmuir, 1999, 15, pp. 266-273.
Ronel et al., "Macroporous hydrogel membranes for a hybrid artificial pancreas. I. Synthesis and chamber fabrication", Journal of Biomedical Materials Research, vol. 17, 1983, pp. 855-864.
Hollister, Scott J., "Porous scaffold design for tissue engineering", Nature Materials, vol. 4, Jul. 2005, 518-524.
Gulrez et al., "Hydrogels: Methods of Preparation, Characterisation and Applications", Progress in Molecular and Environmental Bioengineering—From Analysis and Modeling to Technology Applications, Aug. 2011, pp. 117-150.
Keskar et al., "In Vitro Evaluation of Macroporous Hydrogels to Facilitate Stem Cell Infiltration, Growth, and Mineralization", Tissue Engineering, Part A vol. 15, No. 7, 2009, pp. 1695-1707.
Wu et al., "Design and Preparation of Porous Polymers", Chem. Rev., 2012, 112, pp. 3959-4015.
Wu et al., "A novel organic-inorganic hybrid monolith for trypsin immobilization", Sci China Life Sci, Jan. 2011, vol. 54, No. 1, pp. 54-59.
Zhao et al., "Templating methods for preparation of porous structures", J. Mater. Chem., 2006, 16, pp. 637-648.
Zhang et al., "Gaseous infiltration method for preparation of three-dimensionally ordered macroporous polyethylene", Polymer, 49, 2008, pp. 5446-5451.
Zhang et al., "Inverted-Colloidal-Crystal Hydrohel Matrices as Three-Dimensional Cell Scaffolds", Adv. Funct. Mater., 2005, 15, No. 5, pp. 725-731.
Chung-li et al., "Studies on the preparation and characterisation of monodisperse polystyrene latices", Progr. Colloid & Polymer Sci., 60, 1976, pp. 163-175.
Huang et al., "A novel immobilized cobalt(II)/copper(II) bimetallic catalyst for atom transfer radical polymerization (ATRP) of methyl methacrylate", Applied Catalysis A: General, vol. 332, Issue 2, Nov. 20, 2007, pp. 192-199.
Nasser-Eddine et al., "Copper removal in atom transfer polymerization through electrodeposition", Macromol. Mater. Eng., 2004, 289, pp. 204-207.
Coullerez et al., "Understanding Copper-Based Atom-Transfer Radical Polymerization in Aqueous Media", The Journal of Physical Chemistry A, Sep. 2, 2004, vol. 108, No. 35, pp. 7129-7131.
Hong et al., "An Immobilized/Soluble Hybrid Catalyst System for Atom Transfer Radical Polymerization", Macromolecules, 2001, vol. 34, No. 15, pp. 5099-5102.

(56) References Cited

OTHER PUBLICATIONS

Matyjaszewski, Krzysztof, "Mechanistic Aspects of Atom Transfer Radical Polymerization", ACS Symp. Ser., 1998, Chapter 16, 685, pp. 258-283.
Matyjaszewski, Krzysztof, "Bulk Atom Transfer Radical Polymerization", ACS Symp. Ser., 1998, Chapter 6, 713, pp. 96-112.
Matyjaszewski et al. "The Preparation of Wel-Defined Water Soluble-Swellable (Co)Polymers by Atom Transfer Radical Polymerization", ACS Symp. Ser., 2000, Chapter 4, 765, pp. 52-71.
Matyjaszewski, Krzysztof, "Controlled Radical Polymerization: State of the Art in 2008", ACS Symp. Ser., 2009, Chapter 1, 1023, pp. 3-13.
Konkolewicz et al, "Tuning Polymer Properties through Competitive Processes", ACS Symp. Ser. 2012, 1100, pp. 145-170.
Hansch et al., "A Survey of Hammett Substituent Constants and Resonance and Field Parameters", Chem. Rev. 1991, 91, pp. 165-195.
Tsarevsky et al., ""Green" Atom Transfer Radical Polymerization: From Process Design to Preparation of Well-Defined Environmentally Friendly Polymeric Materials", Chem. Rev. 2007, 107, pp. 2270-2299.
Xia et al., "Controlled/"Living" Radical Polymerization Atom Transfer Radical Polymerization of Acrylates at Ambient Temperature", Macromolecules, 1998, 31, pp. 5958-5959.
Xia et al., "Controlled/"Living" Radical Polymerization. Atom Transfer Radical Polymerization Catalyzed by Copper(I) and Picolylamine Complexes", Macromolecules, 1999, 32, pp. 2434-2437.
Braunecker et al., "Origin of Activity in Cu-, Ru-, and Os-Mediated Radical Polymerization", Macromolecules, 2007, 40, pp. 8576-8585.
Seeliger et al., "Temperature Effect on Activation Rate Constants in ATRP: New Mechanistic Insights into the Activation Process", Macromolecules, 2009, 42, pp. 6050-6055.
Magenau et al. "ATRP of Methacrylates Utilizing Cu X2/L and Copper Wire", Macromolecules, 2010, 43, pp. 9682-9689.
Kwak et al., "ARGET ATRP of Methyl Acrylate with Inexpensive Ligands and ppm Concentrations of Catalyst", Macromolecules, 2011, 44, pp. 811-819.
Zhang et al., "Copper-Mediated CRP of Methyl Acrylate in the Presence of Metallic Copper: Effect of Ligand Structure on Reaction Kinetics", Macromolecules, 2012, 45, pp. 78-86.
Morick et al., "Activation-Deactivation Equilibrium of Atom Transfer Radical Polymerization of Styrene up to High Pressure", Macromol. Chem. Phys., 2011, 212, pp. 2423-2428.
Di Lena et al., "Transition metal catalysts for controlled radical polymerization", Progress in Polymer Science, 35, 2010, pp. 959-1021.
Pintauer et al., "Atom Transfer Radical Polymerization (ATRP) and Addition (ATRA) and Applications", Encyclopedia of Radicals in Chemistry, Biology and Materials, 2012, 4, 1851-1894.
Malkov et al., "Synthesis of New Chiral 2,2'-Bipyridyl-Type Ligands, Their Coordination to Molybdenum(0), Copper(II), and Palladium(II), and Application in Asymmetric Allylic Substitution, Allylic Oxidation, and Cyclopropanation", Organometallics, 2001, 20, pp. 673-690.
Montalti et al., "Luminescent Ruthenium(II) Bipyridyl-Phosphonic Acid Complexes: pH Dependent Photophysical Behavior and Quenching with Divalent Metal Ions", Inorg. Chem., 2000, 39, pp. 76-84.
Nitadori et al., "Enhanced Photocatalytic Activity of α-Methylstyrene Oligomerization through Effective Metal-to-Ligand Charge-Transfer Localization on the Bridging Ligand", Inorg. Chem., 2012, 51, pp. 51-62.
Pintauer et al., "Structural aspects of copper catalyzed atom transfer radical polymerization", Coordination Chemistry Reviews, 249, 2005, pp. 1155-1184.
Ding et al., "Atom Transfer Radical Polymerization of N,N-Dimethylacrylamide", Macromol. Rapid Commun., 2004, 25, pp. 632-636.

Kickelbick et al., "Structural comparison of Cu$^{II}$ complexes in atom transfer radical polymerization, New J. Chem., 2002, 26, pp. 462-468.
Magenau et al., "Highly Active Bipyridine-Based Ligands for Atom Transfer Radical Polymerization", ACS Macro Lett., 2012, 1, pp. 508-512.
Yasuda, et al., "Stereospecific Polymerization of Acetaldehyde by $R_2AlOR$ Catalyst," Journal of Polymer Science, vol. 11, 1973, pp. 1421-1434.
Poli, et al., "Iron-mediated reversible deactivation controlled radical polymerization," Progress in Polymer Science 39 (2014), pp. 1827-1845.
Saikia, et al., "Reverse Atom Transfer Radical Polymerization of Stearyl Methacrylate Using 2,2'-Azobisisobutyronitrile as the Initiator," Journal of Applied Polymer Science, vol. 85 (2002), pp. 1236-1245.
Park, Sangwoo, et al., "Star Synthesis Using Macroinitiators via Electrochemically Mediated Atom Transfer Radical Polymerization," Macromolecules, 2013, 46, pp. 5856-5860.
Samal, Seetanshu K., et al., "Electroinitiated Polymerization of Acrylamide in Acetonitrile Medium," Journal of Polymer Science: Part A: Polymer Chemistry, vol. 26, 1988, pp. 1035-1049.
Magenau, Andrew J., et al., "Investigation of Electrochemically Mediated Atom Transfer Radical Polymerization," Macromolecules, 2013, 46, pp. 4346-4353.
Bonometti, Valentina, et al., "Exploring the first steps of an electrochemically-triggered controlled polymerization sequence: Activation of alkyl- and benzyl halide initiators by an electrogenerated Fe$^{II}$ Salen complex," Journal of Electroanalytical Chemistry 633 (2009) pp. 99-105.
Bortolamei, Nicola, et al., "Controlled Aqueous Atom Transfer Radical Polymerization with Electrochemical Generation of the Active Catalyst," Angew. Chem. Int. Ed., 2011, 50, pp. 11391-11394.
Magenau, Andrew J., et al., "Electrochemically Mediated Atom Transfer Radical Polymerization," Science, vol. 332, Apr. 1, 2011, pp. 81-84.
Fischer, Hanns, et al., "The Persistent Radical Effect in "Living" Radical Polymerization," Macromolecules 1997, 30, pp. 5666-5672.
Haddleton, David M., et al., "Atom Transfer Polymerization of Poly(Ethylene Glycol) Methyl Ether Methacrylate Macromonomer," Polymer Preprints, 2000, 41(1), pp. 415-416.
Abreu C. M. R. et. al.; Polymer Chemistry 2013, 4, 5629-5636.
Alsubaie, F. et. al.; Polym. Chem. 2015 6, 406-417.
Anastasaki, A.; et. al.; *Macromol Rapid Comm* 2014, 35 (10), 965-970.
C. Andrieux et. al., *J. Electroanal. Chem.* 1978, 87, 39-53.
C. Andrieux et. al., *J. Electroanal. Chem.* 1978, 87, 55-65.
C. Andrieux et. al., *J. Electroanal. Chem.* 1980, 113, 19-40.
Bell C. A. et. al.; "A Rapid Electrochemical Method for Determining Rate Coefficients for Copper-Catalyzed Polymerizations," J. Am. Chem. Soc., 2011, 133 11944-47.
Buback, M. et. al.; "Pressure dependence of propagation rate coefficients in freeradical homopolymerizations of methyl acrylate and dodecyl acrylate," *Macromol. Chem. Phys.* 1998, 199, 1721-1727.
Buback, M. et. al.; "Termination Kinetics of Methyl Acrylate and Dodecyl Acrylate Free-Radical Homopolymerizations up to High Pressure," *Macromol. Chem. Phys.* 2002, 203, pp. 1065-1070.
Fischer H. et al., "Factors Controlling the Addition of Carbon-Centered Radicals to Alkenes—An Experimental and Theoretical Perspective," Angew. Chem. Int. Ed. 2001, 40, 1340-1371.
Golub G. et.al.; "The effect of N-methylation of tetra-aza-alkane copper complexes on the axial binding of anions," *Inorg. Chim. Acta* 1997, 255, 111-115.
Harrisson, S.; et al., "Comproportionation versus Disproportionation in the Initiation Step of Cu(0)-Mediated Living Radical Polymerization," *Macromolecules* 2012, 45, 7388-7396.
Henderson, et al., "Ionic Effects on the Behavior of Thermoresponsive PEO-PNIPAAm Block Copolymers," *J Polym Sci Polym. Phys* 2014, 52 (7), 507-516.

(56) References Cited

OTHER PUBLICATIONS

Kim K. H.; et al.; "Preparation of hydrogel nanoparticles by atom transfer radical polymerization of N-isopropylacrylamide in aqueous media using PEG macro-initiator," Polymer 2005, 46 (9), 2836-2840.
Konkolewicz, D.; et al.; "Aqueous RDRP in the Presence of $Cu^0$: The Exceptional Activity of $Cu^I$ Confirms the SARA ATRP Mechanism," Macromolecules 2014, 47 (2), 560-570.
Konkolewicz, D.; et. al.; "Visible Light and Sunlight Photoinduced ATRP with ppm of Cu Catalyst," ACS Macro Lett. 2012, 1, 1219-1223.
Konkolewicz, D.; et. al.; "ICAR ATRP with ppm Cu Catalyst in Water," Macromolecules 2012, 45, 4461-4468.
Millard, et al.; "Controlling the Fast ARTP of N-Isopropylacrylamide in Water," ACS Symposium Series 2009, 1023, 127-137.
Matyjaszewski, K.; "Atom Transfer Radical Polymerization (ATRP): Current Status and Future Perspectives," Macromolecules. 2012, 45 (10), 4015-4039.
Miyake et. al., "Perylene as an Organic Photocatalyst for the Radical Polymerization of Functionalized Vinyl Monomers through Oxidative Quenching with Alkyl Bromides and Visible Light," Macromolecules 2014, 47, 8255-8261.
Nguyen. et. al.; The Effect of Ligand on the Rate of Propagation of Cu(0)-Wire Catalyzed SET-LRP of MA in DMSO at 25° C., Polym. Sci., Part A: Polym. Chem. 2009, 47, 5629-5638.
Nguyen. et. al.; "SET-LRP of N,N-Dimethylacrylamide and of N-Isopropylacrylamide at 25° C. in Protic and in Dipolar Aprotic Solvents," J Polym Sci Polym. Chem 2010, 48 (8), 1752-1763.
Nicholson R. S., "Theory and Application of Cyclic Voltammetry for Measurement of Electrode Reaction Kinetics," Anal. Chem. 1965, vol. 37, 1351-1355.
Onsager, L., "Reciprocal Relations in Irreversible Processes.," Phys. Rev. 1931, vol. 37, 405-426.
Peng, C-H.; et al.; "Reversible-Deactivation Radical Polymerization in the Presence of Metallic Copper. Activation of Alkyl Halides by $Cu^0$," Macromolecules 2013, 46, 3803-3815.
Percec, et al.; "Ultrafast Synthesis of Ultrahigh Molar Mass Polymers by Metal-Catalyzed Living Radical Polymerization of Acrylates, Methacrylates, and Vinyl Chloride Mediated by Set at 25° C.," J. Am. Chem. Soc. 2006, 128, 14156-14165.
Treat, Nicolas J., et. al., "Metal-Free Atom Transfer Radical Polymerization," J. Am. Chem. Soc. 2014, 136, 16096-16101.
Waldron C et al.; "Absolut "copper catalyzation perfected"; robust living polymerization of NIPAM: Guinness is good for SET-LRP," Polym. Chem. 2014, 5(1): 57-61.
Wang, Yu et. al.; "Reversible-Deactivation Radical Polymerization in the Presence of Metallic Copper. Comproportionation-Disproportionation Equilibria and Kinetics," Macromolecules 2013, 46, 3793-3802.
Wei H. et al.; "One-pot ATRP synthesis of a triple hydrophilic block copolymer with dual LCSTs and its thermo-induced association behavior," Soft Matter 2012, 8 (37), 9526-9528.
Wever, et. al., "Polymers for enhanced oil recovery: A paradigm for structure-property relationship in aqueous solution," Prog. Polym. Sci. 2011, 36 (11), 1558-1628.
Williams, et. al., "A Silver Bullet: Elemental Silver as an Efficient Reducing Agent for Atom Transfer Radical Polymerization of Acrylates," J. Am. Chem. Soc. 2015, 137, 1428-1431.

Zhang, et al., "Copper-mediated controlled radical polymerization under biological conditions: SET-LRP in blood serum," Chem. Commun. 2013, 49, 6608-6610.
Zhang, et al. "Aqueous Copper-Mediated Living Polymerization: Exploiting Rapid Disproportionation of CuBr with $Me_6$ TREN," J. Am. Chem. Soc. 2013, 135, 7355-7363.
Zhong, et. al., "Reversible-Deactivation Radical Polymerization in the Presence of Metallic Copper. Kinetic Simulation," Macromolecules, 2013, 46, 3816-3827.
Averick, et al., "ATRP under Biologically Relevant Conditions: Grafting from a Protein," ACS Macro Lett. 2012, 1, 6-10.
The chemistry of free radical polymerization; 2nd Ed. ed.; Elsevier: Amsterdam, 2006 (book not attached).
He, et al., "Three-Dimensionally Ordered Macroporous PolymericnMaterials by Colloidal Crystal Templating for Reversible CO2 Capture." Advanced Functional Materials 23(37): 4720-4728, Oct. 2013.
Pal, et al., "Preparation and Characterization of Polyvinyl Alcohol-Gelatin Hydrogel Membranes for Biomedical Applications," AAPS PharmSciTech 2007;8(1): Article 21; E1-E5.
Davis, et al., "Disorder-to-Order Transition in Settling Suspensions of Colloidal Silica: X-ray Measurements," Science 1989, vol. 245, 507-510.
Zhao, et al., Templating Methods for Preparation of Porous Structures, J. Materials Chemistry, 2006;16: 637-648.
Xia, et al., "Monodispersed Colloidal Spheres: Old Materials with New Applications," Adv. Mater. 2000; 12(10): 693-713.
Yue, et al., "Preparation and Characterization of Nanostructured and High Transparent Hydrogel Films with pH Sensitivity and Application," Journal of Applied Polymer Science 2009;112(4):2261-2269.
Hearnden, et al., "New developments and opportunities in oral mucosal drug delivery for local and systemic disease," Advanced Drug Delivery Reviews 2012; 64: 18-23.
Hongkun He, et al., "Multifunctional Hydrogels with Reversible 3D Ordered Macroporous Structures," Advanced Science, 2015, 2, pp. 1-6.
Hongkun He, et al., "Multifunctional Hydrogels with Reversible 3D Ordered Macroporous Structures," Supporting Information for Advanced Science, 2015, 2, pp. S1-S37 (38 pages).
Coca, S., et al., "Block Copolymers by Transformation of "Living" Carbocationic into "Living" Radical Polymerization. II. ABA-Type Block Copolymers Comprising Rubbery Polyisobutene Middle Segment," J. Polym. Sci., Part A: Polym. Chem. 1997, 35, 3595-3601.
Coca S., et al., "Block Copolymers by Transformation of "Living" Carbocationic into "Living" Radical Polymerization," American Chemical Society, Macromolecules, vol. 30, No. 9, 1997, pp. 2808-2810.
Matyjaszewski, K., Y. Nakagawa, et al. (1998). "Polymerization of n-butyl acrylate by atom transfer radical polymerization. Remarkable effect of ethylene carbonate and other solvents." Macromolecules 31(5): 1535-1541.
Coca S., et al., "Block Copolymers by Transformation of Living Carbocationic into Living Radical Polymerization," Polymer Preprints, American Chemical Society, Macromolecules, vol. 38, No. 1,1997, pp. 693-694.
Zapata-Gonzalez, "Mathematical Modeling of the Full Molecular Weight Distribution in ATRP Techniques," AIChE Journal, vol. 62, No. 8, Aug. 2016, pp. 2762-2777.

\* cited by examiner

ELECTROCHEMICALLY MEDIATED ATOM TRANSFER RADICAL POLYMERIZATION

CROSS-REFERENCE TO RELATED APPLICATIONS

This application is a U.S. national stage filing under 35 U.S.C. §371 of International Application No. PCT/US2011/065578 having an international filing date of Dec. 16, 2011 and claims benefit of and priority to U.S. Provisional Application Ser. No. 61/574,890 filed Aug. 11, 2011, and U.S. Provisional Application Ser. No. 61/459,724 filed Dec. 17, 2010, the disclosures of each of which are incorporated by this reference.

TECHNICAL FIELD OF THE INVENTION

An atom or group transfer polymerization process where the ratio of the activator and deactivator oxidation states of the catalyst complex in the reaction medium is dictated and continuously balanced by electrochemistry. The rate of polymerization can be controlled through the magnitude of the applied potential, current, or total charge passed to the system. The polymerization can be switched "on" and "off" at will to control the temperature of the reaction medium.

BACKGROUND OF THE INVENTION

Since their discovery, controlled radical polymerization (CRP) processes have gained increasing attention because CRP couples the advantages afforded by conventional free radical polymerization (RP), to (co)polymerize a wide range of monomers using various commercially viable processes, with the ability to synthesize polymeric materials with predetermined molecular weight (MW), low polydispersity ($M_w/M_n$), controlled composition, site specific incorporated predetermined functionality, selected chain topology and the ability to incorporate bioresponsive or inorganic species into the final product.

Atom transfer radical polymerization (ATRP) is considered to be one of the most successful CRP processes with significant commercial potential for production of many specialty materials including coatings, sealants, adhesives, dispersants in addition to materials for health and beauty products, electronics and biomedical applications. The process, catalysts, including transition metals and ligands, range of polymerizable monomers and materials prepared by the process have been thoroughly described in a series of co-assigned U.S patents and Applications including U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,759,491; 6,790,919; 6,887,962; 7,019,082; 7,049,373; 7,064,166; 7,125,938; 7,157,530; 7,332,550; 7,572,874; 7,678,869; 7,795,355; 7,825,199; 7,893,173; 7,893,174 and U.S. patent applications Ser. Nos. 10/548,354; 11/990,836; 12/311,673; 12/451,581; 12/921,296; 12/877,589; 12/949,466 and 13/026,919 the disclosures of all of which are herein incorporated by reference. These prior art patents and applications describe the range of (co)polymerizable monomers in addition to the topology, architecture and site specific functionality attainable in copolymers prepared by ATRP in addition to detailing a range of composite structures that can be prepared by "grafting from" or "grading to" a broad range of organic or inorganic materials.

ATRP has also been discussed in numerous publications with Matyjaszewski as co-author and reviewed in several book chapters. [Matyjaszewski, K. et al. *ACS Symp. Ser.* 1998, 685, 258-283; *ACS Symp. Ser.* 1998, 713, 96-112; *ACS Symp. Ser.* 2000, 729, 270-283; *ACS Symp. Ser.* 2000, 765, 52-71; *ACS Symp. Ser.* 2000, 768, 2-26; *ACS Symposium Series* 2003, 854, 2-9; *ACS Symp. Ser.* 2009, 1023, 3-13 and *Chem. Rev.* 2001, 101, 2921-2990.] These publications are incorporated by reference to provide information on the range of suitable transition metals that can participate in the redox reaction and suitable ligands for the different transition metals to form transition metal complexes suitable for polymerizing broad range of exemplified polymcrizable (co)monomers. The generally accepted mechanism of an ATRP reaction is shown in Scheme 1.

Scheme 1. General mechanism for the ATRP process

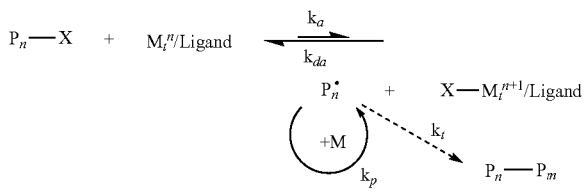

Any transition metal complex ($M_t^n/L$) capable of maintaining the dynamic equilibrium through participation in a redox reaction comprising the transferable atom or group present on each initiator or dormant polymer chain ($P_n$—X) to form an active radical ($P_n^\bullet$) and higher oxidation state transition metal complex ($X-M_t^{n+1}/L$) that acts as the deactivator, may be used as the catalyst in ATRP. The creation and maintenance of a low concentration of active species, ($P_n^\bullet$), reduces the probability of bimolecular termination reactions, ($k_t$), which leads to a radical polymerization process that behaves as a "living" system through retention of the stable transferable atom or group (—X) on the vast majority of growing dormant chain ends. The most frequently used ATRP procedure is based on a simple reversible halogen atom transfer catalyzed by redox active transition metal compounds, most frequently copper or iron, that form a catalyst complex with a ligand that modifies solubility and activity of the catalyst, most frequently nitrogen based ligands. The simple procedure may be carried out in bulk, in the presence of organic solvents or in water, under homogeneous or heterogeneous conditions, in ionic liquids, and in supercritical $CO_2$.

Early ATRP procedures required addition of a sufficiently high concentration of the transition metal complex to overcome the effect of unavoidable increased concentration of the deactivator in the reaction medium while still driving the reaction to the desired degree of polymerization in a reasonable time frame while retaining chain end functionality. Recently a novel approach that allowed a significant reduction in the concentration of added catalyst was developed. [*PCT Int. Appl.* WO 2005/087819; Carnegie Mellon University, 2005; 96 pp.] The driving force was the economic penalty associated with purification procedures coupled with a deeper understanding of the ATRP rate law (Equation 1. using $Cu^I$ as the catalyst metal) which shows that $R_p$, the polymerization rate, depends only on the ratio of the concentration of [$Cu^I$] to [$X-Cu^{II}$], and does NOT depend on the absolute concentration of the copper complexes (Equation 1). Therefore in principle, one could reduce the absolute amount of copper complex to ppm levels without affecting the polymerization rate.

$$R_p = k_p[M][P^*] = k_p[M]K_{eq}[I]_o \frac{[Cu^I]}{[X-Cu^{II}]} \quad (1)$$

However, a balance had to be reached between the formed activator species (i.e. $Cu^I/L$, where L=ligand) and a residual amount of deactivating species (i.e. $X—Cu^I/L$) which is required for a well-controlled polymerization since both, molecular weight distribution and initial molecular weight, depend on the ratio of the propagation and deactivation rate constants and the concentration of deactivator, formula (2).

$$\frac{M_w}{M_n} = 1 + \frac{1}{DP_n} + \left(\frac{[R-X]_o k_p}{k_{da}[X-Cu^{II}]}\right)\left(\frac{2}{q} - 1\right) \quad (2)$$

This means, for example, that in order to obtain polystyrene with $M_w/M_n \sim 1.2$, when targeting a DP~200 and 90% conversion at ~100° C, the actual amount of $X—Cu^{II}$ species required to conduct a controlled reaction is ~2 ppm ($k_p \sim 10^3$ $M^{-1}s^{-1}$ and $k_{ds} \sim 10^7 M^{-1}s^{-1}$), meaning that the concentration of the $X—Cu^{II}$ species could be reduced over 1,000 times from the level typically used in the earlier ATRP polymerization protocols. Unfortunately, if the amount of $Cu^I$ is reduced 1,000 fold, unavoidable radical-radical termination reactions irreversibly consume the activators present in the reaction media as the polymerization progresses and the reaction slows down or stops; i.e. if ~10% of chains terminate and the amount of $Cu^I$ initially added to the system was below 10 mole % of the initiator, all $Cu^I$ would be consumed by termination. It was recognized that this situation could be overcome if there was constant regeneration of the $Cu^I$ activator species by environmentally acceptable organic or inorganic reducing agents to compensate for any loss of $Cu^I$ by termination, Scheme 2.

This procedure was named Activator ReGenerated by Electron Transfer (ARGET) ATRP [*Macromnlecules* 2006, 39, 39-45.] and it was possible to use a range of reducing agents; e.g. tin$^{II}$-2-ethylhexanoate, ascorbic acid, glucose, amines, excess ligand, and $Cu^0$ etc. for ARGET or a source of free radicals, such as AIBN, for Initiators for Continuous Activator Regeneration (ICAR) to constantly regenerate the ATRP activator, exemplified by a $Cu^I$ species, from the deactivator, the $Cu^{II}$ species in Scheme 2, formed during termination processes.

The electrochemical mediated ATRP procedure disclosed herein overcomes the limitations of ARGET and ICAR ATRP in that no undesirable byproducts are formed and a ratio of $Cu^IL:Cu^{II}L$ can be selected and retained or adjusted throughout the polymerization.

Cyclic voltammetry (CV) has been used for over a decade as an analytical tool to study the redox behavior of numerous transition metal complexes used in an ATRP. One of the earliest studies, [Qiu, J., et al., *Macromol. Chem. Phys.* 2000, 201, 1625-1631.] determined that the half-sum of the oxidation and reduction peak, the $E_{1/2}$ value, strongly depends on the nature of the ligand and the halogen and the measured value provided an estimate for the activity of the catalyst complex ($Cu^IL/C^{II}L$ redox couple) in an ATRP, and that this value strongly depends on the nature of the ligand (L) and the halogen. The general trend agreed with the kinetic features of ATRP catalyzed by the corresponding transition metal complex, and a correlation between the measured redox potential and the apparent equilibrium constant of ATRP was observed. The more negative the redox potential of the complex, as measured by CV, the faster the polymerization indicating that, in most cases, the catalytic activity of the transition metal complexes in an ATRP can be predicted from the redox potential of the transition metal complex. Two more recent studies by the primary author, K. Matyjaszewski, on a broader spectrum of transition metal/ligand complexes in a number of different solvents confirmed the conclusion that excellent correlation existed between the equilibrium constants with the $Cu^{II}/Cu^I$ redox potential and the carbon-halogen bond dissociation energies. [Matyjaszewski; et al. *Macromoleades* 2007, 40, 8576-8585 and *J. Am. Chem. Soc.* 2008, 130, 10702-10713.]

This analytic tool, CV analysis, was used extensively to provide information on the expected properties of the transition metal complex in an ATRP. [Bortolamei, N., et al., *Macromolecules,* 2010: 43, 9257-67 and *Electrochim. Acta,* 2010, 55(27): 8312-8318.] CV analysis had always been carried out in the absence of monomer and in the absence of initiator. However, there is a recent paper, by one of the authors of the initial CV paper, (C. Amatore) where the notion of utilizing an electrochemical technique to produce an electrogenerated Fe$^{II}$Salen complex providing activation Scheme 2: Use of reducing agents to continuously reactivate the fraction of deactivator formed by termination reactions.

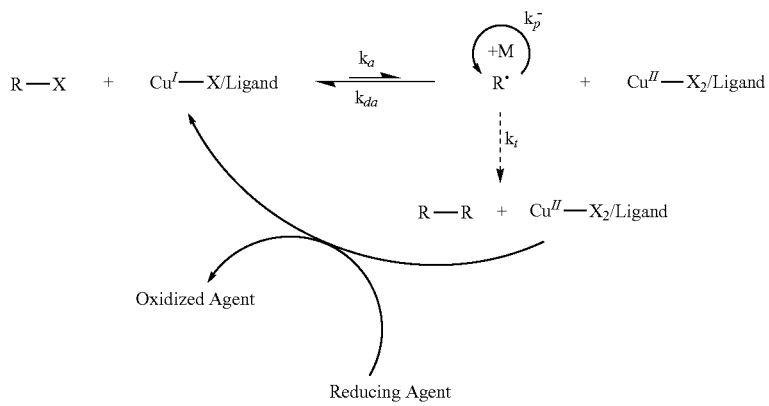

of alkyl- and benzyl halide initiators as the initial step of an atom transfer radical addition (ATRA) reaction. [*J. Electroanal. Chem.* 2009, 633, 99-105] CV's conducted in the absence and presence of an ATRP initiator showed that reductive cleavage of the R—X bond occurred on the timescale of the CV measurement but suggested that it does not lead to a classical redox-catalysis framework. Additionally, it was noted that addition of a monomer adversely affected the voltammogram of the studied iron complex. Attempts to polymerize styrene at 110° C., a temperature at which self initiated polymerization occurs, in the presence of a $Fe^{II}$Salen complex formed by electrolysis resulted in the formation of low molecular weight oligomers with broad polydispersity over a three hour period (MW 1868, $M_w/M_n$1.768). Furthermore, the paper indicates that multiple transition metal/ligand/initiator species were involved in the reaction and determined that activation of alkyl halides by an electrogenerated $Fe^{II}$Salen complex did not proceed along the redox mediated process usually invoked in an ATRP and the results presented showed no evidence of the development of a CRP process. These results would teach against using electrochemistry to improve the degree of control an ATRP.

In US2011/0034625A1 the concept of using electrochemically produced free radicals for the initiation of a standard free radical polymerization is considered. The procedure focuses on direct formation of free radicals, substantially hydroxyl radicals, on the basis of electrolysis at anodic electrode surfaces. While indicating that the procedure could be employed to initiate a CRP this reference provides no evidence of a methodology which would allow manipulation of a redox-active species via electrochemical methods to subsequently control a CRP procedure.

There are no reports in the decade since the first report using cyclic voltammetry as an analytical tool to measure the redox potential of a transition metal complex to determine if electrochemistry could be used to mediate an ATRP. The notion of utilizing an electrochemical technique (i.e. electrolysis) to modulate polymerization kinetics has never been reported.

BRIEF DESCRIPTION OF THE INVENTION

Disclosed herein in one embodiment of the invention is an atom or group transfer polymerization process where the ratio of the activator and deactivator oxidation states of the catalyst complex in the reaction medium is continuously balanced, adjusted, controlled, or dictated and maintained by electrochemistry.

According to one embodiment, the present disclosure provides for a polymerization process, comprising: polymerizing free radically (co)polymerizable monomers in the presence of a polymerization medium. The polymerization medium initially comprises at least one transition metal catalyst that can participate in a redox reaction, and an initiator comprising one or more redox transferable atoms or groups, wherein the molar ratio of the oxidation states of the transition metal catalyst are adjusted, controlled, and/or maintained by electrochemistry. The electrochemistry may include adjusting, controlling and/or maintaining one or more of an applied voltage, a current, and a charge passed through the polymerization medium.

In another embodiment of the invention his novel procedure was also applied to aqueous based ATRP, both homogenous and heterogeneous systems.

DESCRIPTION OF EMBODIMENTS OF THE INVENTION

The following figures illustrate that procedures were developed for controlled electrochemically mediated ATRP, ("eATRP").

FIG. 1: Schematic of an electrochemical cell listing some of the electrical variables and electrolyte variables targeting an ATRP reaction with a copper catalyst.

Figure 2:
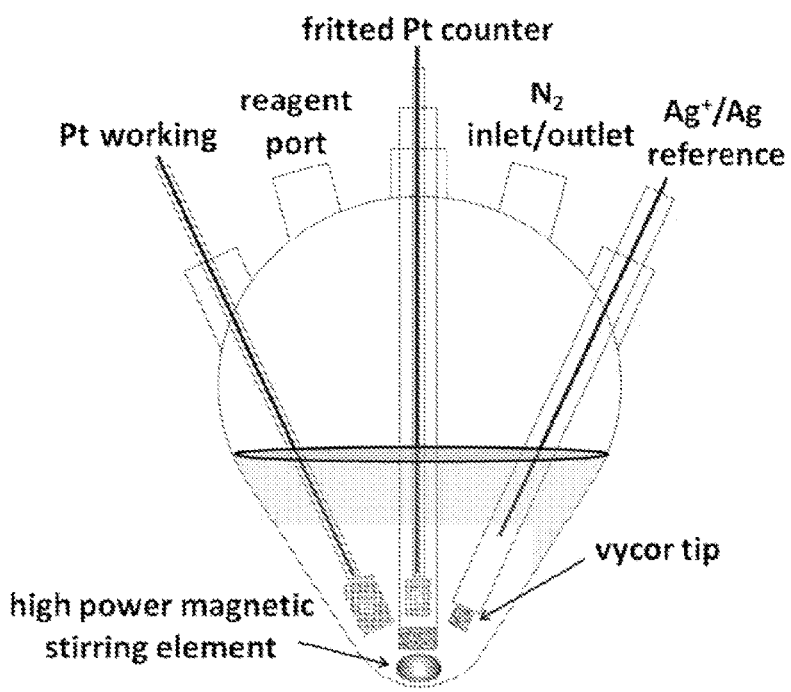

FIG. 2: Schematic of electrolysis cell configured with a platinum mesh working and counter electrode used in certain eATRP experiments.

FIG. 3: Results of conducting cyclic voltammetry (CV) on (A) a solution of MeCN/MA solvent/monomer and (B) a solution of $Cu^{II}Br_2$ in MeCN/MA.

Figure 4:
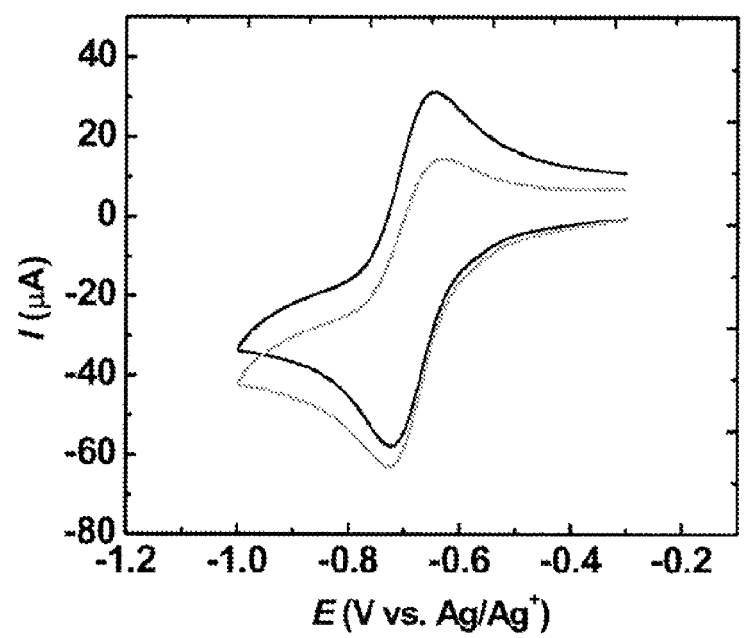

FIG. 4: Cyclic voltametry of a solution of MeCN/MA/$Me_6$TREN/$Cu^{II}Br_2$, in the absence (black curve), and in the presence of EBP (grey curve), an ATRP initiator.

Figure 5A:
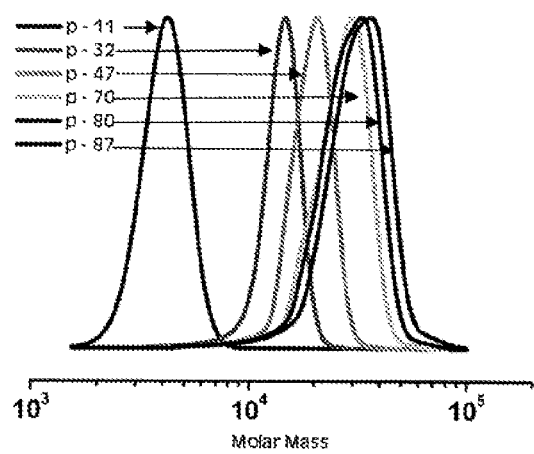

FIG. 5: GPC traces of polymers formed at different conversions during electrochemical mediated ATRP of MA with different applied voltages; (A)E=−0.637 and (B)E=−0.665 V FIG. 6: Illustration of how the polymerization of methyl acrylate can be "switched on" and "switched off" by changing the E(V) between two electrodes.

Figure 7:
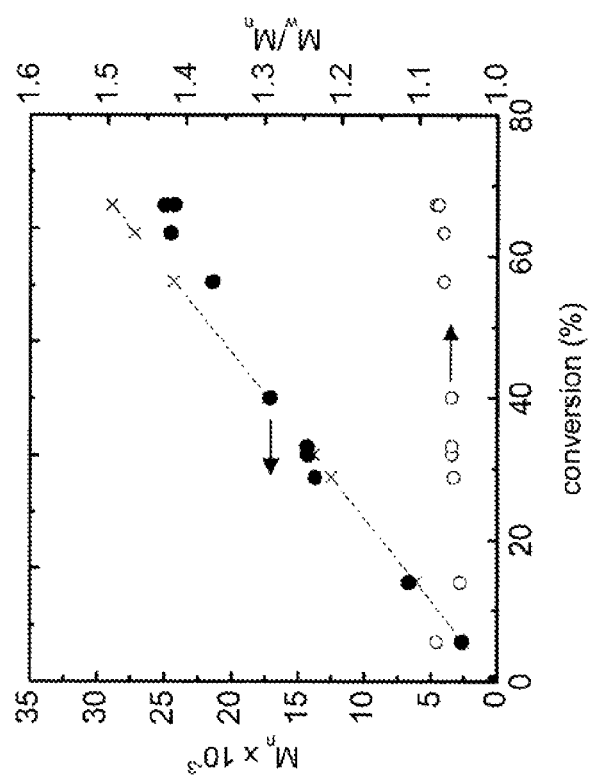

FIG. 7: Increase in molecular weight and change in $M_w/M_n$ with conversion during the intermittent polymerization illustrated in FIG. 6.

Figure 8:
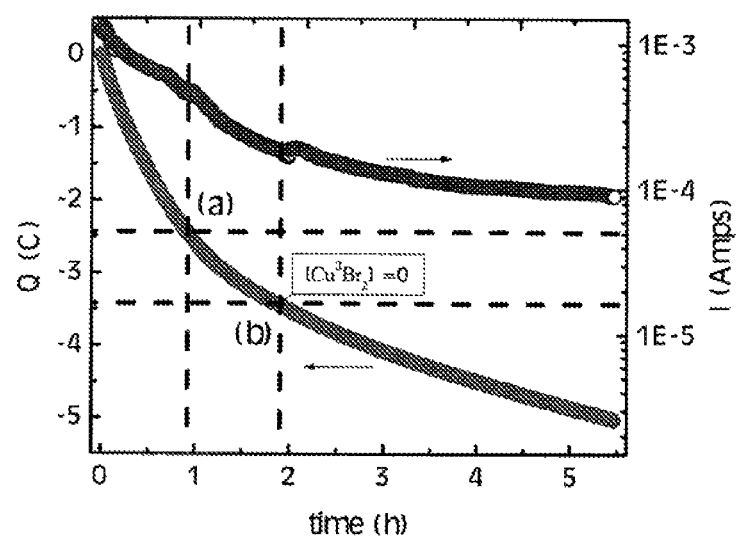

FIG. 8: Total charged (Q) and current (I) as a function of time, Exp. 2−E=−0.637

FIG. 9: Cyclic voltammetry of $Cu^{II}Br_2$/TPMA and various initiators. In each system the [M]=4.67 M and [TBAPF$_6$]=0.2 M. Molar ratios=[M]:[I]:[$Cu^{II}BR_2/L$]=300: 1:0.2.

Figure 10:
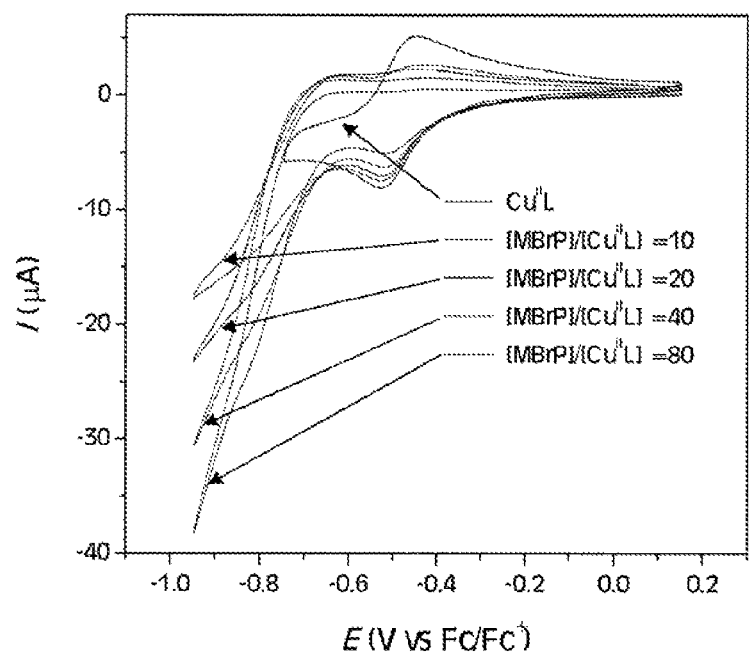

FIG. 10: Cyclic voltammetry of 1 mM $Cu^{II}Me_6$TREN in the absence and presence of different [MBrP], recorded at v=0.05 V/s on Pt, in AN/MA 1:1+0.1 M $Et_4NBF_4$.

Figure 11:
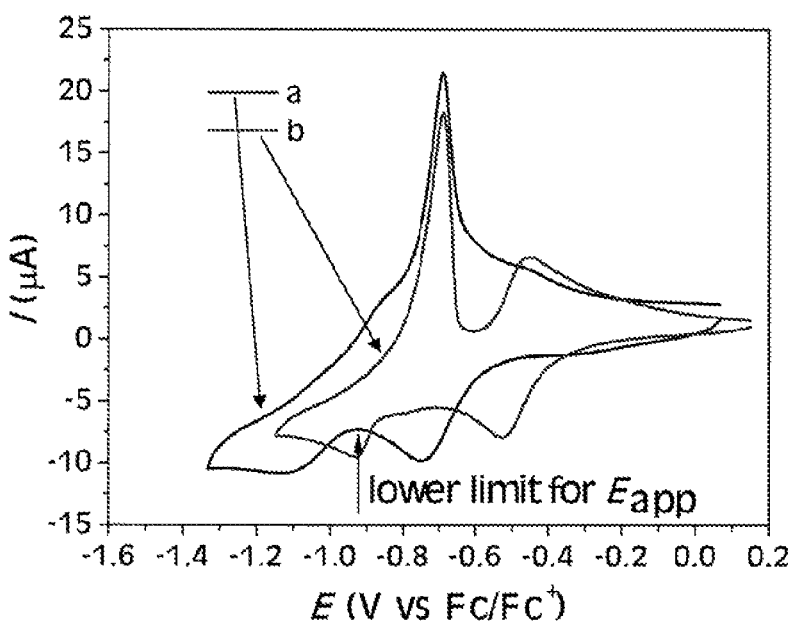

FIG. 11: Cyclic voltammetry of 1 m M $Cu^{II}Me_6$TREN in the absence (a) and presence (b) of 1 mM $Et_4$NBr, recorded at v=0.05 V/s on Pt, in 0.1 M $Et_4NBF_4$+0.1 M $Et_4NBF_4$.

Figure 12:
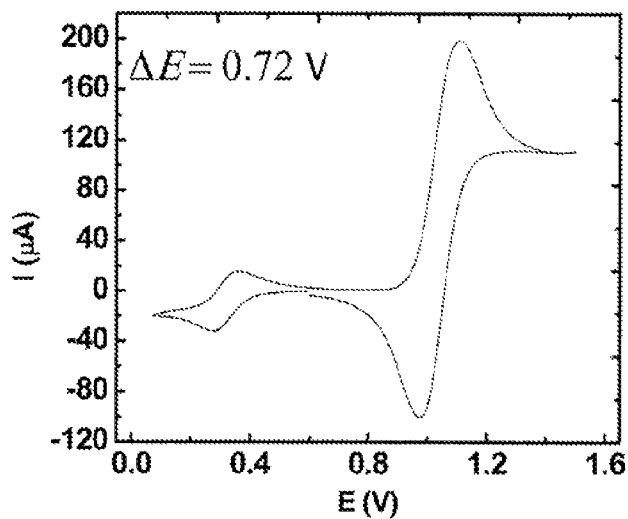

FIG. 12: cyclic voltammetry of $Cu^{II}$Br/TPMA and ferrocene.

Figure 13:
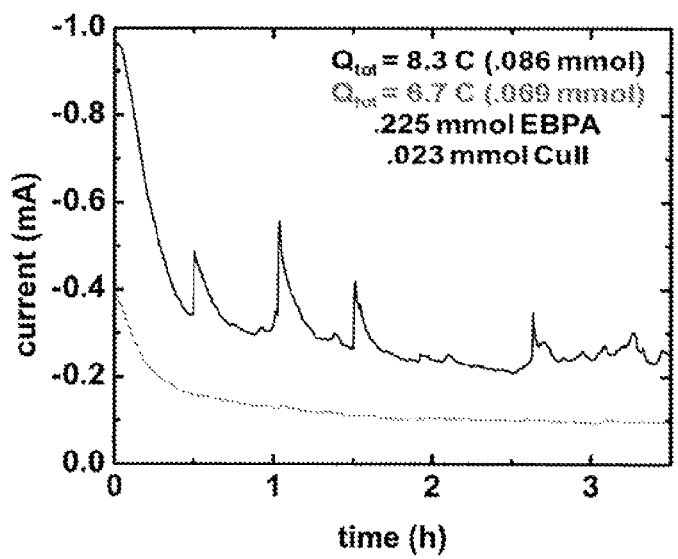

FIG. 13: Current versus time and cyclic voltammetry conducted periodically during polymerization. Polymerization conditions: [MMA]=4.5 M, [MMA]:[EBPA]:[TPMA]:[$Cu^{II}$]=300:1:0.1:0.1, T=50° C.

Figure 14:
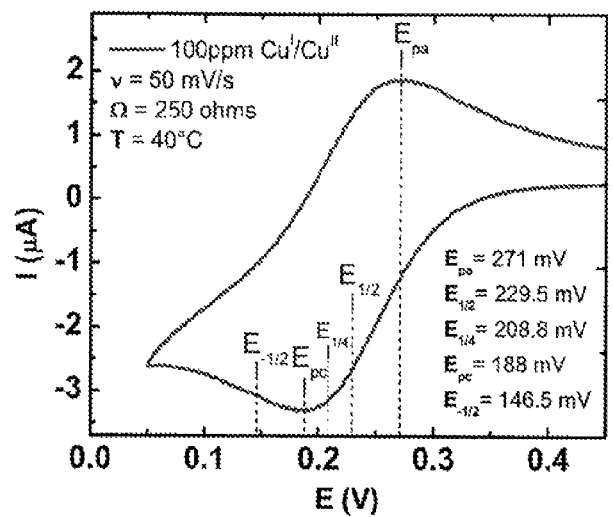

FIG. 14: Position of $E_{1/23}$, $E_{1/2}$ and $E_{1/4}$ applied potentials in optimization series of experiments for MMA showing the exemplary CV of the $Cu^I/Cu^{II}$ couple.

FIG. 15: (A) Current profile for polymerization of MMA using EBPA showing occurrence of $t_{drop}$ after a certain amount of time, exemplary for reaction 16.4. (B) Comparative current profile for polymerization of BA with EBiB initiator under similar conditions.

FIG. 16: (A) Cyclic voltammetry of $Cu^{II}$Trf/L (black), $Cu^{II}$Br/L (gray), and $Cu^{II}$Br/L with EBiB (dashed) and (B) Current and Coulombs versus time plot. [BA]/[EBiB]/[TPMA]/[$Cu^{II}Trf_2$]/[TPMA]/[TBABr]= 300/1/0.03/0.03/0.03, [BA]=3.87 M (43 (v/v) % in DMSO: Anisole), [TBAClO$_4$]0.2 M, T=40-45° C.

Figure 17A:
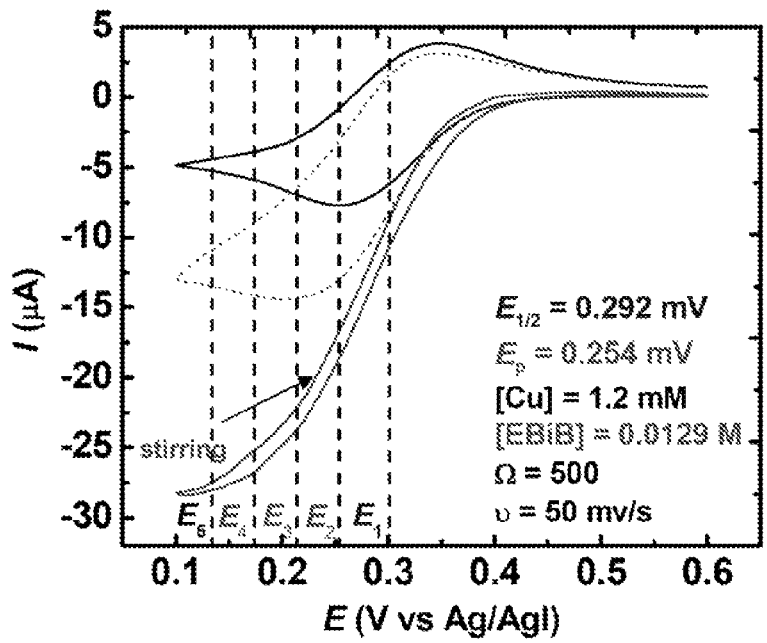
Figure 17B:
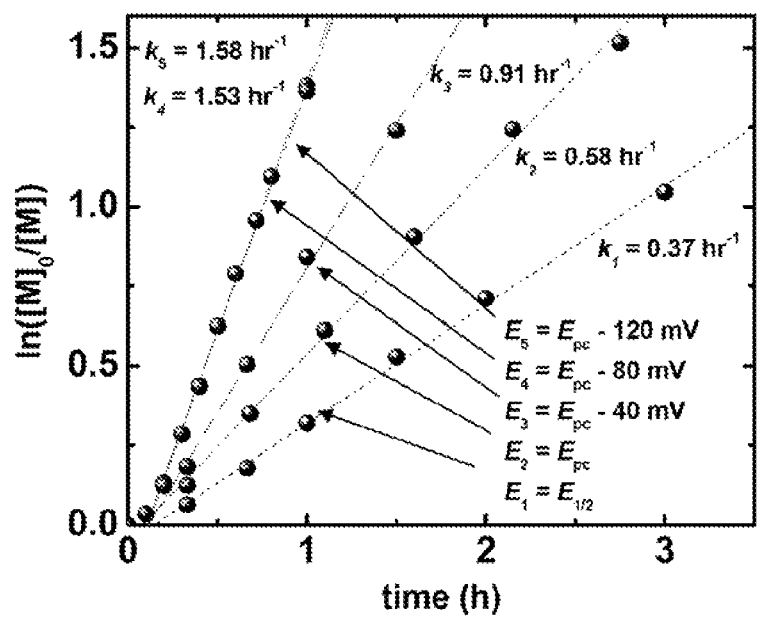

FIG. 17: (A) Cyclic voltammetry of $Cu^{II}$Br/L (black), $Cu^{II}$Br/L+EBiB (dash), and $Cu^{II}$Rr/L+EBiB+convection (gray). (B) First order kinetics versus time plot as a function of $E_{app}$.

Figure 18A:
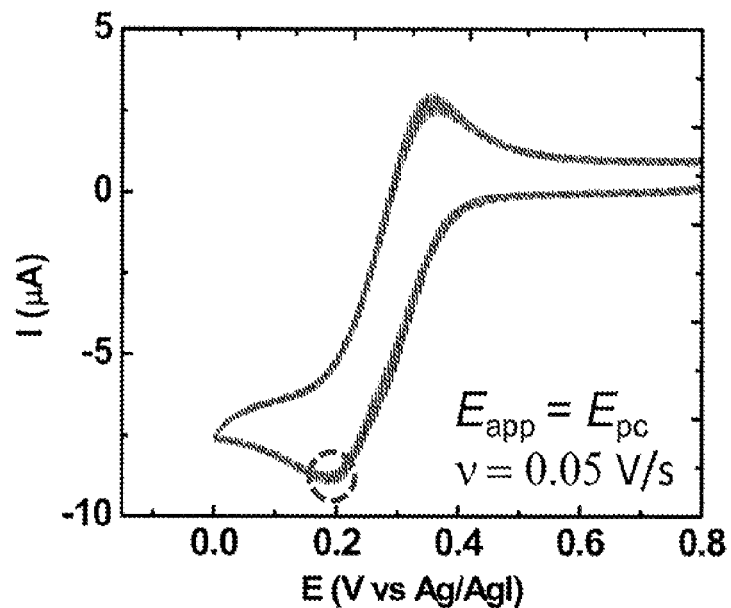
Figure 18B:
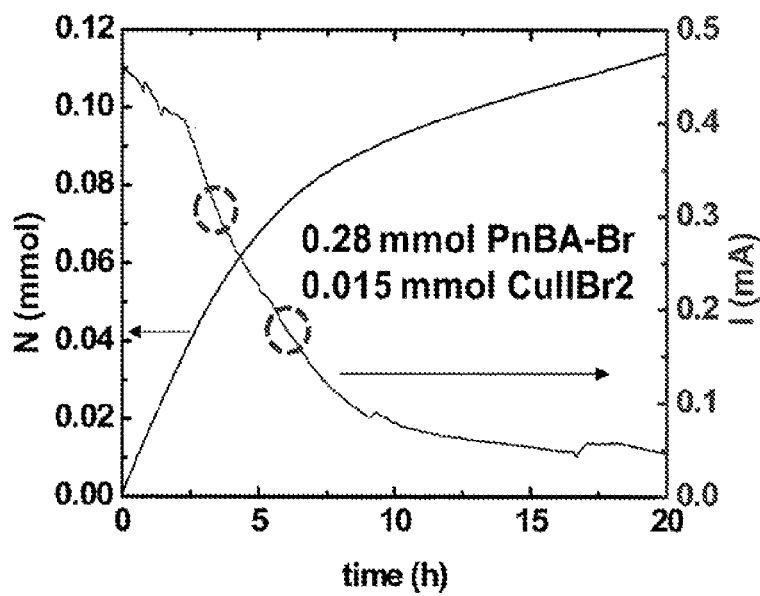

FIG. 18: (A) Cyclic voltammetry of PnBA-Br macroinitiator. (B) Plot of mmol electrolyzed (N) and current (I)

versus time. Starting conditions: [PnBA]=0.02 M, [PnBA]: [DVB]:[TPMA]:[Cu$^{II}$]1:12:0.2:0.1, T=90° C.

Figure 19:
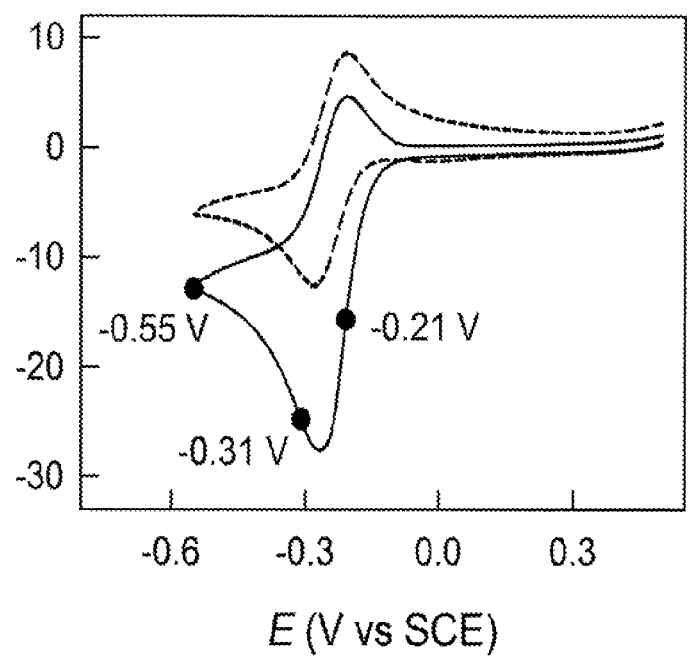

FIG. 19. CV of 1 mM Cu$^{II}$L$^{2+}$ in H$_2$O/OEOMA475 (9/1, v/v)+0.1M Et$_4$NBF$_4$ recorded at v =0.1 V/s in the absence ( - - - ) and presence (black solid) of 1 mM HEBriB; the three dots on the CV indicate the E$_{app}$ values used in the polymerization experiments.

Figure 20:
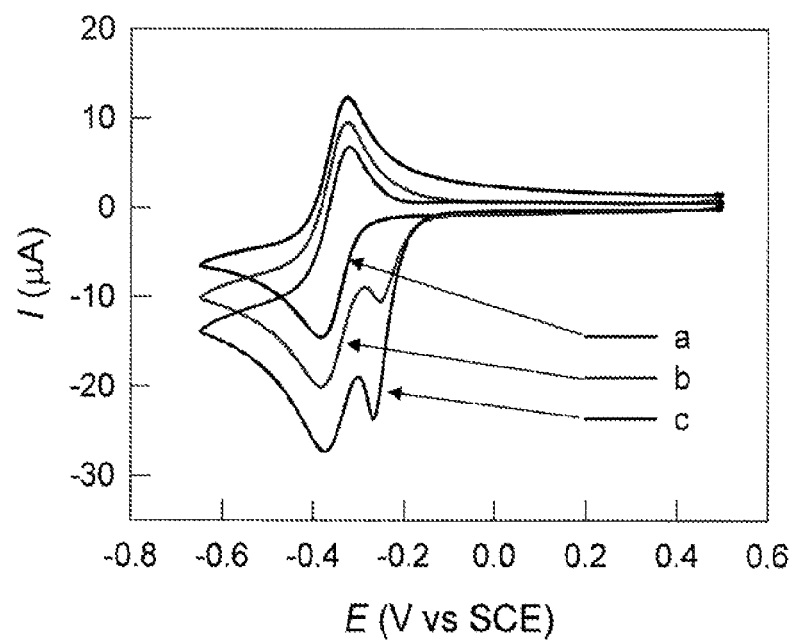

FIG. 20: Cyclic voltammetry of 1 mM Cu$^{II}$L$^{2+}$ in the absence (a) and presence of 1 mM HEBriB (b) or 2 mM HEBriB (c), recorded at 0.1 V/s in H$_2$O+0.1 M Et$_4$NBF$_4$.

Figure 21:
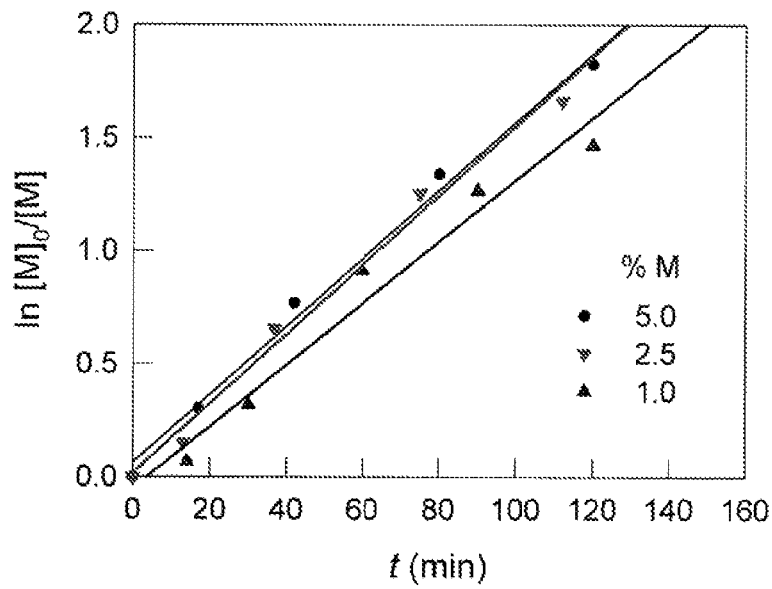

FIG. 21. First-order kinetic plots for electrochemical ATRP of OEOMA475 in H$_2$O+0.1 M Et$_4$BF$_4$ at E$_{app}$=−0.21 V vs SCE. Conditions: [Cu$^{II}$L$^{2+}$]=0.1 mM; [OEOMA]/[RX]=1000 (●), 500 (▼), 200 (▲).

Figure 22:
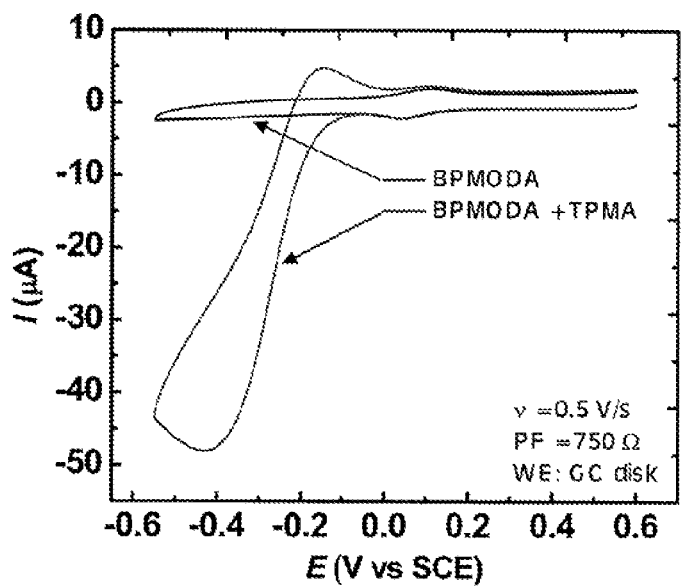

FIG. 22. CV of miniemulsions at a range of scan rates of Cu$^{II}$/BPMODA and after the addition of Cu$^{II}$/TPMA at 0.5 V/s.

FIG. 23: CV of miniemulsions (A) formulated without Cu$^{II}$/BPMODA or EBiB, and (B) with and without copper for TPMA. CVs conducted at a scan rate of 0.05 V/s using a glassy carbon electrode.

FIG. 24: (A) Current versus time profile for electrolysis (E$_{app}$=E$_p$−80 mV) and (B) Potential versus time at two I$_{apps}$.

Figure 25A:
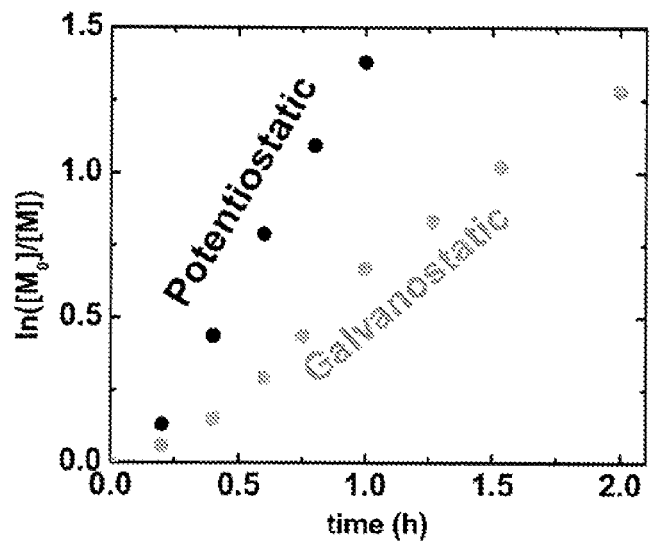
Figure 25B:
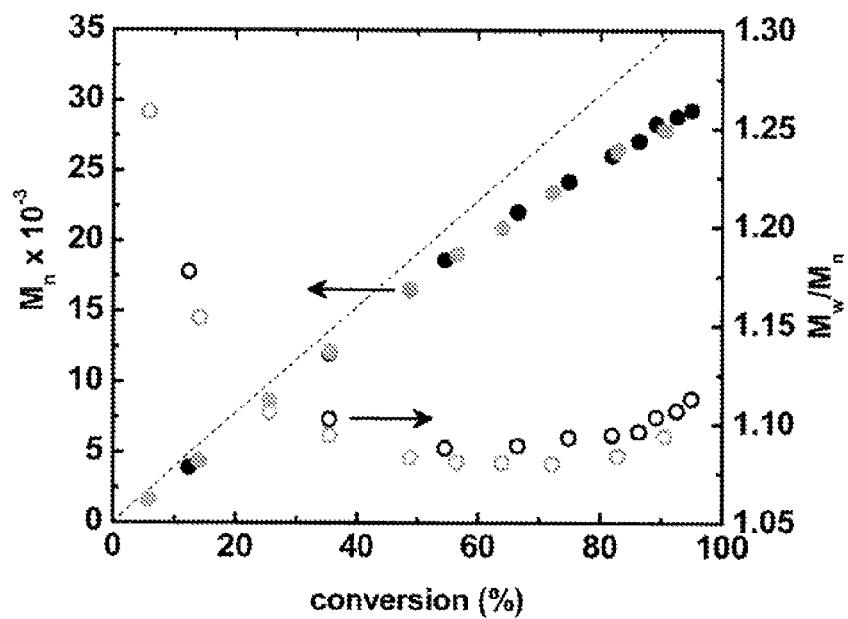

FIG. 25: (A) First order kinetics versus time plot as a function of an applied E or I and (B) Molecular weight and M$_w$/M$_a$ versus time plot for eATRP of B A in DMF.

Figure 26:
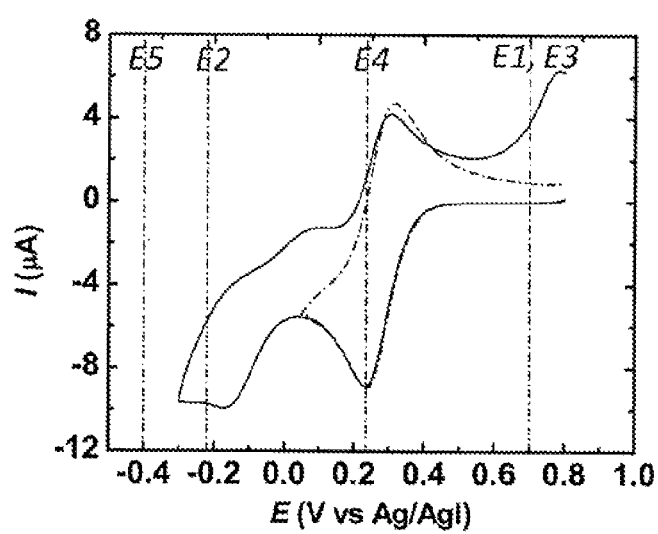

FIG. 26: Cyclic voltammetry of Cu$^{II}$Br/TPMA.

FIG. 27: (A) Conversion versus time plot as a function of applied potential. (B) Molecular weight and M$_w$/M$_n$ versus time plot for eATRP of BA in DMF.

DETAILED DESCRIPTION

The present disclosure provides for a new radical polymerization process, such as a controlled radical polymerization process. The polymerization process described herein may includes polymerizing free radically (co)polymerizable monomers in the presence of a polymerization medium initially comprising at least one transition metal catalyst that can participate in a redox reaction, and an initiator comprising one or more redox transferable atoms or groups, wherein the molar ratio of the oxidation states of the transition metal catalyst are adjusted, controlled, and/or maintained by electrochemistry. Examples of polymerization processes that are suited to the present process include, for example, atom transfer radical polymerization processes.

Here, and elsewhere in the text the word "control" and/or "controlled", when used in reference to a "controlled" polymerization process means that in the polymerization process conditions are defined whereby the contributions of the chain breaking processes are insignificant compared to chain propagation, so that polymers with predetermined molecular weights, low polydispersity and high site specific functionalities are achievable. Examples of a controlled polymerization processes described herein include controlled radical polymerization (CRP) processes, such as atom or group transfer radical polymerization (ATRP) processes.

As used herein, "polymer" refers to a macromolecule formed by the chemical union of monomers, typically five or more monomers units. The term polymer includes homopolymers and copolymers; including random copolymers, statistical copolymers, alternating copolymers, gradient copolymers, periodic copolymers, telechelic polymers and polymers of any topology including linear polymers, block copolymers, graft polymers, star polymers, bottle-brush copolymers, comb polymers, branched or hyperbranched polymers, and such polymers tethered to particle surfaces or flat surfaces as well as other natural or synthetic polymer structures.

It must be noted that, as used in this specification and the appended claims, the singular forms "a," "and", and "the" include plural referents unless the context clearly dictates otherwise. Thus, for example, reference to "a polymer" includes more than one polymer.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

It is to be understood that this invention is not limited to specific compositions, components or process steps disclosed herein, as such may vary. It is also to be understood that the terminology used herein is for the purpose of describing particular embodiments only, and is not intended to be limiting. Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

According to one embodiment, the present disclosure provides a polymerization process comprising polymerizing free radically (co)polymerizable monomers in the presence of a polymerization medium initially comprising at least one transition metal catalyst that can participate in a redox reaction and an initiator comprising one or more redox transferable atoms or groups, wherein the molar ratio of the oxidation states of the transition metal catalyst are adjusted, controlled and/or maintained by electrochemistry, such as by applying or changing one or more of an applied voltage, a current, and a charge passed through the polymerization system. Examples of polymerization processes include controlled radical polymerization processes, such as atom transfer radical polymerization (ATRP) processes. General conditions and components for ATRP processes and other controlled radical polymerization processes are known in the art, as shown by the references cited and incorporated by reference herein. For example, examples of transition metal catalysts, radically (co)polymerizable monomers, and initiators comprising one or more redox transferable atoms or groups are described in detail in the references cited and incorporated herein. Suitable transition metal catalysts include transition metals and complexes of transition metals with various ligands, including those transition metal catalyst complexes and ligands shown to be effective in the art for ATRP processes. In certain embodiments, the transition metal catalyst may comprise two different transition metals.

Embodiments of the controlled polymerization processes described herein may be designed so that the polymerization may take place in an electrolysis apparatus comprising at least a cathode and an anode. Non-limiting examples of electrolysis apparatuses are shown in FIGS. 1 and 2. According to these embodiments, the polymerization process may be controlled by the electrolysis apparatus, for example, by applying or changing one or more of an applied voltage, a current, and a charge passed through the polymerization medium. The electrolysis or electrochemical process may be selected so to control or maintain the ratio of the oxidation states of the transition metal catalyst, such as by providing a concentration for each oxidation state of the transition metal catalyst that is greater than or equal to 0.1% based on the total transition metal added in the polymerization medium.

In specific embodiments, the molar ratio of two oxidation states of the transition metal catalyst at a specific time during the polymerization process may be determined by one or more of the applied voltage, the current, and the total charge passed through the polymerization medium and the current values. For example, in a copper transition metal catalyst based system, the electrolysis may be selected to maintain the concentration of the $Cu^I$ and/or $Cu^{II}$ oxidation states of the transition metal catalyst at greater than or equal to 0.1% by weight based on the total concentration of Cu added to the polymerization medium. According to these embodiments, the rate of the polymerization may be controlled through the magnitude of one or more of the applied voltage, current and charged passed that is applied to the system.

Initial examples of the disclosed electrochemically mediated ATRP (eATRP) process employ a single catalyst complex, Cu/Me$_6$TREN, which is used as an exemplary active transition metal catalyst system in the following discussion but this in no manner limits the utility of the disclosed procedure to the exemplary catalyst. Any transition metal catalyst or transition metal catalyst complex that has been shown, or will be shown, to control an ATRP can be used in the disclosed procedure.

The specific materials selected for the preparation of electrodes used in this disclosure are exemplary materials and should not limit the choice of electrode materials in any manner nor the materials or design of the cell for either batch or continuous electrochemical mediation of the polymerization. One requirement of the disclosed eATRP procedure is that the selected current/potential is applied to a reaction medium that contains all, or precursors of all, reagents required for the polymerization and maintained for a time frame which exceeds a standard CV analysis of a potential ATRP catalyst complex. Appropriate current/potential values can be selected based upon the standard redox couple ($E_{1/2}$) determined for the reaction medium including catalyst, monomer and optional solvent in the presence or absence of an initiator. Procedures for selection of an appropriate reduction potential for each desired (co)polymerization reaction with a specific catalyst complex in a specific reaction medium are discussed below. The $E_{1/2}$ redox couple for the polymerization medium may be determined by any suitable means, for example, by cyclic voltammetry (CV). If an appropriate charge is selected for a catalyst complex and (co)monomer(s) as disclosed herein, rather surprisingly, electrochemical procedures can provide a method for forming a targeted fraction of the activator species from an added deactivator resulting in initiation of the ATRP by transfer of the transferable atom or group from the added initiator to the formed lower oxidation state transition metal complex thereby initiating controlled copolymerization of a wide range of monomers generating copolymers with low $M_w/M_n$ and high degrees of polymerization.

In certain embodiments, the voltage applied to the polymerization medium may be based on the $E_{1/2}$ value, as determined for example by CV. The voltage applied to the polymerization medium may be determined by the components in the polymerization. For example, in one embodiment, the voltage applied to the polymerization medium may be based on the $E_{1/2}$ value, as determined by CV, of the at least one transition metal catalyst and the one or more ligands present in the polymerization medium. In another embodiment, the voltage applied to the polymerization medium may be based on the $E_{1/2}$ value, as determined by CV, of the at least one transition metal catalyst, the one or more ligands, and the radically (co)polymerizable monomers present in the polymerization medium and optionally any solvent and/or any electrolyte present in the polymerization medium. In other embodiments, the voltage applied to the polymerization medium may be based on the $E_{1/2}$ value, as determined by CV, of the at least one transition metal catalyst, one or more ligands, the radically (co)polymerizable monomers, and the initiator comprising one or more redox transferable atoms or groups, present in the polymerization medium and optionally any solvent and/or any electrolyte present in the polymerization medium.

The overall mechanism of an electrochemically mediated ATRP is shown in Scheme 3.

Scheme 3: Procedure for controlling an ATRP by applied electrical potential

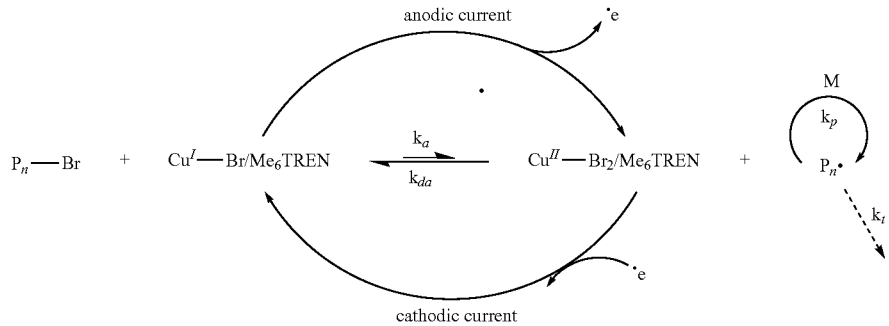

The influence of the applied potential, the electrodic area, the concentration profile of $Cu^I$ and $Cu^{II}$ during the electromediated polymerization, and the solvent-monomer ratio on the crucial features of an ATRP including conversion, polymerization time, molecular weight and polydispersity were studied and are reported below. Analysis of these parameters together with the charge-current patterns can provide a deep comprehension of the dynamics of the system, and in particular an understanding of how the heterogeneous electrochemical process affects the homogeneous or biphasic polymerization procedure.

In various embodiments, the concentration of the transition metal catalyst in the polymerization medium may be less than 1000 ppm, or in other embodiments less than 500 ppm. For example, starting from a low amount (<1000 ppm, preferably less than 500 ppm) of deactivator ($X$—$Cu^{II}/L$), the activator ($Cu^I/L$) may be generated in-situ by electrolysis at a carefully selected reduction potential. When generated, the activator molecules can then react with the redox transferable atom or group, for example, the carbon halogen bond, of the initiator molecules or dormant chain end, $P_n$—Br in scheme 3, forming active radicals through the traditional ATRP mechanism. These radicals can propagate with monomer prior to being returned to the dormant alkyl halide form by reacting with a deactivator molecule ($X$—$Cu^{II}/L$), or terminate with other radicals with a rate constant of $k_t$. In this system, activator molecules are continuously regenerated at the working electrode (i.e. cathode) to maintain a selected ratio of activator to deactivator and hence control the rate of polymerization. In this manner a constant ratio of activator to deactivator can be maintained in the polymerization medium thereby continuously maintaining the targeted rate of polymerization.

According to certain embodiments, the polymerization process can be started and stopped by changing the applied voltage or current, or switching the applied voltage or current "on" or "off". For example, changing the applied voltage or current or switching the applied voltage or current on or off, the system may provide a simple means to control any reaction exotherm. Indeed, in certain embodiments the reaction temperature may be used as a control to modify and adjust the timeframe, magnitude and voltage of the applied current to maintain the desired reaction rate at a controlled temperature as the reaction progresses. This allows unprecedented control over the polymerization procedure. Mechanical mixing of the reagents in the reaction flask assists in forming a homogeneous reaction medium by providing efficient mass transport of the generated catalyst complex away from the working electrode.

As disclosed herein electrochemical methods provide significant improvements to, and control over, an ATRP by offering readily adjustable "dials", e.g. applied voltage, current, potential, and total charge passed, to manipulate polymerization activation/deactivation, polymerization rates, and selective targeting of one or more redox-active species. In addition, electrochemistry offers an environmentally friendly alternative to current ATRP techniques that use comparable low concentrations of catalyst complex by elimination of chemical agents to form the activator and a new approach to catalyst removal through electrodeposition.

In one embodiment of the invention the ratio of the two oxidation states of the catalyst complex in an atom or group transfer polymerization process is monitored and balanced by electrochemistry, for example, continuously monitored and/or continuously balanced, thereby dictating the rate of polymerization without formation of any by-products. For example, according to various embodiments, the electrochemistry selected from applied potential, current, and charged passed may be adjusted one or more times during the polymerization process. In specific embodiments, the electrochemistry may be continuously monitored and adjusted over the course of the polymerization reaction.

In specific embodiments, the polymerization medium may further comprise one or more electrolytes. Suitable electrolytes include any ionic compound that is at least partially soluble in an aqueous phase of the polymerization medium. Non-limiting examples of electrolytes include those listed in US 2011/0034625 A1. In certain embodiments, the electrolyte may comprise the same counterion that is present on the first added transition metal salt that forms the at least one transition metal catalyst. For example, in embodiments where $Cu^{II}Br_2$ is added as the transition metal salt which will form the transition metal catalyst, the electrolyte may also comprise a $Br^-$ counterion. In other embodiments, the electrolyte may comprise a different counterion than the anion present on the first added transition metal salt that forms the at least one transition metal catalyst. For example, in embodiments where $Cu^{II}Br_2$ is added as the transition metal salt which will form the transition metal catalyst, the electrolyte may comprise an $OTf^-$ (triflate or trifluoromethanesulfonate) counterion. In certain embodiments, the electrolyte may comprise a quaternary ammonium complex or a triflate anion. In specific embodiments where the polymerization medium further comprises an electrolyte, the electrochemistry may be selected from an applied voltage and a current, and may be selected to retain at least 0.1% by weight concentration (based on total transition metal present) of an activator state of the transition metal catalyst and a deactivator state of the transition metal catalyst in the polymerization medium throughout the time period(s) when an active polymerization is desired.

Additional embodiments of the procedures are disclosed that allow a well controlled ATRP to be conducted with low concentrations of catalyst, very low concentrations of activator in a full range of solvents, including organic solvents, water, and biphasic systems.

The disclosed procedure allows one to dictate the concentration of both the activator and the deactivator in the reaction medium by adjusting the electronic potential of the current, or rate of flow of the charge. Indeed the electronic potential can, indeed should, be adjusted to match the catalyst system selected for the polymerization while providing optimal control over the radical polymerization of selected (co)monomers. The system provides additional control over the polymerization process by monitoring; total charged passed (Q) and current (I) values. Another method consists of placing a constant current (galvanostatic method) upon the electrochemical system and if desired measuring the variation of the voltage supplied at the working electrode.

According to certain embodiments, the transition metal catalyst may be a transition metal catalyst complex and comprise one or more ligands, and in specific embodiments may comprise two different ligands. Ligands may be used for a variety of reasons, for example, but not limited to, adjusting the solubility of the transition metal catalyst in the polymerization medium, or to control the reactivity of the transition metal catalyst. Suitable ligands for ATRP polymerization processes are known in the art and described in detail in the references incorporated herein. In specific embodiments, the ligands may include nitrogen containing ligands such as, but not limited to bipyridyl(bipy) based ligands, substituted pyridines (such as TPMA), and polyamines (such as $Me_6TREN$), and the like.

In certain embodiments, the relative concentration of a higher oxidation state transition metal catalyst and a lower oxidation state transition metal catalyst may be adjusted through the magnitude of the voltage or current applied to the system, thus controlling the polymerization of the radically (co)polymerizable monomers with the at least one transition metal catalyst and the one or more ligands. For example, the relative activity of a catalyst complex formed with selected ligand(s) can be adjusted, i.e. the ratio of $Mt^x/L$ to $Mt^{x+1}/L$, to provide control over the polymerization of a range of monomers just by changing the applied voltage. The rate of the polymerization is controlled by the selected ratio of $Mt^n$ to $X-Mt^{n+1}$ with the rate increasing as the value of $Mt^n/X-Mt^{n+1}$ increases. More active catalysts require less activator in the system when polymerizing active monomers. Indeed as exemplified in the experimental section this is a novel tool that expands the range of monomers that can be polymerized in an expanded range of solvents including water.

If desired, the transition metal catalyst can be removed from the contacting polymer solution by electro deposition, leaving the added ligand(s) in solution. For example, the concentration of the transition metal catalyst in the polymerization medium may be reduced by electrodeposition of the transition metal onto the surface of one of the electrodes. The solvent/ligand/unreacted monomer mixture can be removed from the polymer and recycled whereupon the ligand can react with the first deposited transition metal, optionally in the presence of a halogen containing electrolyte and in the absence of an initiator to reform a soluble transition metal complex suitable for a further electrochemically mediated ATRP of additional mcnomer(s) after addition of an initiator. In other embodiments, the transition metal catalyst or transition metal catalyst complex may be formed in-situ directly from electrolysis of the solid transition metal deposited on an electrode. In one embodiment, a transition metal catalyst complex may be formed in-situ directly from a reaction of a solid transition metal deposited on an electrode with one or more ligands in the polymerization medium.

Therefore another embodiment of the invention comprises electrodeposition of a transition metal and reformation of a soluble transition metal complex by subsequent reverse reaction with a contacting ligand in the presence of a (pseudo)halogen electrolyte. This embodiment can also be employed in "normal" ATRP reactions for catalyst removal and recycling expensive ligands.

As shown in Scheme 3 a controlled predetermined fraction of an air stable $Cu^{II}Br_2/Me_6TREN$ catalyst complex initially formulated in, or added to, the polymerization media can be "at will" electrochemically reduced to $Cu^IBr/Me_6TREN$ by application of a selected cathodic potential to invoke a controlled polymerization, whereby the formed activators (i.e. $Cu^IBr/Me_6TREN$) then react with an ATRP initiator molecule exemplified herein by an alkyl halide, further exemplified herein by a molecule with a transferable bromine, forming the corresponding deactivator (i.e. $Cu^{II}Br_2/Me_6TREN$) and radicals capable of monomer addition in a reversible fashion. This dynamic equilibrium mediates the polymerization allowing concurrent growth of polymeric species resulted in a control polymerization and polymers with predetermined molecular weights and low $M_w/M_n$. Therefore, electrochemical activation of ATRP provides significant improvements to this polymerization procedure by offering additional tools for polymerization control and an environmentally friendly alternative to the chemical reduction of $Cu^{II}$ to $Cu^I$.

The objectives initially targeted, and subsequently met, to exemplify this novel procedure include, but are not are not limited to, the following bullet points:

Provide an understanding of the influence of each of the components of the electrolyte on an ATRP.

Demonstrate polymerization control with specifically selected applied potential, or current, with alkyl (meth) acrylate(s) as exemplary monomers;

Demonstrate that the ratio of $Cu^I$ to $Cu^{II}$ copper salts forming partially soluble catalyst complexes with active ligands, e.g. $Me_6TREN$ or TPMA, can be adjusted to control polymerization of a broad range of radically polymerizable monomers. This concept is based on the idea that the applied constant electric current can control the relative concentrations of $Cu^I$ and $Cu^{II}$ in the reaction medium and hence the kinetics, or instantaneous rate of the polymerization reaction for a range of monomers.

Demonstrate preparation of macromolecules with complex topology.

Develop an aqueous electrochemical system this is desired since:

The vast majority of electrochemistry is conducted in aqueous media.

Bio-responsive molecules are water soluble but can undergo undesired conformational changes in the presence of organic media.

Identify a mixed catalyst complex for bi-phasic ATRP.

Demonstrate catalyst removal by electrodepositing copper

Various embodiments of the polymerizations described herein may include a polymerization medium where the medium is selected from the group consisting of an organic medium, an aqueous medium, and a biphasic medium. Controlled/living/radical polymerizations (C/LRPs) described herein performed in aqueous media are very attractive both from economic and environmental points of view. In addition to the synthesis of water soluble polymers from polar monomers using the processes described herein, aqueous media can be used for the polymerization of nonpolar monomers in biphasic systems, for example, through emulsion, microemulsion, or miniemulsion techniques.

In one embodiment a mixture of reagents/ligands is employed in order to adapt emulsion systems to the eATRP process. Significant reaction modifications and mechanistic considerations must be taken into account in order to conduct a successful "triphasic" controlled polymerization. In a non-limiting exemplary formulation of an eATRP miniemulsion comprising an oil soluble BPMODA based catalyst system requires the addition of a second more hydrophilic catalytic complex ($Cu^{II}$/TPMA), reduced reaction temperatures (65° C), and addition of a supporting electrolyte (TEABF$_4$) to efficiently activate the relatively isolated oil soluble dispersed BPMODA catalyst complex. Mechanistically, addition of a second copper ligand complex creates various pathways through which electrochemical activation of the dispersed catalyst could occur and overcomes the dual heterogeneous nature of the system comprising an oil/water and an electrode/water interface. The hydrophilic catalyst complex and/or bromine anions serve as electron messengers transporting electrons from the electrode to the organic phase by reacting with the more water soluble $Cu^{II}$ ligand complexes) and initiator/dormant chain end(s) at, or close to, the phase boundary. The dual ligand communication pathway between an electrode and the dispersed organic phase operates in all stable biphasic polymerization media including microemulsion, miniemulsion and the ab initio emulsion system. Inverse emulsion systems could be controlled in a similar manner with an oil-soluble catalyst complex acting to shuttle the charge from the electrode to the dispersed aqueous phase.

In contrast to the remarkable success of ATRP in organic solvents, aqueous ATRP has been found to suffer from some limitations, especially in control and targeted degree of polymerization (DP). [*J. Polym. Sci, Part A: Polym. Chem.* 1998, 36, 1417-1427] Aqueous ATRP is usually fast with relatively high $K_{ATRP}$. [*Chem. Rev.* 2007, 107, 2270-2299] In addition, the halidophilicity ($K_x$) of $Cu^{II}L^{2+}$, i.e. association of $X^-$ to $Cu^{II}L^{2+}$ is low and the deactivator $XCu^{II}L^+$ is not always stable toward dissociation. [*Macromolecules* 2004, 37, 9768-9778] Furthermore, certain $Cu^{I}L^+$ complexes are unstable in water and may undergo disproportionation. In fact, control over an aqueous polymerization was improved by using high $[X^-]$, which helps to suppress deactivator dissociation. Developing successful aqueous ATRP requires taking all these issues into consideration. These limitations are overcome in an eATRP.

In a copper mediated aqueous eATRP the reaction mixture initially contains monomer, initiator, and $Cu^{II}L^{2+}$ (or $Cu^{II}L^{2+}+X$—$Cu^{II}L^+$). No polymerization occurs under these conditions, as there is no $Cu^{I}L^+$ activator in solution. The reaction starts only when a potential ($E_{app}$) is applied to the cathode so that reduction of $Cu^{II}L^{2+}$ to $Cu^{I}L^+$ occurs at the electrode. The value of $E_{app}$ can be appropriately chosen to achieve a continuous production of a small quantity of $Cu^{I}L^+$ and consequently control the concentration of $R^{\bullet}$ throughout the reaction. The livingness of the polymerization process is ensured by the combination of low $[R^{\bullet}]$ and very high $[Cu^{II}L^{2+}]/[Cu^{I}L^+]$. The overall rate of the process and the degree of control over polymerization can be tuned by adjusting $E_{app}$.

One embodiment of the invention describes an electrochemical ATRP water based polymerization process by setting the $E_{app}$ to provide a combination of low $[R^{\bullet}]$ and high $[Cu^{II}L^{2+}]/[Cu^{I}L^+]$ ratio, as high as 99.9/0.1. Indeed the overall rate of the process and the degree of control over the polymerization can be tuned by adjusting the $E_{app}$.

Although development of AGET (Activators Generated by Electron Transfer) ATRP gives good results in terms of both control and DP, the appropriate ratio $[Cu^{II}]/[\text{reducing agent}]$ and the nature of the reducing agent is critical. [*J. Polym. Sci. Part. A. Polym. Chem.* 2009, 47, 1771-1781] The ideal process should have a constant, high $Cu^{II}/Cu^{I}$ ratio, which can hardly be achieved by a single addition of reducing agents. This limitation can be overcome in an eATRP as no added agents are required. In another embodiment targeting environmentally benign systems the concentration of transition metal in the polymerization medium is less than 1000 ppm, preferably less than 500 ppm and more preferably less than 100 ppm.

In another embodiment of the invention directed at preparing block copolymers with a single catalyst complex the degree of polymerization and dispersity of each block can be tuned by adjusting $E_{app}$ to attain optimal control over each block. After the first monomer is converted to a first segment the second monomer can be added and the $E_{app}$ adjusted to provide the desired level of control for the polymerization of the second segment(s) without changing the catalyst. Optionally if a "clean" second block, i.e. without incorporation of any residual "first" comonomers, is desired the current can be switched "off" and first comonomers removed leaving the catalyst complex present in the pure first block macroinitiator prior to adding the second comonomers then switching the second polymerization "on" by selecting the desired $E_{app}$.

Various features of the present invention will become more apparent upon consideration of the following examples. The various embodiments of this disclosure described in the following examples are not to be considered as limiting the invention to their details. All parts and percentages in the examples, as well as throughout this specification, are by weight unless otherwise indicated.

EXAMPLES AND DISCUSSION OF EXAMPLES

The IUPAC definition of terms used in electrochemical reactions are summarized in Chapter 1 of the Handbook of Electrochemistry, Edited by C. G. Zoski; Elsevier, 2007, and will be employed in the following discussion. This Handbook of Electrochemistry also provides information on selection of electrodes for the disclosed process. The electrodes used in the initial examples are chosen as exemplary materials and do not limit the choice of electrode materials in any manner. Definitions of terms, equations and important relationships are also provided in Electrochemical Methods, Fundamentals and Applications, A. J. Bard, L. R. Faulkner, second edition John Wiley & Sons, 2001. Chapter 11 of the book also provides a discussion on bulk electrolysis methods.

| Abbreviations | |
| --- | --- |
| Tris((2-dimethylamino)ethyl)amine) | ME$_6$TREN |
| Tris 2-pyridylmethylamine | TPMA |
| Bis(2-pyridylmethyl)octadecylamine | BPMODA |
| Ethyl α-bromophenylacetate | EBPA |
| Ethyl α-bromoisobutyrate | EBiB |
| Ethyl 2-bromopropionate | EBP |
| Hexadecane | HD |
| Methyl bromopropionate | MBrP |
| Tetrabutylammonium hexafluorophosphate | TBAPF$_6$ |
| Tetrabutylammonium bromide | TBABr |
| Tetrabutylammonium perchlorate | TBAClO$_4$ |
| Tetraethylammonium tetrafluoroborate | Et$_4$NBF$_4$ |
| Tetraethylammonium bromide | Et$_4$NBr |
| 2-hydroxyethyl 2-bromoisobutyrate | HEBriB |
| Acetonitrile | MeCN |
| Dimethylsulfoxide | DMSO |
| Poly(ethylene glycol) methyl ether methacrylate | OEOMA$_{475}$ |
| Ethylene glycol diacrylate | EGDA |
| 2-hydroxyethyl acrylate | HEA |

In order to determine if the concept of utilizing electrochemistry to control an ATRP, summarized in Scheme 3, was indeed possible an electrochemical cell was constructed. The desired functions of the cell are represented in FIG. 1. It was envisioned, and then confirmed that, as shown in Scheme 3, the ATRP equilibrium could be controlled by subjecting the reaction medium to a specifically selected applied voltage, ($E_{app}$). The exemplary electrochemical cell was designed to be suitable for both electrolysis of $Cu^{II}$ and to provide control over a standard ATRP. A pear shaped five neck jacketed flask was selected as the foundation for a laboratory electrochemical cell and was equipped with a "rare earth" stirring element, a N$_2$ purge, and a peristaltic pump for cooling. Each of the necks was fitted with either: a silver/silver (Ag/Ag+) ion reference electrode, a platinum mesh/disk working electrode, a platinum mesh counter electrode, and an inlet/outlet port for samples and reagents. A silver/silver reference electrode, a Pleskov electrode, was selected as reference electrode because it is well suited for electrochemistry in organic media; specifically the initial examples conducted with MeCN as solvent. The counter electrode was designed to be enclosed in a separate fritted compartment to reduce diffusion of oxidized species at the counter electrode into the polymerization occurring in the main compartment of the reactor. Therefore, the counter electrode was jacketed within a fritted compartment. The working electrode was made of a platinum mesh. A mesh was selected over a disk/button working electrode because of its larger relative surface area, although a platinum button working electrode was used for all analytical cyclic voltammetry (CV) measurements conducted prior to the addition of an initiator. Fabrication of all electrodes was undertaken within the laboratory, since they are not commercially available, and comprise a standard conductive wire encased in a glass compartment. The wire was soldered to platinum wire and coated with a chemically stable epoxy coating. A schematic of the reaction flask is shown in FIG. 2.

As exemplified in the following examples application of electrochemical techniques to ATRP introduces a unique and novel strategy to dynamically control this redox driven polymerization process. The initial experiments demonstrated that any desired fraction of the catalyst complex in an ATRP reaction medium formulated with air stable $Cu^{II}Br_2$/$Me_6TREN$ catalyst complex can be "on demand" reduced to provide targeted levels of $Cu^{II}Br/Me_6TREN$ activators to invoke or trigger polymerization. The extent and rate of reduction is dictated by the initially applied potential ($E_{app}$) allowing one to control the efficiency and rate of initiation from the added (pseudo)alkyl halide initiator. The ratio of $Cu^{I}Br/Me_6TREN:Cu^{II}Br_2/Me_6TREN$ can be adjusted throughout the polymerization reaction to provide optimum control when taking into account the gradual increase in viscosity as the polymer chain increases in molecular weight and, with certain monomers, the change in polarity of the reaction medium as the reaction progresses. Further to this point, electrochemical methods allow lower oxidation state catalyst ($Cu^{I}Br/Me_6TREN$) to be reverted back to their original higher oxidation state under an anodic potential providing a means to continuously balance the ratio of lower to higher states of the transition metal complex and if desired deactivate an ongoing polymerization.

Therefore in one embodiment of the invention alterations of polymerization rates through switching, or continuous adjusting of the catalyst oxidation states, allows enhanced levels of polymerization control and in essence enables precise modification of macromolecular species at any specified time during the polymerization.

Example 1

Influence of an Added Electrolyte on Polymerization of Methyl Acrylate

A series of control experiments were conducted focusing on understanding the influence of addition of an electrolyte to an ATRP. It is envisioned that any salt will suffice as long as it is soluble in the reaction medium. A variety of different acids and bases can be employed, indeed any molecule which is composed of ions or compounds which can be made into ions, including ionic liquids, are potential electrolytes. $TBAPF_6$ was selected as an exemplary electrolyte due to its stability at a wide range of electrolytic potentials in MeCN. Two polymerizations were conducted utilizing copper wire as a reducing agent, one without and one with an electrolyte. The results are reported in Table 1. The system without an added electrolyte, entry 1, proceeded rapidly achieving a final conversion of 88% in 3 hours while maintaining linear first order kinetics and a strong correlation between experimental and theoretical molecular weights. Addition of $TBAPF_6$ to the polymerization system resulted in slightly improved control, entry 2. First order kinetic behavior was observed, indicating the maintenance of a constant concentration of radicals throughout the polymerization, and molecular weights values clearly matched those of the theoretical values while attaining a narrow molecular weight distribution. These results confirmed that the addition of an electrolyte, with bulky non-coordinating counter ions has little, or no, adverse effects on an ATRP. This procedure of adding an electrolyte also provides a means to control the concentration of a desired counterion in the reaction medium.

Interestingly, switching the electrolyte anion from $PF_6^-$ to bromide (Table 1, entries 2 and 3) changed the behavior of the system and a lower than targeted MW was obtained, entry 3, indicating lower initiation efficiency due to early termination reactions but a subsequent controlled polymerization. Upon increasing the concentration of the TBABr electrolyte, entry 4, lower final conversions and slower polymerization rates occurred. This behavior may be explained due to the fact that in a standard ATRP excess bromide ions are capable of displacing the $Me_6TREN$ ligand in the active transition metal complex, in agreement with the conclusions in a speciation paper by Bortolamei et al. [Macromolecules, 2010 9257].

Example 2

Electrochemically Mediated Polymerization of Butyl Acrylate (BA)

An initial scouting experiment was performed with butyl acrylate as monomer at the selected $E_{1/2}$. The potentiometric charge was selected to provide a target conversion of 90% in 4 hours (14,400 seconds). The initial reaction conditions were: $[M]_0$=5.56 M, [R—X]=0.0278 M, $[Cu^{II}Br_2]$=0.00139 M based on the knowledge that $k_p$ for methyl acrylate at 30° C.=16,600 $M^{-1}s^{-1}$ and $K_{ATRP}$ for $Cu/Me_6TREN$ at 22° C. with MeBrP as initiator=2.9 $E^{-6}$. It was calculated that the concentration of radicals in the system should be 9.622×$E^{-9}$ which would require $E^0$=$E_{1/2}$=0.30 V to generate the required catalyst ratio of $Cu^{I}Br/Cu^{II}Br_2$=~0.12. Results of this experiment are reported in Table 2.

TABLE 1

Control polymerizations to determine influence of electrolyte on ATRP

| Exp. (#) | ATRP System [MA]:[EBP]:[Me$_6$TREN]:[Cu$^{II}$Br$_2$] | Electrolyte | [Electro] (M) | [Cu$^0$] (mm$^2$/mL)/(mm) | time (h) | conv.$^b$ (%) | M$_{n,\,theo}$ (g/mole) | M$_{n,\,GPC}$ (g/mole) | M$_w$/M$_n$ | I$_{eff}$ |
|---|---|---|---|---|---|---|---|---|---|---|
| 1 | 500:1:0.05:0.05 | None | 0 | 40/53 | 3.0 | 88.4 | 38,174 | 32241 | 1.11 | 1.18 |
| 2 | 500:1:0.05:0.05 | TBAPF$_6$ | 0.11 | 40/53 | 2.6 | 89.3 | 38,571 | 39,764 | 1.07 | 0.97 |

TABLE 1-continued

Control polymerizations to determine influence of electrolyte on ATRP

| Exp. (#) | ATRP System [MA]:[EBP]:[Me$_6$TREN]:[Cu$^{II}$Br$_2$] | Electrolyte | [Electro] (M) | [Cu$^0$] (mm$^2$/mL)/(mm) | time (h) | conv.[b] (%) | M$_{n, theo}$ (g/mole) | M$_{n, GPC}$ (g/mole) | M$_w$/M$_n$ | I$_{eff}$ |
|---|---|---|---|---|---|---|---|---|---|---|
| 3 | 500:1:0.05:0.05 | TBABr | 0.11 | 40/53 | 3.4 | 75.0 | 32,428 | 26774 | 1.15 | 1.21 |
| 4 | 500:1:0.05:0.05 | TBABr | 0.33 | 40/53 | 3.5 | 53.6 | 23,204 | 20,193 | 1.50 | 1.15 | a - All polymerizations: [M] = 5.56M in MeCN, Temp = 30° C.,
[b]Determined by $^1$H NMR.

TABLE 2

Polymerization of BA with potentiostatic conditions

| ATRP System | [M]/[I]/[L]/[Cu$^{II}$] | E (V) | time (h) | Conv. (%) | M$_{n, theo}$ (g/mole) | M$_{n, GPC}$ (g/mole) | M$_w$/M$_n$ |
|---|---|---|---|---|---|---|---|
| BA/EBP/Me$_6$TREN/Cu$^{II}$Br$_2$ | 300/1/0.2/0.2 | −0.668 | 3.0 | 71.1 | 27,638 | 19,089 | 1.09 |

All polymerizations were conducted with [M] = 3.3M (50 (v/v) MeCN, [TBAPF$_6$] = 0.1M, T = Room Temperature and reaction volume of 16 mL.

TABLE 3

Electrochemically mediated ATRP of MA as a function of applied potential.

| Exp. (#) | ATRP System | [M]/[I]/[L]/[Cu$^{II}$] | E (V) | [CuI]/[CuII] (target) | time (h) | p (%) | M$_{n, theo}$ (g/mole) | M$_{n, GPC}$ (g/mole) | M$_w$/M$_n$ |
|---|---|---|---|---|---|---|---|---|---|
| 1 | MA/EBP/Me$_6$TREN/Cu$^{II}$Br$_2$ | 500/1/0.2/0.2 | −0.62 | 0.14 | 7.0 | 52 | 22,371 | 23,755 | 1.08 |
| 2 | MA/EBP/Me$_6$TREN/Cu$^{II}$Br$_2$ | 500/1/0.2/0.2 | −0.69 | 1.0 | 5.0 | 83 | 35,271 | 26,795 | 1.08 |
| 3 | MA/EBP/Me$_6$TREN/Cu$^{II}$Br$_2$ | 500/1/0.2/0.2 | −0.72 | 3.0 | 3.8 | 68 | 29,144 | 26,795 | 1.09 | a - All polymerizations were conducted with [M] = 5.56M (50 (v/v) MeCN, [TBAPF$_6$] = 0.1M, T = room temperature and reaction volume of 16 mL.

The final value for M$_w$/M$_n$=1.09 indicates an acceptable level of control throughout the reaction and the preparation of a well defined polymer. However minor tailing in the GPC curves indicates that further control could be exerted on the reaction if the applied charge was changed as the polymerization progressed.

Example 3

Electrochemically Mediated Polymerization of Methyl Acrylate

3A. Selection of Appropriate E$_{app}$

As a consequence of these results a series of control CV's were performed to check for any additional reduction/oxidation reactions involving any of the other reagents, besides generation of the desired Cu$^{II}$Br$_2$/L complex, before conducting a second experiment, namely polymerization of methyl acrylate with Cu$^{II}$Br$_2$/Me$_6$TREN. All CV's were conducted under conditions identical to that envisioned as suitable for the polymerization, i.e. those given in Table 3.

Figure 3A:
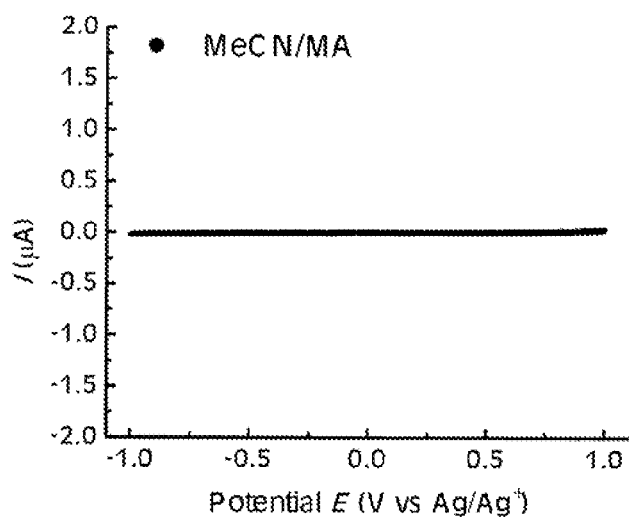
Figure 3B:
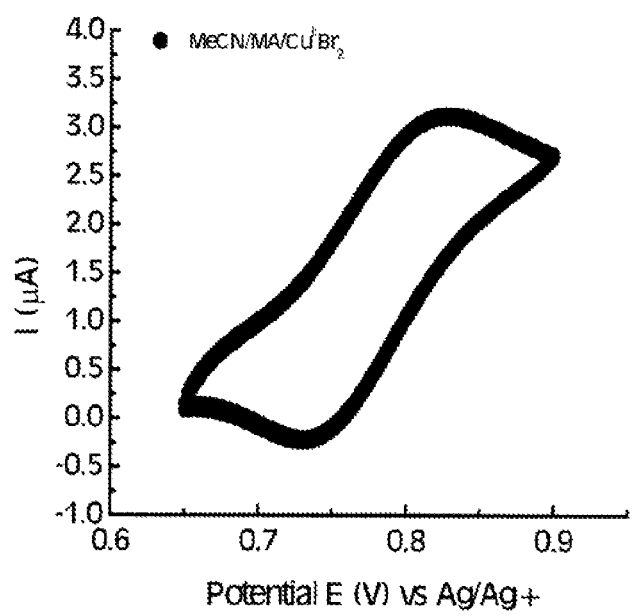

The initial evaluation was a potential sweep (i.e. CV) of the 50% (v/v) monomer/solvent reaction media, no significant oxidation or reduction was observed over a range of two volts, FIG. 3A. At this point, Cu$^{II}$Br$_2$ was injected into the reaction system and another CV was conducted, FIG. 3B. As expected, the Cu$^{II}$Br$_2$ solution in the mixture of monomer and solvent had a clear oxidation and reduction peak at positive potentials between 0.65 and 0.90 V (E$_{1/2}$=0.780 V). Similar results are reported in literature for Cu$^{II}$ salts, but it should be noted that these potentials are at different locations than may have been expected from prior analytical CV work on ATRP catalysts due to the selection of a different reference electrode; Ag/Ag+ instead of a saturated calomel electrode (SCE), which is based on the reaction between elemental mercury and mercury(I) chloride. These values can be converted to be SCE if required and indeed would be if the reference electrode is changed to ferrocene. In order to generate the additional information for an eATRP two additional CVs were performed by sequentially first adding the ligand, Me$_6$TREN, FIG. 4 black curve, and then a low molecular weight initiator, ethyl 2-bromopropionate (EBP) was added and a significant shift in the E$_{1/2}$ was observed, FIG. 4—grey curve.

This was the first time that a systematic CV analysis of precursors for an ATRP had been conducted and indicates that such a systematic analysis should be conducted prior to applying eATRP to a new monomer or with a new catalyst. The E$_{1/2}$ was now ca. −0.67 V instead of 0.78 V vs Ag/Ag$^+$. This curve was used as the base for all the polymerizations reported in Table 3 and for the Nernstian calculations. It should be noted that before each polymerization, a CV was run to check for any unexpected behavior and to confirm that the E$_{1/2}$ was consistent with the results given in FIG. 4. Upon adding the initiator the shape of the CV changed, FIG. 4 gray line, which could now be expected due to the presence of additional Cu$^{II}$Br$_2$ generated in the presence of the initiator due to the reaction of the electrochemically generated Cu$^I$Br (Formula 3) re-oxidation reaction with the alkyl halide (Formula 4) to form a radical. Therefore additional cathodic current is required, which accounts for the CV curve remaining at a −2.0 μA instead of returning to −1.25 μA.

$$Cu^{II}Br_2/L + e^- \rightarrow Cu^IBr/L + Br^- \quad (3)$$

$$Cu^IBr/L + RX \rightarrow Cu^{II}Br_2/L + R^{\cdot} \quad (4)$$

The Nernst equation, shown below (Formula 5), was used to calculate the potential required to generate and maintain a variety of different [Cu$^I$]/[Cu$^{II}$] ratios from the CV shown as vertical lines in FIG. 4, grey curve w/o EBP, also shown in Table 3. At room temperature (RT/nF) is a constant, with a value of 0.02569 V, as our system is a one electron process (n=1).

$$E=E^0+RT/nF\,Ln[O]/[R] \quad (5)$$

Indeed the Nernst equation can be employed to determine the absolute values for the concentration of each the activator and deactivator transition metal complex and the applied voltage can be selected to retain at least 0.1% of both the activator and deactivator in the contacting electrolyte when a controlled ATRP with an active catalyst complex is targeted for use in a polar medium such as water.

The changes in the shape and position of the CV measured in the presence of different components required for a controlled ATRP indicate that each polymerization reaction may require a similar set of measurements prior to selecting electrochemical conditions for formation of the desired ratio of oxidation states in the selected transition metal complex.

3B. Examination of Reaction Parameters

The first series of polymerizations of methyl acrylate were designed to probe the effect of changing the magnitude of the applied potential, $E_{app}$. The results are summarized in Table 3. Theoretically, assuming Nernstian behavior and a reversible system exists, the relative concentrations of [Cu$^{II}$Br$_2$/L] and [Cu$^{II}$Br/L] should be tunable through the applied potential and concomitantly the polymerization rate. The first polymerization conducted with electrochemical control was conducted at the previously determined $E_{1/2}$ value (Table 3, entry 2). Linear first order kinetics were observed and a good correlation between theoretical and experimental molecular weight values. A narrow $M_w/M_n$ was observed throughout the polymerization and progressively increasing molecular weight of the polymers with conversion, as shown in the GPC traces of samples of polymer taken from the reaction after different times, and therefore at different degrees of monomer conversion (ρ), in FIG. 5. The curves moved cleanly to higher molecular weight.

Assuming a reversible or quasi-reversible system exists, as previously established with ATRP catalytic systems, the relative concentrations of Cu$^{II}$Br$_2$/Me$_6$TREN and Cu$^I$Br/Me$_6$TREN and concomitantly the polymerization rate should be tunable through the applied potential. Two additional polymerizations were conducted; one with an increase and the other a decrease of the applied potential; to −0.72 and −0.62 V, respectively, Table 3 entries 1 and 3. An enhanced polymerization rate was observed at the higher potential, a higher ratio of [Cu$^I$]/[Cu$^{II}$]=3.0, whereas a lower potential provided a lower ratio of [Cu$^I$]/[Cu$^{II}$]=0.14, and accordingly a reduced rate of polymerization.

Initial slopes in the first order kinetic plots revealed an approximate rate enhancement of 2.4 fold by adjusting the $E_{app}$ from −0.66 V to −0.72 V. The rate dependence should result from the adjustment of the relative concentrations of Cu$^I$Br/Me$_6$TREN and Cu$^{II}$Br$_2$/Me$_6$TREN, which dictate the overall rate of polymerization in ATRP. More negative potentials induce a faster reduction rate of Cu$^{II}$Br/Me$_6$TREN, and an increase in the [Cu$^I$]/[Cu$^{II}$] ratio, hence, results in higher rates of polymerization. In all cases, similar correlations between theoretical and experimental molecular weights were observed and narrow molecular weight distributions were maintained even with enhanced polymerization rates. GPC results illustrate clear shifts in molecular weight to higher values and monomodal distributions for all polymerizations.

3C. Switching a Polymerization Reaction "On" and "Off"

Figure 5B:
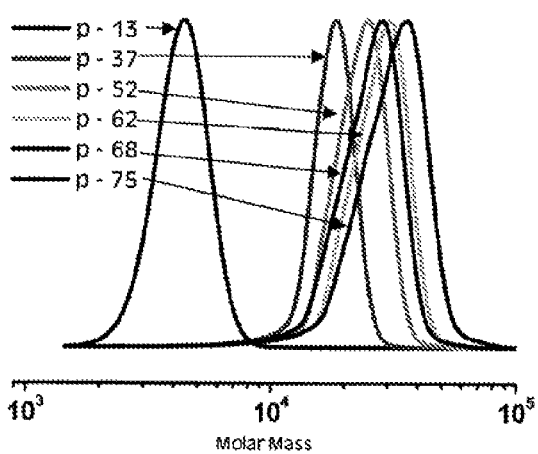
Figure 6:
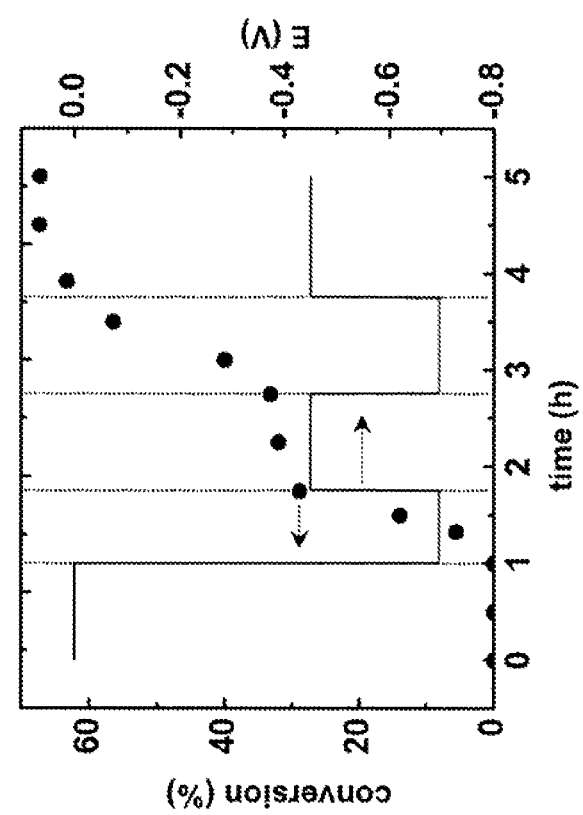

The final experiment in Table 4 was designed to demonstrate that designed changes in the applied potential could effectively "turn on" and "shut down" a polymerization. In the first hour of the experiment no potential was applied and no reaction occurred; no conversion of monomer was observed which shows that an applied potential is required to reduce a fraction of the Cu$^{II}$ species to the Cu$^I$ species and activate the polymerization. Then a potential of −0.693 V was applied for 45 minutes. During this time approximately 30% of monomer was consumed, FIG. 6—left. After 45 minutes the potential was changed to −0.45 V for 1 hour. The polymerization soon halted, although there was a 10-15 minute lag time as the low concentration of Cu$^I$ species was slowly converted into the Cu$^{II}$ species, once the change in the potential occurred. The time lag could be adjusted by varying the concentration of transition metal and/or the ratio of higher to lower oxidation states in the steady state. The reversible nature of this redox process and an ability to reinitiate polymerization was demonstrated by applying a potential of −0.693 V for 1 hour. As soon as this increased potential was applied, polymerization began again, increasing the overall consumption of monomer in the next hour to over 60%. Finally, the polymerization was switched off a second time by reverting to a less negative potential. The molecular weight values of the polymer chains correlated strongly with the theoretically predetermined values, FIG. 7—left scale, and a low $M_w/M_n$ was maintained during the whole duration of the polymerization, FIG. 7—right hand scale. Lastly, GPC curves, FIG. 5B, showed that the molecular weight increased with conversion without any detectible coupling or substantial number of termination events.

3D. Examining Potentiostatic Outputs

In addition to the kinetic analysis of the polymerization, the potentiostatic outputs; total charged passed (Q) and current (I) values were recorded as the polymerization proceeded. Essentially dQ/dt (coulombs/s) is equal to the current (amperes (C/s)). From FIG. 8, it is clearly visible that more charged passed through the reaction during the polymerization than was required to completely reduce the total amount of C$^{II}$Br$_2$ initially present in the reaction medium. Theoretically, if all Cu$^{II}$Br$_2$

TABLE 4

Polymerization of MA under potentiostatic conditions

| Exp. (#) | ATRP System | [M]/[I]/[L]/[Cu$^{II}$] | $E_{1/2}$ (V) | E/t (V)/(h) | [CuI]/[CuII] (target) | time (h) | Conv.$^b$ (%) | $M_{n,\,theo}$ (g/mole) | $M_{n,\,GPC}$ (g/mole) | $M_w/M_n$ |
|---|---|---|---|---|---|---|---|---|---|---|
| 1 | MA/EBP/Me$_6$TREN/Cu$^{II}$Br$_2$ | 500/1/0.2/0.2 | −0.690 | −0.690/1.0 | 1.0 | 4.8 | 69 | 28,500 | 24,542 | 1.12 |
| 2 | MA/EBP/Me$_6$TREN/Cu$^{II}$Br$_2$ | 500/1/0.2/0.2 | −0.693 | −0.693/5.0 | 1.0 | 5.0 | 83 | 35,271 | 26,795 | 1.08 |
| 3 | MA/EBP/Me$_6$TREN/Cu$^{II}$Br$_2$ | 500/1/0.2/0.2 | −0.688 | −0.716/3.8 | 3.0 | 3.8 | 68 | 29,144 | 26,795 | 1.09 |

TABLE 4-continued

Polymerization of MA under potentiostatic conditions

| Exp. (#) | ATRP System | [M]/[I]/[L]/[Cu$^{II}$] | E$_{1/2}$ (V) | E/t (V)/(h) | [CuI]/[CuII] (target) | time (h) | Conv.[b] (%) | M$_{n, theo}$ (g/mole) | M$_{n, GPC}$ (g/mole) | M$_w$/M$_n$ |
|---|---|---|---|---|---|---|---|---|---|---|
| 4 | MA/EBP/Me$_6$TREN/Cu$^{II}$Br$_2$ | 500/1/0.2/0.2 | −0.697 | −0.668/7.0 | 0.33 | 6.8 | 75 | 32160 | 31645 | 1.10 |
| 5 | MA/EBP/Me$_6$TREN/Cu$^{II}$Br$_2$ | 500/1/0.2/0.2 | −0.696 | on/off | 1.0 | 4.8 | 67 | 28,856 | 24969 | 1.08 |

[a] - All polymerizations were conducted with [M] = 5.55M (50 (v/v) MeCN, [TBAPF$_6$] = 0.1M, T = room temperature and reaction volume of 12 mL.
[b] Determined by $^1$H NMR.

TABLE 5

Influence of [Cu$^{II}$Br$_2$/L] on AMP ATRP

| Exp. (#) | ATRP System | [M]/[I]/[L]/[Cu$^{II}$] | E (V)/h | time (h) | p (%) | M$_{n, theo}$ (g/mole) | M$_{n, GPC}$ (g/mole) | M$_w$/M$_n$ |
|---|---|---|---|---|---|---|---|---|
| 1 | MA/EBP/Me$_6$TREN/Cu$^{II}$Br$_2$ | 500/1/0.2/0.2 | −0.668 | 7 | 75 | 32,160 | 31,645 | 1.10 |
| 2 | MA/EBP/Me$_6$TREN/Cu$^{II}$Br$_2$ | 500/1/0.05/0.05 | −0.666 | 5.33 | 81 | 35,025 | 35,996 | 1.09 |
| 3 | MA/EBP/Me$_6$TREN/Cu$^{II}$Br$_2$ | 500/1/0.025/0.025 | −0.666 | 5.33 | 91 | 38,918 | 31,337 | 1.06 | was converted to Cu$^I$Br, then Q would equal 3.387 coulombs. This point is identified in FIG. 8 as point (b). This value is calculated by the product of the moles of Cu$^{II}$Br$_2$ put into the reactor (i.e. 3.51×10$^{-5}$ mol) and Faraday's constant (9.64853×10$^4$ C/mol), Equation 6 below.

$$\frac{Q(\text{coulombs})}{nF\left(\frac{\text{coulombs}}{\text{mol}}\right)} = N(\text{mol electrolyzed}) \qquad (6)$$

The additional charged passed can be accounted for because in an ATRP as Cu$^I$Br is formed it reacts with alky halides thereby regenerating the corresponding Cu$^{II}$Br$_2$ species. A second point was identified as (a), were the charge passed and current change slope. These points are of interest because this is the time when the level of control over polymerization begins to be reduced. Excessive reduction of Cu$^{II}$Br$_2$ could be responsible for this loss of control. This leads to the conclusion that a two step, or multi-step, potential is required to gain and retain optimum control throughout the polymerization. An initial higher potential to generate Cu$^I$Br quickly and then a lower applied potential to maintain the desired/targeted [Cu$^I$Br] while accounting for terminated chains. This value for applied potential should diminish as the reaction progresses. This is exemplified later in the optimal polymerization of methyl methacrylate (MMA), where in contrast to BA, a switching between two potentials provided the best possible control.

These results indicate that additional control of polymerization rate can be accomplished by applying different potentials at different periods of the polymerization and that it is necessary to maintain appropriate concentrations of Cu$^I$ and Cu$^{II}$ to preserve maximum control. The symmetrical GPC traces from entry 4 in Table 4 display a gradual increase in molecular weight, FIG. 5B, indicating a high level of control over the kinetics of the polymerization reaction.

Example 4

Control Experiments

While the above examples provide proof that electrochemical mediation of an ATRP is indeed possible a series of experiments was conducted in order to gain detailed information on how each component of the ATRP reaction medium influenced the overall level of control in order to provide parameters to expand the utility of the process to new catalysts, new polymerization media and new polymer architectures.

4A. Influence of the Concentration of Transition Metal Complex on Level of Control in an Electro-chemical ATRP Process The concentration of transition metal complex, exemplified in the initial examples by cupric bromide in the presence of Me$_6$TREN as the ligand, was progressively decreased from 400 ppm to 50 ppm. The reaction conditions/results are summarized in Table 5. As the concentration of catalyst was dropped from 400 ppm to 50 ppm three general trends were observed.

Lower catalyst concentrations resulted in lower M$_w$/M$_n$ values a polymer with a M$_w$/M$_n$ distribution of 1.06, the lowest yet achieved while also achieving a high conversion.

The 50 ppm system appeared to have the most linear first order kinetic behavior.

As expected, lower amounts of catalyst resulted in a lower amount of charged passed, or species electrolyzed.

Nevertheless at each concentration of catalyst, more charge was passed than required to reduce the initial Cu$^{II}$Br$_2$ present, indicating some termination reactions still occurred. The symmetrical GPC curves moved cleanly to higher molecular weight as conversion increased.

In one embodiment of the invention the reaction can be conducted with concentration of catalyst below 500 ppm, optionally below 100 ppm and optimally as low as 50 ppm.

4B. Influence of Initiators

Figures 9A, 9B, 9C:
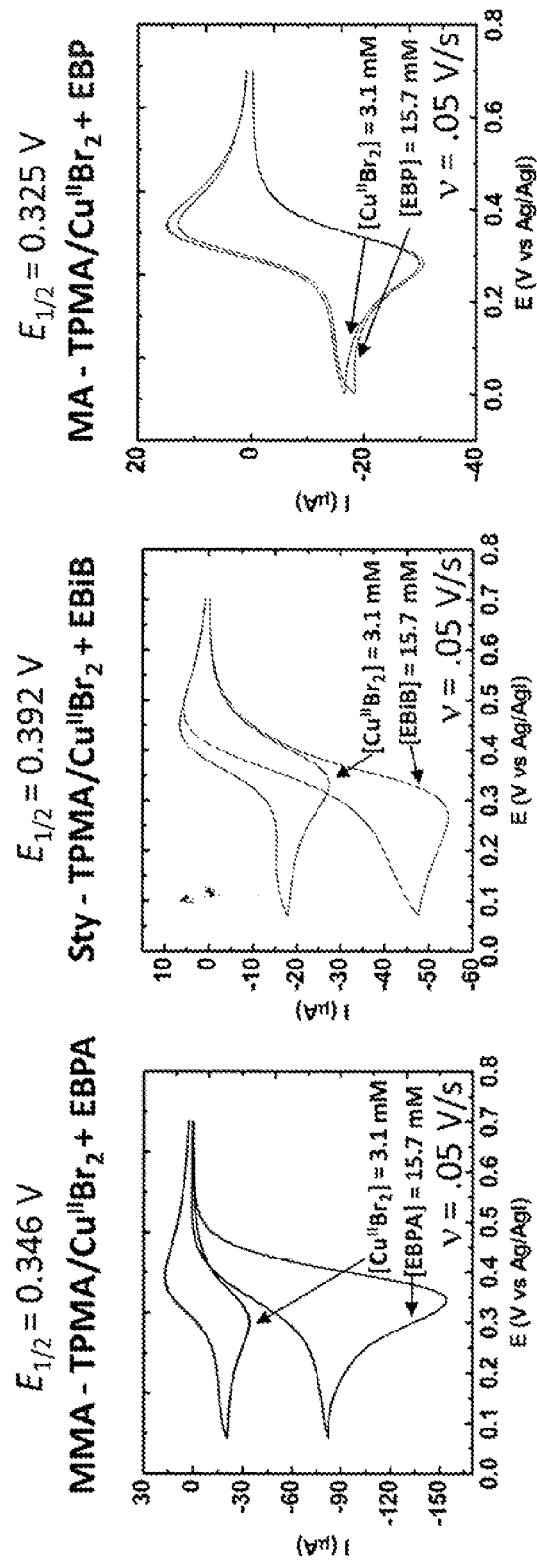

The relative activity of each initiation system can be observed through the cathodic peak height compared to the Cu$^{II}$/Cu$^I$ cathodic peak high without initiator present, FIG. 9. In each system the [M]=4.67 M and [TBAPF$_6$]=0.2 M. Molar ratios=[M]:[I]:[Cu$^{II}$BR$_2$/L]=300:1:0.2. The left hand scale differs for FIGS. 9(A), (B), and (C). FIG. 9 shows this relationship with three initiators (EBPA, EBiB, and EBP) under conditions suitable for an ATRP polymerization. In this series of measurements the catalyst complex was formed with TPMA as ligand and cupric bromide as the transition metal salt. Moving from the most active to least active initiator, i.e. from the initiator with the lowest k$_{act}$ to that with the highest, the relative difference in cathodic heights becomes smaller. EBPA resulted in the largest difference while completely eliminating the anodic portion of the half wave. On the other hand, EBP resulted in very little difference and almost no change in the CV shape, indicating little catalytic activity of the alkyl halide. In addition to the relative activities of each initiator, slight variations in the catalyst complex half waves were observed. Methyl acrylate (MA) and methyl methacrylate (MMA) were the most similar and appeared to have more positive potentials indicating some stabilization of the electron transfer process, whereas styrene was the least positive and potentially the least stabilizing of the three monomers.

4C. Influence of the Concentration of the Monomer and the Initiator

Cyclic voltammetry measurements were carried out to investigate the influence of the concentration of the monomer and the initiator on the reaction. The system under study used the following components:

| | |
|---|---|
| Catalyst (precursor) | $Cu^{II}(OTf)_2$, L = $Me_6TREN$ |
| Halide ion | Bromide |
| Initiator (I) | Methyl 2-bromopropionate (MBrP) |
| Monomer (M) | Methyl acrylate (MA) |
| Solvent (S) | Acetonitrile (AN) |
| Electrolyte (E) | $Et_4NBF_4$ |
| Temperature | 25° C. |

The primary reactions involved during the electroregeneration of $Cu^I$ in ATRP conditions are the following:

$$Cu^{II}L + e \rightleftarrows Cu^IL \quad E^{0'}{}_{Cu^{II}L}, \; k^0{}_{et,Cu^{II}L/Cu^IL} \tag{7}$$

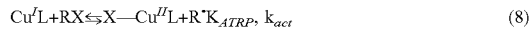
$$Cu^IL + RX \rightleftarrows X{-}Cu^{II}L + R^\cdot \; K_{ATRP}, \; k_{act} \tag{8}$$

$$R^\cdot + M \rightarrow R{-}M^\cdot \; k_p \tag{9}$$

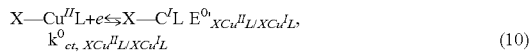
$$X{-}Cu^{II}L + e \rightleftarrows X{-}C^IL \quad E^{0'}{}_{XCu^{II}L/XCu^IL},$$
$$k^0{}_{et,\,XCu^{II}L/XCu^IL} \tag{10}$$

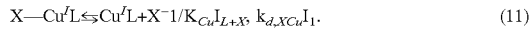
$$X{-}Cu^IL \rightleftarrows Cu^IL + X^- \; 1/K_{Cu^IL+X}, \; k_{d,XCu^I1}. \tag{11}$$

Considering $Cu^IL$ as the species responsible for the activation of RX (reaction shown in equation 8), the rate of polymerization, or degree of catalysis, is directly correlated with its rate of regeneration, which in principle depends on reactions (7), (10) and (11). If we consider a rather active initiator like MBrP ($k_{act}$~2000 $M^{-1}s^{-1}$ in pure $CH_3CN$), after reaction (7) the concentration of $Cu^IL$ near the electrode surface is very low because of the homogeneous activation reaction (8); furthermore, after one catalytic cycle all the $Cu^{II}$ is present as $\overline{X}Cu^{II}L$ ($\log_{BrCu^{II}L}$=6.1 in pure $CH_3CN$), and therefore the electrodic process correlated with the degree of catalysis is underlined by the reaction (10). FIG. 10 reports the effect of the concentration of initiators on the voltammetric cycle recorded starting with $Cu^{II}L$, recorded at v=0.05 V/s on Pt, in AN/MA 1:1+0.1 M $Et_4NBF_4$. The first cathodic wave is the monoelectronic reduction of $Cu^{II}L$ (reaction 7): in absence of initiator, this is the only process involved since the catalytic cycle can not switch on. Therefore, the voltammetric response is totally reversible. After the addition of an initiator, MBrP, a second wave appears at more negative potential, because of the reduction of $\overline{X}Cu^{II}L$ produced by the homogeneous reaction (8), and the reversibility of the first peak is lost since the concentration of $Cu^IL$ is very low. In the presence of higher ratios of [MBrP]/[$Cu^{II}L$] the cathodic peak current $I_{pc,XCu^{II}L}$ increases, meaning higher degrees of catalysis.

4D. Influence of the Concentration of the Monomer and Solvent

The same approach was used to investigate the effect of the monomer/solvent ratio on the degree of catalyst activity. The CV of 1 mM $Cu^{II}Me_6TREN$ in the presence of 10 mM MBrP and 0.1 M $Et_4NBF_4$ at different AN/MA ratio+0.1 M $Et_4NBF_4$, recorded at v=0.05 V/s on Pt. $V_0$=15 mL, MA step addition=5 mL. In this case, the experiment was influenced by a certain approximation. In fact, the MA step additions entail dilution of the reaction medium; this problem was overcome considering the direct proportionality between the peak current $I_p$ and the bulk concentration of the electroactive species $C^*$, given by the Randles-Sevcik equation (12):

$$I_p = 0.4463 nFAC * \left(\frac{nF}{RT}\right)^{1/2} D^{1/2} v^{1/2} \tag{12}$$

It was assumed that the changes in the diffusion coefficient D after the MA stepwise additions were negligible. The voltammetric responses are quite similar to those shown in FIG. 10; however, increasing the ratio MA/AN results in a slight reduction in the activity of the catalyst, since the reduction peak current $I_{pc}$ of $XCu^{II}L$ decrease with higher ratio MA/AN which indicates that catalyst activity changes with comonomer/solvent ratio and the correct potential should be selected and applied for maximum control.

4E. Selecting the Applied Potential

Selecting the correct applied potential, $E_{app}$ is of primary importance when conducting potentiostatic electrolysis. In particular, two main conditions can be used:

electrolysis under diffusive control: in this case, $E_{app} \ll E_{pc}$ and the overall rate of the reaction is controlled by the rate of the diffusion of the reactants to the electrode surface rather than the rate of the reaction itself or;

electrolysis under kinetic or chemical control: herein, $E_{app} \geq E_{pc}$ and the overall rate of the reaction is controlled by the rate of the reaction itself rather than the rate of the mass transport of the reactants to the electrode surface.

In addition to these considerations, the choice of $E_{app}$ should be appropriate in order to avoid other undesired electron transfers. In ATRP systems, one of these factors is the further reduction of $Cu^I$ to $Cu^0$, this is expected to occur at potentials more negative than that of the $Cu^{II}/Cu^I$ redox couple when disproportionation is not thermodynamically favoured. FIG. 11, which shows the CV of 1 mM $Cu^{II}Me_6TREN$ in the absence (a) and presence (b) of 1 mM $Et_4NBr$, recorded at v=0.05 V/s on Pt, in 0.1 M $Et_4NBF_4$+ 0.1M $Et_4NBF_4$, confirms these expectations: the first cathodic peak, curve (b), corresponds to the reduction $Cu^{II}/Cu^IL$, whereas the second peak, curve (a), at, at more negative potential is indicative of electrode position of $Cu^0$ on the electrode surface, since the back scan is characterized by the so-called anodic-stripping peak, having the typical symmetric shape with high peak current. During this process, the electrodeposited $Cu^0$ is oxidised to $Cu^I$ ion that undergoes complexation in solution and subsequent oxidation to $Cu^{II}L$. This electrochemical picture is confirmed when the starting species is $Br^-Cu^{II}L$, FIG. 11 curve (b) in this case, both the $BrCu^{II}L/BrCu^IL$ and $BrC^IL/Cu^0+Br+L$ redox processes are shifted toward more negative potentials because of the stabilization induced by the halide ion, while the anodic stripping is unchanged since it is independent of the presence of the ligands in solution.

These observations point out that there is always a lower limit for $E_{app}$ in order to avoid the electrodeposition of the transition metal; furthermore, the presence of 1 equivalent of halide ion is necessary to produce the ternary complex $BrCu^{II}L$ to investigate $E_{app}$ in the diffusive region of the $BrCu^{II}L/BrCu^{I}L$ redox couple.

The results also confirm that copper can be removed from the reaction by electrodeposition and that the catalyst complex can be reformed by reaction of deposited $Cu^0$ with ligands present in the reaction medium.

4F. Influence of Solvent

The next series of reactions were designed to evaluate the influence of solvent. Numerous reports in incorporated references have shown well controlled ATRP reactions occur in DMSO as solvent. One reaction was conducted with DMSO as solvent, this required a new reference electrode, and exhibited an initially faster reaction in comparison to the reactions conducted in MeCN. The DMSO system experienced a significant exotherm, which would have further increased the $k_p$ of methyl acrylate. Nevertheless two advantages of the DMSO system should be noted:

- no clogging of the vycor frit was noticed and
- DMSO will allow further expansion in the selection monomers that can be polymerized by eATRP to include more polar monomers, if it is selected as the solvent.

Anisole is a more hydrophobic solvent than acetonitrile. In the initial evaluation of the CV analysis when using such a hydrophobic solvent (i.e. low conductivity) high solvent resistance was observed. In response to this, the molarity of supporting electrolyte was increased from 0.1 M to 0.2 M to achieve better conductivity. Furthermore, since it is the IUPAC standard, it was considered important to begin reporting standard potentials against ferrocene. FIG. 12 illustrates two couples; one of the copper ligand complex ($Cu^{II}Br_2/TPMA$) and the ferrocene/ferrocenium standard. A difference of ca. 0.72 V exists between the two couples.

The first polymerization conducted in anisole was methyl acrylate. This monomer was chosen because of the success in the MeCN system. Cyclic voltammetry was conducted of the solvent and monomer background and a limited current was observed in a range of 3.5 V reflecting the relative stability of the system. Further CV analysis was carried out, shown in FIG. 9C, by first recording the copper complex of interest and then after addition of the alkyl halide initiator. Methyl acrylate was successfully polymerized by eATRP in anisole at $T=50°$ C. High conversion values over 90% within 5 hours, linear first order kinetic behavior was observed, and a linear increase in molecular weight with conversion was observed with $M_w/M_n$ values around 1.1 which shows that no significant coupling is occurring during polymerization.

Example 5

Polymerization of Methyl Methacrylate

5A. As previously discussed background CVs of the solvent and monomer were carried out along with characterization of the initiator activity. Similar to the MA system a 3.5 V range was observed and no significant current passed until reaching the cathodic and anodic discharges. EBPA was selected as the initiator for MMA as it showed high activity in the CV analysis, FIG. 9A. To further exemplify that eATRP can be applied to a range of catalysts a copper triflate based catalyst, $Cu^{II}(Trf)_2/L$. was used in conjunction with one equivalent of TBABr to convert the complex to their more active $Cu^{II}Br/L$ catalyst. A background of MMA/ anisole with supporting electrolyte ($TBAPF_6$) was conducted and no significant current passed, either cathodically or anodically, from ca. −1.5 to 2 V showing the stability of the reaction medium. After confirming the stability of the reaction medium, $Cu^{II}(Trf)_2/TPMA$ was injected into the reaction medium and an additional CV was recorded. A reversible couple was observed at ca. 0.659 V that shifted to 0.315 V after addition of the bromine electrolyte. This corresponds to ca. 0.344 V more negative potential. After addition of the copper catalyst, the initiator was introduced to the system. Since the monomer to be polymerized was MMA, EBPA was selected as the initiator. The CVs were recorded before and after addition of the initiator and as expected, a large increase in the cathodic current and decrease in the anodic current were observed, since with a very active initiator such as EBPA, a large portion of the electro-generated $Cu^I$ is converted back into $Cu^{II}$.

FIG. 13 shows a typical current versus time profile of the MMA system in anisole where the CV's were conducted periodically during polymerization. Polymerisation conditions: [MMA]=4.5 M, [MMA]:[EBPA]:[TPMA]: $[Cu^{II}]$=300:1:0.1:0.1, T=50° C. Two current profiles are shown which represent the two polymerizations conducted. The black curve is that of the $E_{app}=E_{pc}$, having initial current values between −1 mA and −0.4 mA, whereas $E_{app}=E_{1/2}$ had current values at a maximum of −0.4 mA. The high current values (black line) in combination with EBPA are most probably responsible for the early termination events occurring in the cathodic peak system. Based upon this assumption, a system where $Cu^I$ is slowly fed into the polymerization system would generate better results. Nevertheless, the eATRP in anisole was proven to be a successful system for MMA. The eATRP of MMA conducted at T=60° C. resulted in a successful polymerization. Near quantitative consumption of monomer (ca. 98-100%) was observed and linear first order kinetics. The molecular weight increased linearly with conversion although it was slightly lower than the theoretical values and the molecular weight distribution was narrow ($M_w/M_n \leq 1.3$) the current profile resembled that of the MA system except with different time scales, each reaching minimal current values around −200 mA.

5B. Optimization of MMA Polymerization $TBAClO_4$ (4.69 mmol, 1.6051 g), was added to an electrochemical cell equipped with the electrodes and a condenser and flushed with nitrogen. Deoxygenated DMF (13.1 mL) and MMA (0.0907 mol, 9.7 mL) were transferred into the cell via gastight syringe. A stock solution $Cu^{II}/TPMA/Br^-$ in DMSO (0.027 mmol, 0.18 mL for 300 ppm reactions, $[Cu^{II}]$=0.15 M; 0.009 mmol, 0.18 mL for 100 ppm reactions, $[Cu^{II}]$=0.05 M) was added and subsequently bubbled with nitrogen. A CV of the $Cu^{II}/Cu^I$ couple was conducted to detect the possible range of applied potentials $E_{app}$. The initiator EBPA (0.3 mmol, 0.053 mL) was added, followed by further bubbling for 10 min. A CV of the $Cu^{II}/Cu^I$ initiator system was conducted. Several potentials were defined on the basis of cathodic and anodic peak potential value ($E_{pc}$ and $E_{pa}$, determined by CV).

Within this application the average potential between $E_{pc}$ and $E_{pa}$ is defined as $E_{1/2}$. The potential difference $\Delta=E_{1/2}-E_{pc}$ was defined and subtraction of $\Delta$ from $E_{pc}$ was assigned as $E_{1/2}$. The average potential between $E_{pc}$ and $E_{1/2}$ was defined as $E_{1/4}$. FIG. 14 illustrates their location within the CV of the $Cu^I/Cu^{II}$ couple. The reaction was started by applying the selected $E_{app}$.

Figures 15A, 15B:
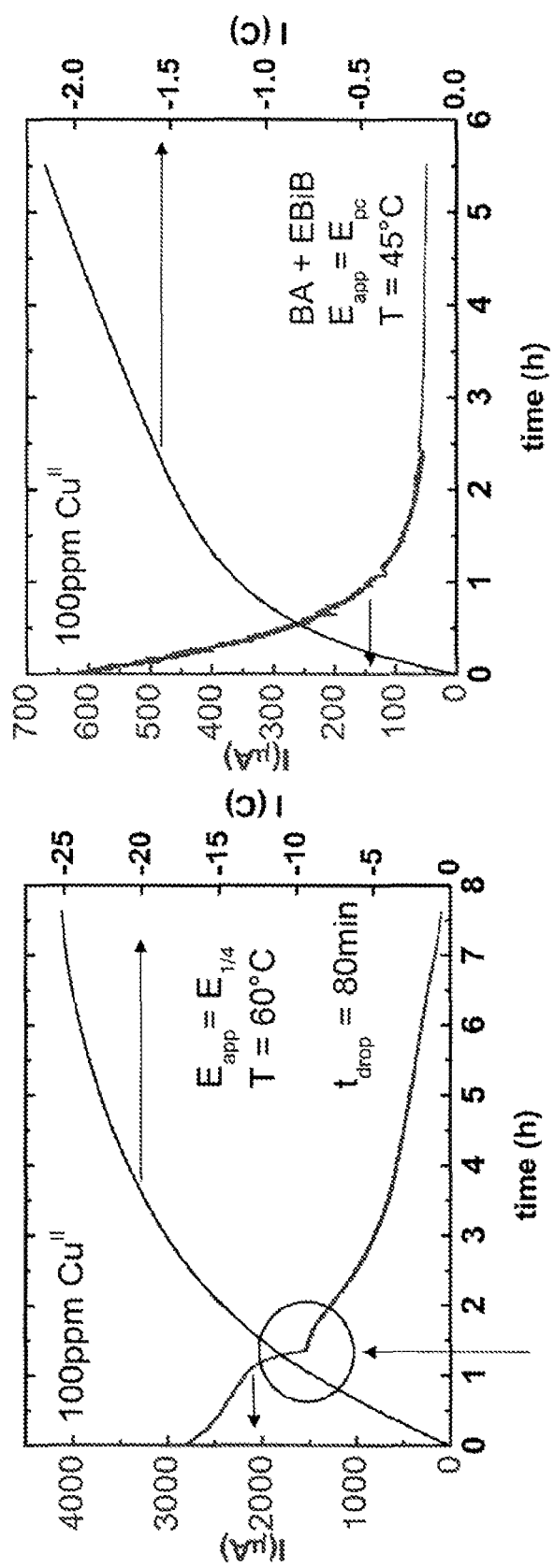

The current profile of the eATRP of MMA using EBPA as initiator, showed a significant drop in current after a certain time, the time that this drop is observed is defined as $t_{drop}$, and subsequently continued trending downwards, see FIG. 15(A). Application of a more negative potential or conducting the reaction at a higher temperature decreased the time period until $t_{drop}$ occurred. Comparison of the current profile shape shows that a much higher slope of the current occurs in electrolysis of BA using EBiB, FIG. 15(B), as initiator than for MMA with using EBPA.

Table 6 summarizes the reaction conditions for the polymerization of MMA in which variation and switching of applied potential during the reaction and the corresponding time $t_{drop}$; variation of temperature and initial $Cu^{II}$ catalyst concentration are summarized.

TABLE 6

Application of two different applied potentials to an eATRP

| Reaction | $E_{app,1}$ | $E_{app,2}$ | Temperature [° C.] | $Cu^{II}$ [ppm] | $t_{drop}$ [min] | k [hr$^{-1}$] |
|---|---|---|---|---|---|---|
| 16.4 | $E_{1/4}$ | $E_{1/4}$ | 60 | 100 | 80 | 0.71 |
| 16.5 | $E_{pc}$ | $E_{pc}$ | 45 | 100 | 130 | 0.28 |
| 16.6 | $E_{-1/2}$ | $E_{1/2}$ | 40 | 100 | 45 | 0.21 |
| 16.7 | $E_{-1/2}$ | $E_{pa}$ | 40 | 100 | 50 | 0.10 |
| 16.8 | $E_{-1/2}$ | $E_{1/2}$ | 40 | 300 | 40 | 0.35 |
| 16.9 | $E_{-1/2}$ | $E_{pa}$ | 50 | 300 | 30 | 0.57 |

These experiments show that switching of the applied potential from a more negative potential to a more positive potential after $t_{drop}$, and decreasing reaction temperature not only improved the polydispersity but it also reduced the induction period and improved the symmetry of the GPC signals due to less formation of shoulders at higher molecular weight and less tailing at lower molecular weights.

Therefore in one embodiment of the invention two different applied potentials are applied to improve the overall level of control in an electrochemically mediated ATRP, the first a more negative potential to rapidly reduce the higher oxidation state transition metal complex to the lower oxidation state then a more positive potential to maintain the targeted ratio of two oxidation states of the transition metal complex.

Example 6

Exemplifying eATRP for a Broader Range of Monomers

The following examples expands the range of monomers by exemplifying application of an eATRP to a broader variety of monomers by defining conditions appropriate for the polymerization of ethyl acrylate (EA), butyl acrylate (BA) and styrene (sty).

6A. Polymerization of Butyl Acrylate

Figure 16A:
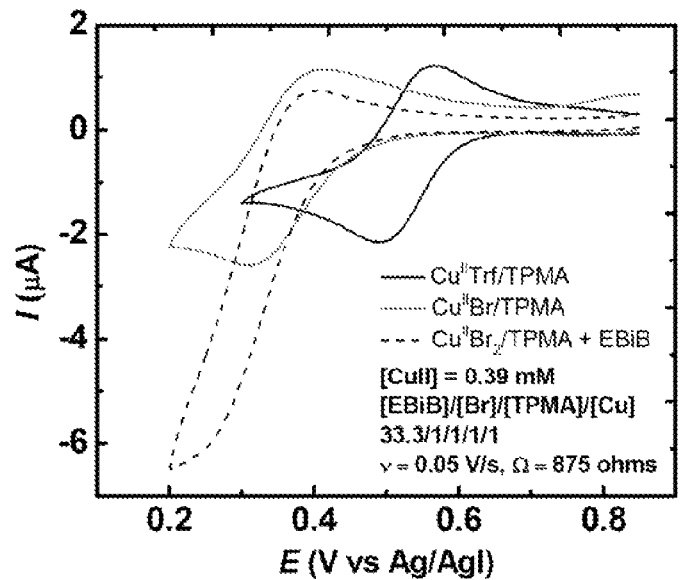
Figure 16B:
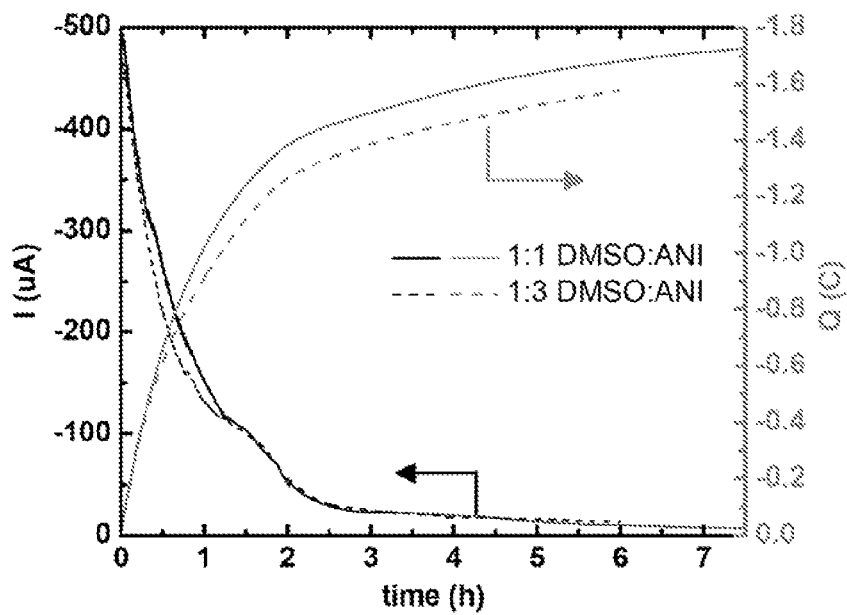

Run conditions were [BA]/[EBiB]/[TPMA]/[Cu$^{II}$Trf$_2$]/[TPMA]/[TBABr]=300/1/0.03/0.03/0.03, [BA]=3.87 M (43 (v/v) % in DMSO:Anisole), [TBAClO$_4$]0.2 M, T=40-45° C. FIG. 16A provides the CV traces of the Cu species under a variety of conditions prior to electrolysis. As expected, addition of Br$^-$ to the system shifted the Cu$^{II}$/Cu$^I$ catalyst couple ca. 200 mV (black to grey trace). Next, after addition of the initiator a large catalytic response was observed due to the regeneration of Cu$^{II}$ (dashed trace). FIG. 16B shows the current and charge passed versus time. A rapid decay in current was observed approaching negligible values (10-15 uA). Rapid conversion of Cu$^{II}$ to Cu$^I$ is observed in the early stages whereas a minimal amount of charge is required to maintain the Cu$^{II}$/Cu$^I$ ratio. GPC for polymer samples collected during both experiments show narrow monomodal distributions of the polymeric species.

After conducting the initial experiments detailed above in Examples 2 and 6A, it was decided it would be appropriate to use DMF instead of DMSO as it provided several additional advantages including: (1) enhancement of $K_{ATRP}$~in comparison to anisole, (2) increase the conductivity of the reaction medium, there is a large drop in resistance when incorporating DMF versus anisole, and (3) improve the solubility of Sty, MMA, and BA polymers in the reaction medium.

6B. Optimizing Reaction Conditions for Polymerization of Butyl Acrylate 6B 1) [BA]/[EBiB]/[TPMA]/[Cu$^{II}$Trf$_2$]/[TPMA]/[TBABr]=300/1/0.09/0.09/0.09, [BA]=3.87 M, [TBAClO$_4$] 0.2 M, T=44° C. 300 ppm catalyst was used in each instance. Three different voltammograms were obtained for the polymerization mixture prior to electrolysis, FIG. 17A. As expected, a typical copper couple was observed with quasi-reversible behavior in reference to Ag/AgI. Anodic and cathodic peaks were separated by ca. 80 mV under fully compensated conditions. After addition of an initiator a large catalytic response was observed due to the regeneration of Cu$^{II}$ resulting in an increased cathodic response. Each of these voltammograms was conducted under typical stagnant conditions. The final CV was conducted with stirring. Three clear regions were observed: (1) onset of reduction of Cu$^{II}$ (2) a proportional/linear increase in cathodic current with potential and (3) a limiting current region (at diffusion controlled limits). An equation was developed which describes the limiting current value (i$_l$(f)) as a function of time when using a potential value within the limiting current region. This specific CV indicates where no further rate enhancement is possible by providing a more negative potential.

6B 2) Reaction conditions: [BA]/[EBiB]/[TPMA]/[Cu$^{II}$Trf$_2$]/[TPMA]/[TBABr]=300/1/0.09/0.09/0.09, [BA]=3.87 M, [TBAClO$_4$] 0.2 M, T=44° C. Four different polymerizations were conducted with identical formulations but increasingly more negative potentials. A clear trend is observed, FIG. 17B: increasingly negative potentials provide an increase in apparent rate coefficients. However, a limiting region exists somewhere between 80-120 mV past the $E_{pc}$ whereby a small rate enhancement was observed. Surprisingly the molecular weight and $M_w/M_n$ data in each experiment displayed similar behavior. When applying more positive potential (E$_p$ and E$_{1/2}$) lower $M_w/M_n$ values were observed indicative of the presence of a larger amount of Cu$^{II}$ in the system. Rapid conversion of Cu$^{II}$ to Cu$^I$ is observed in the early stages, typically less than 30 minutes whereas a minimal amount of charge is required to maintain the Cu$^{II}$/Cu$^I$ ratio. Also the initial current values were larger with a larger $E_{app}$ which generally can be related to the rate of reduction of Cu$^{II}$ to Cu$^I$ and therefore indicates the relative concentration of Cu$^{II}$ 6B 3) Reaction conditions: [BA]/[EBiB]/[TPMA]/[Cu$^{II}$Trf$_2$]/[TPMA]/[TBABr]=300/1/X/X/X, [BA]=3.87 M, [TBAClO$_4$]0.2 M, T=44° C. The next variable which was investigated was the concentration of Cu$^{II}$ initially added to the system. The $E_{app}$ in all instances was 80 mV more negative than the cathodic peak potential ($E_{pc}$). It was predicted that higher concentrations of copper should yield increased rates of polymerization and lower $M_w/M_n$ values. Pseudo-first order kinetic plots were generated to examine the function of the concentration of copper. As the concentration of copper increases the rate of polymerization was observed to increase to a root dependence of the relative copper concentrations. The increase in molecular weight was linear with respect to conversion in all cases, however, the $Cu^{II}$ concentration had a profound impact on the $M_w/M_n$ values as the polymerization proceeded with higher concentrations of copper leading to lower $M_w/M_n$ values. As we know the $M_w/M_n$ value corresponds to the following equation:

$$\frac{M_w}{M_n} = 1 + \frac{1}{DP_n} + \left(\frac{[R-X]_o k_p}{k_{da}[X-Cu^{II}]}\right)\left(\frac{2}{q}-1\right) \quad (2)$$

The current profiles also reflect the relative concentration of $Cu^{II}$ in the system.

6B 4) In an effort to further improve the eATRP process the effect of minimization of the supporting electrolyte was investigated. Reaction conditions: [BA]/[EBiB]/[TPMA]/[$Cu^{II}$Trf$_2$]/[TPMA]/[TBABr]=300/1/0.9/0.9/0.9, [BA]=3.9 M, [TBAClO$_4$]=X M, T=44° C. The $E_{app}$ in all instances was 80 mV more negative than the cathodic peak potential ($E_{pc}$). The relative resistance of the reaction medium was clearly observed when decreasing the concentration of TBAClO$_4$ and the resistance values were progressively increased from 500 to 14,500 ohms at 0.2 M to 0 M, respectively. When examining the rate of polymerization as a function of supporting electrolyte, a visible reduction in the apparent rate constant can be observed as the concentration of supporting electrolyte is decreased. When no supporting electrolyte was used polymerization still occurred, however a large induction period was observed. Without being limited by the proposed mechanism it is believed that the decrease in the rate of polymerization can be explained as a result of an increase in the resistance of the solution. When all process involved in the reaction are fast, this leaves the electron transfer of the reaction as the limiting factor. Measurements of the electron transfer constant for the electrode (Γsec)) are determined in the following equation:

$$\Gamma = R_s C_d \quad (18)$$

were $R_s$ [Ω] is the solution resistance and $C_d$ [F] is the capacitance.

Therefore, as the solution resistance increases the time of electron transfer become longer and ultimately slows the polymerization (this phenomena is also in relation to migration of ions to the WE and CE). This is bolstered by the current profiles where a decrease in current is observed with less supporting electrolyte. However the change in rate had no effect of either $M_n$ or $M_w/M_n$.

In one embodiment of the invention the rate of polymerization is modified by the concentration of the added electrolyte.

6C. Polymerization of Styrene

TBAClO$_4$ (4.69 mmol, 1.6051 g) was added to an electrochemical cell fitted with the electrodes and a condenser then the flask was flushed with nitrogen prior to the addition of deoxygenated DMF (12.4 mL), and styrene (0.0907 mol, 10.4 mL) via a gastight syringe. A stock solution of $Cu^{II}$/TPMA/Br$^-$ in DMSO (300 ppm of $Cu^{II}$, 0.027 mmol, 0.18 mL, [$Cu^{II}$]=0.15 M) was added then the reaction mixture was bubbled with nitrogen for 15 min. A CV of the $Cu^{II}/Cu^{I}$ couple was conducted to detect the cathodic peak potential $E_{pc}$. The initiator EBiB (0.3 mmol, 0.044 mL) was added, followed by further bubbling with nitrogen for 5 min. then the CV of the $Cu^{II}/Cu^{I}$+initiator system was conducted. The reaction was started by applying the cathodic peak potential $E_{pc}$ at a temperature of 90° C. The experimental molecular weights were slightly higher than the theoretical, which suggests termination of radicals in the early phase of the reaction however the GPC signal did not show any shoulder at higher molecular weights, nor significant tailing to lower molecular weight region.

Example 7

Preparation of Polymers with more Complex Topologies

The anisole system was in part developed in order to be directly applicable to synthesis of more complex architectures through eATRP. Anisole, in addition to being suitable solvent for a wide range of monomers, is also commonly used in the synthesis of stars and brushes through ATRP.

7A PnBA-stars. The first eATRP synthesis of star macroraolecules was attempted with PnBA-Br macroinitiators under potentiostatic conditions. Starting conditions for star synthesis: [PnBA]=0.02 M, [PnBA]:[DVB]:[TPMA]: [$Cu^{II}$]=1:12:0.2:0.1, T=90° C. An initial CV was recorded for the macroinitiator (MI) to determine a suitable potential for synthesis of PnBA stars, which was selected to be at the cathodic peak, indicated by dashed circle in FIG. 18(A). The decay of current was slower than typical eATRP polymerization systems, and reached a near steady state at ca. −0.05 mA, FIG. 18(B). Once the current reached its steady state no additional MI's were incorporated into the star. In addition, the mmol of $Cu^{II}$ electrolyzed during star synthesis never reached full conversion of the initially added $Cu^{II}$. The $E_{app}$ would correspond to a radio of [$Cu^{II}$]/[$Cu^{I}$]=~0.07, meaning that a maximum of ca. 14 mmol should have been possible. This experiment showed that ca. 11 mmol of $Cu^{II}$ was converted to $Cu^{I}$. The GPC traces of samples collected as the polymerization progressed showed almost quantitative consumption of the macroinitiators, although a small tail was observed in the final star indicating that some lower molecular weight species existed, which were either a result of terminated chains during macroinitiator synthesis or from termination reactions during the activation stage of the star synthesis from the added macroinitiators. NMR revealed near complete consumption of divinyl benzene (DVB) after ca. 9 h. The final molecular weight and molecular weight distribution of the star polymer was 60,000 g/mol and 1.40 respectively.

Example 8

Controlled Aqueous ATRP of OEOMA $Cu^{II/I}$TMA, which is one of the most active complexes used in ATRP, was chosen as the catalyst system. In cyclic voltammetry screening the $Cu^{II}L^{2+}$ exhibits a reversible peak couple with $E^{o\prime}$=−0.245 V vs SCE, FIG. 19. Addition of a large excess of Br$^-$ to the solution does not significantly affect this CV response, indicating that the $K_X$ of $Cu^{II}L^{2+}$ is very small, FIG. 20 curve a. The full reversibility of the response at very low scan rates confirms that $Cu^{I}L^+$ is quite stable in H$_2$O with a lifetime of at least few seconds, the time scale of CV. Using the above reported $E^{o\prime}$value together with other available thermodynamic data, the value of $K_D$ was estimated to be $6.8\times10^{-3}$ for the disproportionate of $Cu^{I}L^+$. The CV response of $Cu^{II}L^{2+}$ drastically changes when an equimolar amount of the initiator, 2-hydroxyethyl 2-bromoisobutyrate (HEBriB) is added, FIG. 20 curve b. The cathodic peak approximately doubles in height while the anodic one decreases, clearly indicating that $Cu^IL^+$ rapidly reacts with HEBriB. On the basis of thermodynamic data available in the literature, the estimated $K_{ATRP}$ value for this system is $1.5\times10^{-1}$, which is 4 orders of magnitude higher than that measured for an analogous system in $CH_3CN$. An estimate of the activation rate constant based on voltammetric analysis of the system $Cu^{II}L^{2+}$+HEBriB at different concentration ratios are shown in FIG. 20 curves b and c, and different scan rates provide a very large value for $k_{act} \geq 2.5\times10^6$ $M^{-1}s^{-1}$.

The above described voltammetric analyses show that the system under investigation has all the characteristics that make aqueous ATRP reactions very difficult to control; low $K_X$, high $K_{ATRP}$, and extremely rapid activation. Therefore, it represents an excellent test of the potential of the proposed electrochemical method to resolve problems still facing application of ATRP to certain systems, herein exemplified by aqueous ATRP.

The electrogeneration of the active catalyst was carried out under potentiostatic conditions starting from the catalytic system $Cu^{II}L^{2+}$/HEBriB 1:1 in $H_2O$+10% $OEOMA_{475}$ (MW=475 $gmol^{-1}$). The effect of $E_{app}$ on the degree of control over polymerization was first investigated. Three $E_{app}$ values around $E^{o\prime}$ were applied, points marked on FIG. 19, and the results are summarized in Table 7 (entries 1-3). The driving force of the electrochemical process is given by $\Delta G^o = F(E_{app} - E^{o\prime})$ and the $[Cu^{II}L^{2+}]/[Cu^IL^+]$ ratio at the electrode surface is closely related to that dictated by the Nernst equation. At the beginning of the electrolysis there is only $Cu^{II}L^{2+}$ in solution, so the current has to decay as $Cu^{II}$ is converted to $Cu^I$, approaching a constant value corresponding to the $[Cu^{II}L^{2+}]/[Cu^IL^+]$ ratio required by $E_{app}$. However, $Cu^IL^+$ is engaged in a reversible reaction with the initiator and the formed dormant species, which represents a continuous perturbation to the equilibrium concentrations imposed by $E_{app}$. Therefore, whether a constant $[Cu^{II}L^{2+}]/[Cu^IL^+]$ ratio can be imposed in the bulk solution depends on the mutual rates of electrogeneration and disappearance of $Cu^IL^+$ and therefore will depend on $E_{app}$.

At $E_{app}=-0.55$ V, which is $<<E^{o\prime}$ the electrode process is under diffusion control and $Cu^{II}L^{2+}$ is almost quantitatively converted to $Cu^IL^+$ in a relatively short time; the current rapidly decreases to very small values. The overall rate of the process was rather high, with 79% of monomer conversion in less than 30 min, but control over polymerization was poor. The $\ln([M]/[M]_0)$ vs time plot deviated significantly from linearity, while the molecular weight distribution of the formed polymer was very broad and the final experimental $M_n$ was 3 times larger than the theoretical one, Table 7, entry 1. These features are typical of an uncontrolled polymerization dominated by termination reactions, such as bimolecular radical-radical coupling reactions.

With $E_{app}=-0.31$ V, the current decays much less rapidly than in the case of the electrolysis at $-0.55$ V, but tends to a constant value after a long period. Under these conditions, the rate of polymerization decreased without significant improvement in the control, Table 7, entry 2.

With $E_{app}=-0.21$ V, the current decays very slowly, approaching a constant value ($\sim-250$ μA) within a short period. Under these conditions $E_{app} > E^o$, which implies an equilibrium $[Cu^{II}L^{2+}]/[Cu^IL^+]$ ratio $>>1$. In this case, the process is under a good control as judged by the linearity of the first-order kinetic plot, $M_n$ increases linearly as a function of monomer conversion and polymers with $M_w/M_n \sim 1.2$ are obtained and nearly quantitative monomer conversion. This striking improvement of control is achieved with low charge consumption. This is a clear evidence of a drastic decrease of the termination events due to a good balance between $[Cu^IL^+]$ and $[Cu^{II}L^{2+}]$.

To promote the formation of $XCu^{II}L^+$ some experiments were run in the presence of a large excess of $X^-$ (Table 7, entries 4-5). As shown, the presence of $X^-$ produces a noticeable improvement of MW distribution without any loss in the rate of monomer conversion. Furthermore, the overall rate of the process does not decrease due to the formation of inactive $Cu^IX_n$ species as was found in organic solvents when excess $X^-$ is added. [*Macromolecules*, 2010, 42, 9257-9267; *Chem. Commun.* 2011, 47, 3580-3582.] Linear first-order kinetic plots were observed for all the polymerizations carried out with $[Cu^{II}L^{2+}]=0.1$ mM, FIG. 21. In particular, experiments with different degrees of polymerization gave a fairly constant slope, $d(\ln [M]_0/[M])/dt$, suggesting that the radical concentration is unaltered.

8B. eATRP of $OEOMA_{475}$ in Water in the Presence of Added Salts

PBS buffer was selected as an exemplary salt since it is employed in reactions seeking bio-conjugation of a protein with a water soluble polymer. Since $E^{o\prime}$ shifts to $-0.326$ in this medium $E_{app}$ was adjusted to $-0.275$ V. Although several interferences perturbing the ATRP equilibrium are possible (e.g., highly insoluble $Cu^{II}_3(PO_4)_2$ and/or stable $Cu^I(H_2PO_4)_2^-$ and $Cu^ICl_2^-$ may form [*Chem. Commun.* 2011, 47, 3580-3582], excellent results were observed both in terms of conversion and $M_w/M_n$, Table 7, entry 5. Indeed, neither displacement of the ligand nor loss of catalysis was observed by CV analysis of the system.

The effect of targeting different DPs was explored (Table 7, entries 6-8) using 0.1 mM $Cu^{II}L^{2+}$, 6.4 mol ppm with respect to solvent, and different concentrations of monomer. All polymerizations displayed linear $\ln([M]/[M]_0)$ vs time plots which, together with low $M_w/M_n$ values of the final polymer, is indicative of ATRP under good control. However, the experimental Ma was significantly higher than the theoretically predicted one. This is due to low initiation efficiency at the beginning of the polymerization. Improvement was obtained with PBS buffer, Table 7, entry 9.

In conclusion, aqueous eATRP overcomes the most serious drawbacks associated with conventional aqueous ATRP. The balance between $Cu^{II}L^{2+}$ and $Cu^IL^+$, which is crucial for control, can be regulated by appropriate selection of $E_{app}$ by following the simple CV analysis herein disclosed for each targeted monomer and initiator. The best results were achieved at $E_{app} < E^o{}_{Cu(II)L,Cu(I)L}$, providing excellent control over MW and MW distribution, accompanied by a fast reaction and a low charge consumption. Remarkably, phosphates and halide ions can not only be tolerated but can have a beneficial effect on the level of control over the polymerization. This last observation could be attractive for biological systems.

Example 9 eATRP Minicmulsion

Initial experimentation involved preparation of a miniemulsion and characterization using CV. CV traces representing the cathodic and anodic discharges of the miniemulsion system were examined in the absence of Cu/TPMA, FIG. 22. When viewing CV's conducted in the cathodic direction the reduction of protons begins around $-1.6$ V to generate $H_2$ whereas in the anodic direction oxidation of water occurs to generate $O_2$ at around 1 V, these discharges may not be water but rather monomer. Upon closer examination of the cathodic CV a small current response can be seen around between 0.2 and −0.1 V, indicative of the presence of Cu/BPMODA catalyst in the system. Larger potentials were not probed in these CV experiments due to passivation of the electrode. After identifying the current response of $Cu^{II}$/BPMODA further scans were recorded at various scan rates. As expected, the BPMODA couple current increased with increasing scan rate. The larger scan rates allowed accurate identification of the catalyst couple. The intensity of the current indicates that the catalyst complex is for the most part inaccessible to the electrode and resides within or at the surface of the miniemulsion particles or organic phase.

The addition of $Cu^{II}$/TPMA significantly changed the response, FIG. 22. The TPMA response resembles that of a transition metal complex participating in catalytic behavior, as indicated by the large cathodic and small anodic current. This behavior indicates that $Cu^{II}$/TPMA is regenerated by participating in homogenous bulk reactions, presumably those shown in the following equations, direct activation of the initiator (14) and electron transfer with $Cu^{I}$/BPMODA (15):

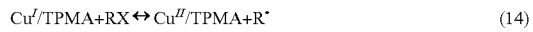
$Cu^{I}/TPMA + RX \leftrightarrow Cu^{II}/TPMA + R^{\cdot}$ (14)

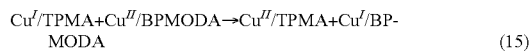
$Cu^{I}/TPMA + Cu^{II}/BPMODA \rightarrow Cu^{II}/TPMA + Cu^{I}/BPMODA$ (15)

In addition the large current response indicates that Cu/TPMA is assessable to the electrode and remains mostly within the aqueous phase.

BPMODA ligands and EBiB as initiator. This CV represents the total catalytic response from both $Cu^{II}$/BPMODA and EBiB interacting with $Cu^{I}$/TPMA. A second miniemulsion was then formulated without $Cu^{II}$/BPMODA which is represented by the dark grey curve. As evident from the CV, there is a substantial decrease in the current response when $Cu^{II}$/BPMODA is not present. This result confirms that indeed $Cu^{I}$/TPMA interacts with $Cu^{II}$/BPMODA. A third formulation was made, where initiator was not added, which also resulted in a significant decrease in current as compared to the system containing all reagents (light grey curve). These results confirm that both chemical pathways exist simultaneously and may indicate that $Cu^{I}$/TPMA reacts at a faster rate with EBiB than with $Cu^{II}$/BPMODA.

Figure 23A:
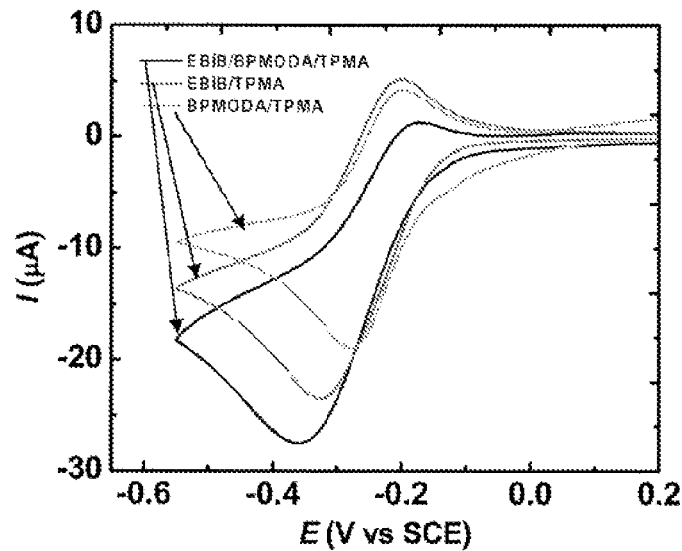
Figure 23B:
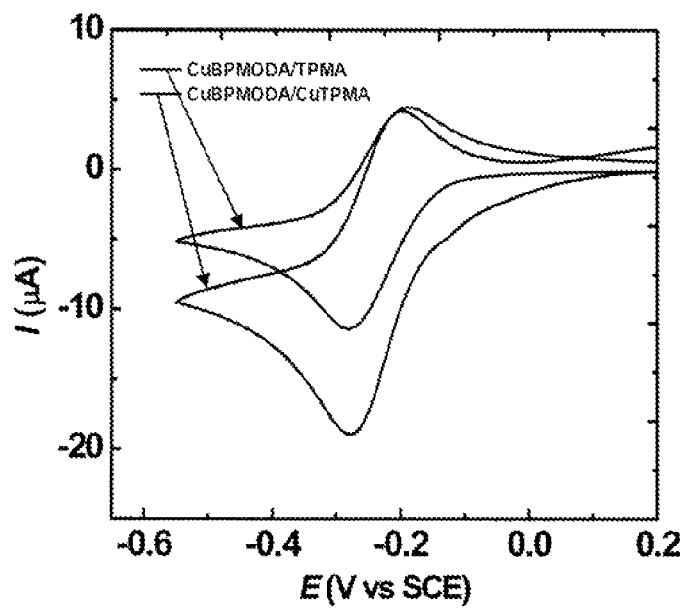

FIG. 23(B) represents a miniemulsion formulated without EBiB while still containing $Cu^{II}$/BPMODA. TPMA ligand, that had not been precomplexed with Cu, was then added to the reaction medium. Interestingly, the TPMA complex couple appeared (black curve) which indicates that ligand exchange occurred. The TPMA effectively stole the Cu from the preformed Cu/BPMODA complex. Afterward, a second charge of $Cu^{II}$ was added for complexation with TPMA which resulted in an increase in current as expected (grey curve).

After conducting these control reactions to illustrate the mechanism through which electron transfer occurs in a biphasic reaction medium, three miniemulsion polymerization reactions were conducted as summarized in Table 8. The first polymerization was conducted utilizing a potential past

TABLE 7

Electrochemical aqueous ATRP of $OEOMA_{475}$ at 25° C.

| Entry | % M v/v | [M]/[RX]/[$Cu^{II}$L] | Electrolyte[c] | $E_{app}$ (V vs SCE) | t (h) | Q (C) | C %[e] | $10^{-3} M_{n, theo}$ | $10^{-3} M_{n, exp}$[f] | $M_w/M_n$ |
|---|---|---|---|---|---|---|---|---|---|---|
| 1 | 10 | 200/1/1[a] | Et$_4$NBF$_4$ | −0.550 | 0.5 | 3.05 | 79 | 75.1 | 233 | 1.58 |
| 2 | 10 | 200/1/1[a] | Et$_4$NBF$_4$ | −0.310 | 1.8 | 4.34 | 88 | 83.2 | 213 | 1.53 |
| 3 | 10 | 200/1/1[a] | Et$_4$NBF$_4$ | −0.210 | 3.0 | 2.65 | 98 | 93.1 | 112 | 1.22 |
| 4 | 10 | 200/1/1[a] | Et$_4$NBr | −0.210 | 2.5 | 2.32 | 99 | 94.0 | 109 | 1.16 |
| 5 | 10 | 200/1/1[a] | PBS buffer[d] | −0.275 | 3.0 | 1.94 | 98 | 93.1 | 130 | 1.15 |
| 6 | 5.0 | 1000/1/1[b] | Et$_4$NBr | −0.210 | 2.0 | 0.175 | 84 | 399 | 704 | 1.25 |
| 7 | 2.5 | 500/1/1[b] | Et$_4$NBr | −0.210 | 2.0 | 0.210 | 72 | 171 | 403 | 1.19 |
| 8 | 1.0 | 200/1/1[b] | Et$_4$NBr | −0.210 | 2.5 | 0.267 | 77 | 73.2 | 175 | 1.35 |
| 9 | 5.0 | 1000/1/1[b] | PBS buffer[d] | −0.275 | 2.0 | 0.179 | 79 | 375 | 450 | 1.20 |

[a][$Cu^{II}L^{2+}$] = 1 mM.
[b][$Cu^{II}L^{2+}$] = 0.1 mM.
[c]0.1M.
[d]0.137M NaCl + 2.7 mM KCl + 11.9 mM (Na$_2$(HPO$_4$) + KH$_2$PO$_4$) in H$_2$O; pH = 7.4.
[e]Determined by $^1$H NMR.
[f]Determined by GPC-MALLS

TABLE 8

Summary of miniemulsions by eATRP.

| Ent. (#) | Exp. (#) | $E_{app}$ (V) | Temp. (° C.) | [HD]:[Brij]$^a$ wt. (%) vs M | Solids$^b$ (%) | [E] M | DLS nm/PDI | time (h) | $p_{NMR}$ (%) | $M_{n, theo}$ | $M_{n, GPC}$ | $M_w/M_n$ |
|---|---|---|---|---|---|---|---|---|---|---|---|---|
| 1 | 2-79 | −0.550 | 65 | 5.4:4.6 | 19.7 | 0.019 | 143/0.147 | 10 | n/a | n/a | 22,751 | 1.96 |
| 2$^c$ | 2-80-1 | −0.310 | 65 | 5.4:4.6 | 19.7 | 0.019 | 131/0.162 | 2.5 | n/a | n/a | 39,110 | 14.1 |
| 3 | 2-82 | −0.296 | 65 | 3.7:4.6 | 19.7 | 0.020 | 143/0.147 | 4.0 | 63.8 | 32,941 | 17,238 | 1.93 |

All reactions have the following molar ratios: [BA]/[EBiB]/[BPMODA]/[TPMA]/[$Cu^{II}$] = 400/1/0.4/0.4/0.8
$^a$($m_{HD}/m_{BA}$)*100.
$^b$solid content = ($m_{BA}/(m_{tot}-m_{electro})$)*100.
$^c$without Cu/BPMODA A series of control experiments were conducted to investigate the origin of the $Cu^{II}$/TPMA catalytic response, as shown in FIG. 23(A). The black curve represents a miniemulsion system formulated with both TPMA and the cathodic peak to ensure efficient and rapid reduction of $Cu^{II}$/TPMA to $Cu^{I}$/TPMA. The polymer obtained after 10 h reaction displayed a high molecular weight and a relatively broad $M_w/M_n$. The uncontrolled behavior of this system was attributed to the large reducing potential applied to the polymerization. Therefore, a second polymerization was conducted with a lower applied potential, entry 3. Similar to the first polymerization the resulting polymer exhibited a higher molecular weight with a broad $M_w/M_n$. Owing to the fact that $Cu^I$/TPMA can react with EBiB and to demonstrate that $Cu^{II}$/BPMODA is required to obtain any level of control a third polymerization was conducted without addition of BPMODA (entry 2). This polymerization resulted in preparation of a polymer with a very high value for $M_w/M_n$, reaching a value of 14. The results exemplify the profound effect of having a hydrophobic ligand (BPMODA) present in the system.

Most importantly the results indicate that the presence of both a hydrophilic and a hydrophobic ligand provides an e(ATRP) emulsion system and leads to the conclusion that development of a more active hydrophobic ligand, such as an $AlkMe_5TREN$ ligand, which would allow lower temperature miniemulsions to be conducted and be well suited for eATRP in miniemulsion systems. Such an active hydrophobic catalyst complex could, indeed should, function with a less active hydrophilic ligand, such as 2,2-bipyridene, that would not act to reduce the concentration of the catalyst in the dispersed phase. Improved control would result if the less reactive catalyst resides predominately in the aqueous phase otherwise lower concentrations of $XCu^{II}/L$ will be retained in the oil phase and if there in no deactivator, there is no control. So preferentially one should either match the reactivity of both hydrophilic and hydrophobic catalyst complexes and/or put the less reactive complex in the aqueous phase.

In one embodiment of the invention control of an emulsion polymerization is attained by addition of a hydrophilic ligand and a hydrophobic ligand.

Example 10

Galvanostatic eATRP

Galvanostatic conditions are attractive from an industrial standpoint because they allow the elimination of the reference electrode.

Figure 24A:
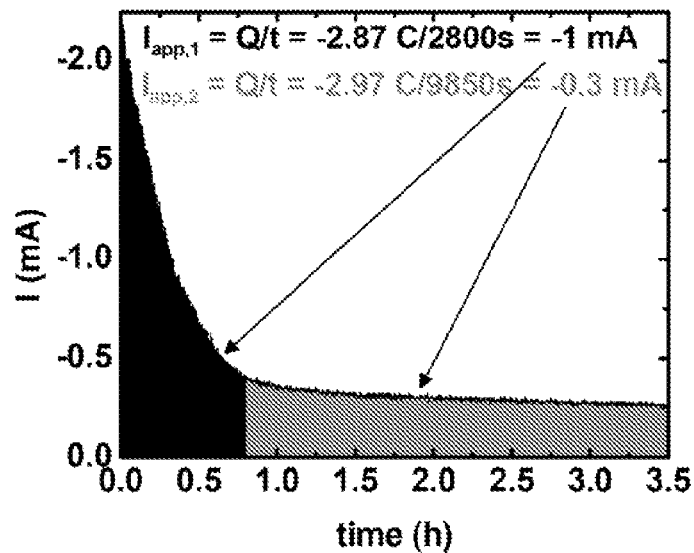
Figure 24B:
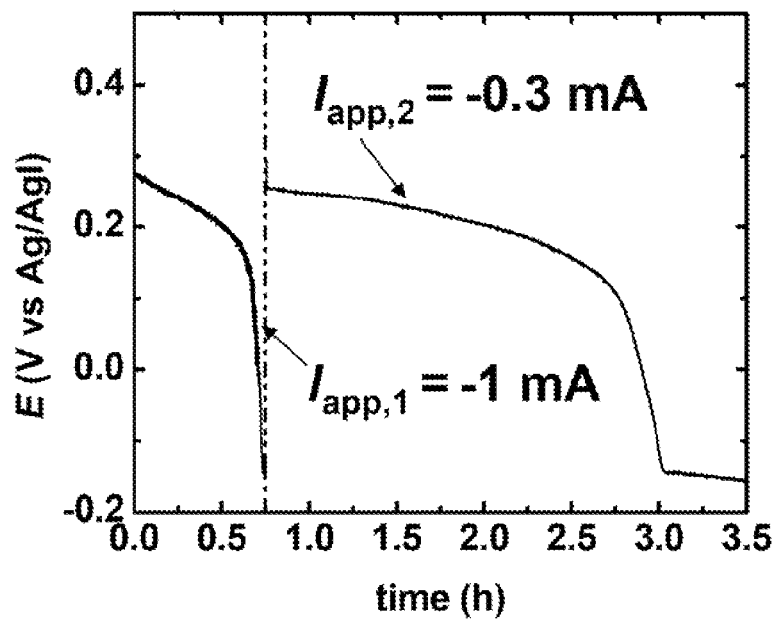

Reaction conditions: [BA]/[EBiB]/[TPMA]/[$Cu^{II}Trf_2$]/[TPMA]/[TBABr]=300/1/0.9/0.9/0.9, [BA]=3.9 M, [TBAClO$_4$] 0.2 M, T=44° C. The current profile shown in FIG. 24A was obtained at an $E_{app}$ 80 mV more negative than the cathodic peak potential ($E_{pc}$). This profile was used to determine the appropriate currents for the galvanostatic polymerization. This current profile was divided up into two main regimes: (1) initial reduction of $Cu^{II}$ to $Cu^I$ and (2) maintenance of the current to compensate for termination events during polymerization. The area under the current profile was calculated to determine the total charged passed in each regime, afterward this value was divided by the desired time of that regime (i.e. this is an average current). Two current values were determine as shown in FIG. 24A and applied to begin polymerization. The potential at the working electrode was monitored as the polymerization proceeded, as shown in FIG. 24B. As the polymerization took place the E remained in close proximity to the $Cu^{II}/Cu^I$ couple, however, near the end of each current stage it began to shift to more negative potentials. This indicates that in the vicinity of the electrode, nearly all $Cu^{II}$ was converted to $Cu^I$, and therefore the potentiostate began to apply a stronger reducing potential to maintain these current values. The resulting polymerization results are shown in FIGS. 25(A & B). The rate of polymerization was slower in comparison to the potentiostatic experiment simply because of a smaller applied current. In regard to polymerization control, the polymerization displayed a linear increase in molecular weight with conversion and low $M_w/M_n$ values during the course of the polymerization confirming that galvanostatic eATRP are possible.

Example 11

Copper Removal and Catalyst Regeneration in an eATRP

Figure 27A:
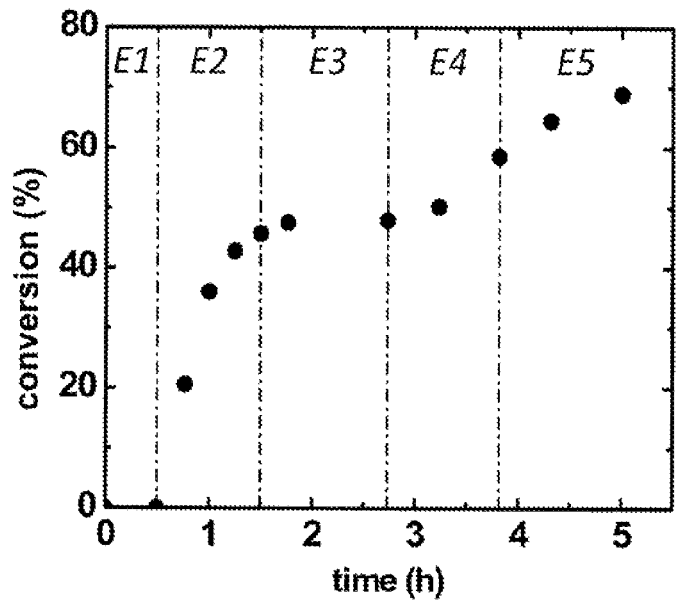
Figure 27B:
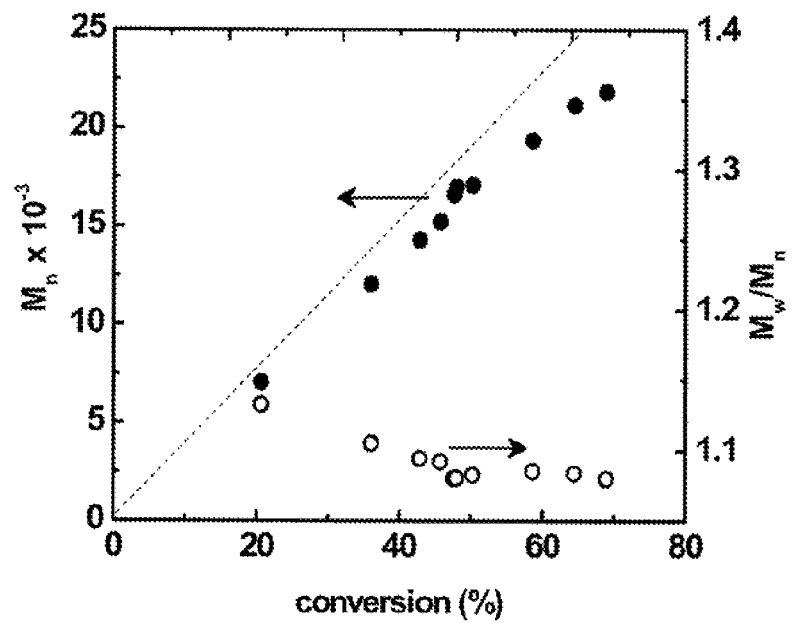

11A. As discussed above in section 4E, one of the significant advantages of eATRP is the ability to remove then recycle the transition metal from the polymerization medium. Therefore a variety of different potentials were applied to either deposit Cu on the Pt working electrode, or strip the bound copper from the working electrode, and/or promote polymerization of BA. Reaction conditions: [BA]/[BiB]/[TPMA]/[$Cu^{II}Trf_2$]/[TPMA]/[TBABr]=300/1/0.03/0.03/0.03, [BA]=3.9 M, [TBAClO$_4$] 0.2 M, T=45° C. 100 ppm catalyst was used in this polymerization. FIG. 26 shows that with a sufficiently negative potential that $Cu^0$ deposition is possible. FIG. 27A shows that the reaction rate slows when this process is occurring, between 1.5 and 2.45 h and increases again when the potential is changed to reform $Cu^{II}$ seen after 3 h in FIG. 27A. Chain end functionality is not affected by this reduction in concentration of catalyst and continues to increase in a regular manner throughout the reaction, FIG. 27B.

11B. Initial reaction conditions: [BA]/[EBiB]/[TPMA]/[$Cu^{II}Trf_2$]/[TBABr]=300/1/0.09/0.09/0.09, [BA]=3.9 M, [TBAClO$_4$]0.2 M, T=60° C. 300 ppm catalyst was in this polymerization. After 1.5. hr conversion was 72%, see Table 9, the temperature of the reactor was increased to 60° C, an applied potential was adjusted to be past that of the $Cu^0$ deposition peak was applied. The current profile shows a decrease in the current indicating the depletion of Cu in the reaction medium. The process is rather slow and required nearly 9 h for the current to reach nominal values. A UV-V is calibration curve was generated so that the concentration of copper could be determined before and after the deposition and the resulting concentration of copper can be seen in Table 9. This process resulted in nearly 85% of the Cu being removed from the reaction vessel. There was visual confirmation of the copper deposition on the platinum electrode.

TABLE 9

Summary of polymer characterization and copper concentration before and after electrodeposition.

| | time (h) | Conversion (%) | $M_n$ | $M_n/M_w$ | [Cu] (mM) |
|---|---|---|---|---|---|
| polymerization | 1.5 | 72.0 | 28,000 | 1.09 | 1.15 |
| deposition #1 | 1.5 | 80.1 | 28,300 | 1.09 | 0.78 |
| deposition #2 | 14 | 96.9 | 28,600 | 1.12 | 0.18 |

In one embodiment of the invention the reaction is initially exposed to a larger potential to quickly generate the desired concentration of $Cu^IBr$ and then the applied potential is lowered to maintain the [$Cu^IBr$] at a lower constant level thereby providing a lower concentration of propagating radicals to generate a reduced fraction of terminated chains.

Another embodiment allows the synthesis of well-controlled polymers using a low amount of catalyst by using electrochemistry to directly reduce a targeted fraction of the X-Mt$^{X+1}$ deactivator to the Mt$^X$ activator, exemplified in these initial examples by a X-Cu$^{II}$ deactivator and Cu$^I$ activator.

In another embodiment of the invention the polymerization reaction can be started and stopped by changing the potential applied to the reaction medium. This is a convenient procedure for controlling any exotherm in a polymerization reaction by incorporating a feedback loop into the electrochemical control process.

In a further embodiment the rate of polymerization can be controlled through the magnitude of the voltage applied to the system.

The embodiments disclosed herein can be summarized as, but are not limited to, allowing dynamic modulation of polymerization rates through electrochemical means, allowing "on demand" polymerization initiation, cessation, and rejuvenation of a controlled/living radical polymerization process thereby providing an enhanced level of polymerization control through an external potential source, i.e. potentiostat, affording complete kinetic control by the magnitude of $E_{app}$. The disclosed procedure can additionally offer adjustable "dials", e.g. current, potential, and total charge passed, to manipulate/control polymerization activation/deactivation, polymerization rates, and selective targeting of electro-active species which thereby affords complete kinetic control by the magnitude of applied potential, without addition of chemical reducing agents, at low catalyst concentrations.

The invention claimed is:

1. A polymerization process, comprising:
polymerizing free radically (co)polymerizable monomers in the presence of a polymerization medium initially comprising:
at least one transition metal catalyst that can participate in a redox reaction; and
an initiator comprising one or more redox transferable atoms or groups;
wherein a selected molar ratio of two oxidation states of the transition metal catalyst is directly adjusted, controlled, and/or maintained by electrochemistry throughout a time that an active polymerization is desired;
wherein the polymerization takes place in an electrolysis apparatus comprising at least a cathode and an anode;
wherein electrolysis is controlled by controlling one or more of an applied voltage, a current, and a charge passed, and
wherein the electrolysis control is selected to provide a concentration greater than or equal to 0.1% of each oxidation state of the at least one transition metal catalyst based on total transition metal added in the polymerization medium.

2. The polymerization process of claim 1, wherein a rate of polymerization is controlled through the magnitude of one or more of the applied voltage, the current, and the charge passed.

3. The process of claim 2, wherein the molar ratio of the two oxidation states of the transition metal catalyst at a specific time in the polymerization is determined by the one or more of the applied voltage, the current, and the charge passed through the polymerization medium and current values.

4. The process of claim 2, wherein the molar ratio of a higher oxidation state transition metal catalyst and a lower oxidation state transition metal catalyst are adjusted through the magnitude of the applied voltage or the current applied to the polymerization medium to control the polymerization of the free radically (co)polymerizable monomers with the at least one transition metal catalyst and one or more ligands.

5. The process of claim 1, wherein the electrochemistry can be started and stopped by changing the applied voltage or the current, or switching the applied voltage or the current "on" or "off", optionally where the applied voltage or the current is capable of controlling a reaction exotherm.

6. The process of claim 1, wherein the concentration of the at least one transition metal catalyst in the polymerization medium is less than 1000 ppm.

7. The process of claim 1, wherein the at least one transition metal catalyst comprises one or more ligands forming a transition metal catalyst complex;
wherein the one or more ligands controls the solubility and activity of the transition metal catalyst complex in the polymerization medium.

8. The process of claim 7, wherein the transition metal catalyst complex comprises two different ligands.

9. The process of claim 7, wherein the electrochemistry is adjusted, controlled, and/or maintained by applying the applied voltage to the polymerization medium, wherein the applied voltage is based on an $E_{1/2}$ value, as determined by cyclic voltammetry, of the transition metal catalyst complex.

10. The process of claim 9, wherein the applied voltage is based on the $E_{1/2}$ value, as determined by the cyclic voltammetry, of the at least one transition metal catalyst, the one or more ligands, the monomers, and optionally a solvent in the polymerization medium.

11. The process of claim 10, wherein the applied voltage is based on the $E_{1/2}$ value, as determined by the cyclic voltammetry, of the at least one transition metal catalyst, the one or more ligands, the monomers, the initiator, and the optional solvent in the polymerization medium.

12. The process of claim 7, wherein the electrochemistry is adjusted, controlled, and/or maintained by applying the applied voltage to the polymerization medium, wherein the applied voltage is based on an $E_{1/2}$ value, as determined by cyclic voltammetry, of the at least one transition metal catalyst, one or more ligands, the monomers, and optionally an electrolyte in the polymerization medium.

13. The process of claim 12, wherein the applied voltage is based on the $E_{1/2}$ value, as determined by the cyclic voltammetry, of the at least one transition metal catalyst, the one or more ligands, the monomers, the initiator, and the optional electrolyte in the polymerization medium.

14. The process of claim 1, wherein the at least one transition metal catalyst comprises two different transition metals.

15. The process of claim 1, wherein the concentration of the at least one transition metal catalyst in the polymerization medium is reduced by electrodeposition of the at least one transition metal catalyst on the cathode of the electrolysis apparatus.

16. The process of claim 1, wherein a transition metal catalyst complex is formed in-situ directly from a reaction of a solid transition metal deposited on the cathode with one or more ligands in the polymerization medium.

17. The process of claim 1, wherein the polymerization medium is a medium selected from the group consisting of an organic medium, an aqueous medium and a biphasic medium.

18. The process of claim 1, wherein the electrochemistry is adjusted by one or more of the applied voltage and the current at one or more times during the polymerization process.

19. The process of claim 1, wherein the polymerization medium further comprises an electrolyte.

20. The process of claim 19, wherein the electrochemistry is adjusted by the applied voltage and the current to retain at least 0.1% concentration of both an activator state of the at least one transition metal catalyst and a deactivator state of the at least one transition metal catalyst in the polymerization medium throughout the time that the active polymerization is desired.

21. The process of claim 19, wherein the electrolyte comprises a same counterion present on a first added transition metal salt that forms the at least one transition metal catalyst.

22. The process of claim 19, wherein the electrolyte comprises a different counterion from that present on a first added transition metal salt that forms the at least one transition metal catalyst.

23. The process of claim 22, wherein the electrolyte further comprises a quaternary ammonium complex or a triflate.

\* \* \* \* \*